COMPUTER SYSTEM

INVENTORS
SHERRIL A. HARMON
RONALD S. HOVEY
EMERY A. WHITE
BY
Ronald W. O'Keefe
ATTORNEY

BINARY DATA WORD

INSTRUCTION WORD-FULL OPERAND AND QUASI INSTRUCTIONS

INSTRUCTION WORD-GEN 1, GEN 2, AND GEN 3 INSTRUCTIONS

INDEX WORD

TIM/TOM CONTROL WORD

AND-GATE

OR-GATE

INVERTER

NAND-GATE

NOR-GATE

FLIP-FLOP

FULL ADDER

ARITHMETIC AND CONTROL UNIT DATA TRANSFER

TIM/TOM

INPUT/OUTPUT CONTROL APPARATUS IN A COMPUTER SYSTEM

Filed June 21, 1967 34 Sheets-Sheet 8

INPUT/OUTPUT CONTROL APPARATUS IN A COMPUTER SYSTEM

TIM/TOM CONTROL UNIT

May 12, 1970 S. A. HARMON ET AL 3,512,136

INPUT/OUTPUT CONTROL APPARATUS IN A COMPUTER SYSTEM

Filed June 21, 1967 34 Sheets-Sheet 10

TIM/TOM CONTROL UNIT

TIM/TOM COUNTER OF TIM/TOM CONTROL UNIT

FLOW CHART-TIM/TOM OPERATION

TIM/TOM OPERATION-SEQUENCE CONTROL STATE 1

INFORMATION TRANSFER-TIM/TOM OPERATION
SEQUENCE CONTROL STATE 1

TIMING DIAGRAM-SEQUENCE CONTROL STATE 1
TIM/TOM OPERATION

TIM/TOM OPERATION-SEQUENCE CONTROL STATE 3

INFORMATION TRANSFER-TIM/TOM OPERATION
SEQUENCE CONTROL STATE 3

TIMING DIAGRAM - SEQUENCE CONTROL STATE 3
TIM/TOM OPERATION

TIM/TOM OPERATION-SEQUENCE CONTROL STATE 4

SEQUENCE CONTROL STATE 4 - TIM/TOM OPERATION

TIMING DIAGRAM-SEQUENCE, DELAY AND EXTENDED TIME COUNTERS SEQUENCE CONTROL STATE FOUR OF TIM/TOM OPERATION

TIMING DIAGRAM-SEQUENCE CONTROL STATE FOUR-TIM/TOM OPERATION-ONE BYTE PER WORD

TIMING DIAGRAM-SEQUENCE CONTROL STATE FOUR-TIM/TOM OPERATION-TWO BYTES PER WORD

TIMING DIAGRAM-SEQUENCE CONTROL STATE FOUR-TIM/TOM OPERATION-THREE BYTES PER WORD

TIMING DIAGRAM-SEQUENCE CONTROL STATE FOUR-TIM/TOM OPERATION-FOUR BYTES PER WORD

TIMING DIAGRAM-DELAY TIME COUNTER AND FREQUENCY DIVIDER (SLOW-SPEED CHANNEL)

TIM/TOM OPERATION-SEQUENCE CONTROL STATE 5

INFORMATION TRANSFER-TIM/TOM OPERATION-SEQUENCE CONTROL STATE 5

TIMING DIAGRAM-SEQUENCE CONTROL STATE 5-TIM/TOM OPERATION

TOM OPERATION-INITIAL STATE OF CONTROL WORD AND MEMORY LOCATIONS

TOM OPERATION-AFTER FIRST INTERRUPT

TOM OPERATION-AFTER SECOND INTERRUPT

May 12, 1970 S. A. HARMON ET AL 3,512,136

INPUT/OUTPUT CONTROL APPARATUS IN A COMPUTER SYSTEM

Filed June 21, 1967 34 Sheets-Sheet 30

TOM OPERATION-AFTER SIXTH INTERRUPT

TOM OPERATION-AFTER SEVENTH INTERRUPT

TOM OPERATION-AFTER EIGHTH INTERRUPT

TIM OPERATION-INITIAL STATES OF CONTROL WORD AND MEMORY LOCATIONS

TIM OPERATION-AFTER FIRST INTERRUPT

TIM OPERATION-AFTER SECOND INTERRUPT

TIM OPERATION-AFTER THIRD INTERRUPT

TIM OPERATION-AFTER FOURTH INTERRUPT

TIM OPERATION-AFTER FIFTH INTERRUPT

TIM OPERATION-AFTER SIXTH INTERRUPT

United States Patent Office 3,512,136

Patented May 12, 1970

3,512,136
INPUT/OUTPUT CONTROL APPARATUS IN A COMPUTER SYSTEM

Sherril A. Harmon, Ronald S. Hovey, and Emery A. White, Phoenix, Ariz., assignors to General Electric Company, a corporation of New York

Filed June 21, 1967, Ser. No. 647,833
Int. Cl. G06f *9/18*
U.S. Cl. 340—172.5 19 Claims

ABSTRACT OF THE DISCLOSURE

Apparatus in a computer system for controlling the transfer of information between memory and peripheral devices. A program interrupt unit receives program interrupt requests from peripheral channels connected to the peripheral devices and provides an output corresponding to the interrupt request having the highest priority. A control word corresponding to each of predetermined peripheral channels is provided in memory to direct information transfers with the associated peripheral device through the predetermined channel when an interrupt request of the channel is granted by the program interrupt unit. A matrix is provided for generating output signals in response to an output of the program interrupt unit corresponding to one of the predetermined channels. The output signals of the matrix identify the peripheral device with which the information transfers are to occur and control operations in the computer system affecting the direction of information transfer.

BACKGROUND OF THE INVENTION

Field of the invention

This invention relates to computer systems for processing information and, more particularly, to control apparatus for controlling the transfer of information between the memory of the computer system and information transmitting and receiving elements, for example peripheral devices, forming a part of the computer system. Specifically, the invention relates to control apparatus for selectively directing the transfer of information between memory and a particular peripheral device and controlling operations affecting the direction of data transfer in the system.

Description of the prior art

The input/output capabilities of prior art computer systems have depended either on complete program control of information transfers between memory and peripheral devices or exclusively on the use of control words associated with each peripheral device to direct input/output information transfers between memory and peripheral devices. It is desirable to increase the flexibility of input and output control in a computer system. Accordingly, the input/output control system of the invention provides improved operation by permitting information transfers between memory and peripheral devices to be controlled by program or alternatively to be performed under the direction of control words.

It is therefore an object of this invention to provide an improved arrangement for controlling information transfers between memory and peripheral devices in a computer system.

It is another object of this invention to provide an input/output control arrangement in a computer system having improved flexibility.

It is a further object of this invention to provide apparatus for selectively permitting input/output transfers in a computer system to be performed under direction of control words.

It is another object of this invention to provide an improved input/output control arrangement in a computer system utilizing stored logic.

SUMMARY OF THE INVENTION

The foregoing objects are achieved, in accordance with the illustrated embodiment of the invention, in a computer system having a plurality of peripheral channels connected to corresponding peripheral devices, the peripheral channels supplying program interrupt requests to a program interrupt unit when transfer of information to or from the corresponding peripheral devices is required. Certain of the channels are designated TIM or input channels and TOM or output channels and information transfers with the peripheral devices connected to these channels are directed by control words stored in predetermined memory locations. Interrupt requests from other channels are serviced by execution in the system of instructions or subroutines.

Upon granting a program interrupt request, the program interrupt unit generates an address identifying the memory location in which an instruction word or, in the case of a TIM or a TOM channel, a control word is stored. A diode matrix or read-only memory comprising stored logic is connected to the program interrupt unit and receives the address output of the program interrupt unit. The input logic of the matrix is arranged so that the matrix is actuated in response to an address output of the program interrupt unit corresponding to the interrupt request of a TIM or TOM channel and identifying the storage location of the control word corresponding to the TIM or TOM channel. In response to such an address, the matrix generates a plurality of output signals identifying the peripheral channel and device with which an information transfer is to occur during interruption of the program, identifying the direction of data transfer in the system required to service the interrupt request and indicating the fact that a TIM or a TOM operation is to occur. The peripheral channel and device identification information is transmitted to the peripheral channels to enable the channel and device whose request has been granted. The signals designating a TIM or a TOM operation are transmitted to a control unit which controls, in conjunction with the appropriate control word, the operations in the system effecting the data transfer between memory and the peripheral device.

BRIEF DESCRIPTION OF THE DRAWINGS

The subject matter of the invention is particularly pointed out and distinctly claimed in the concluding portion of the specification. The invention, however, both as to organization and method of operation may best be understood by reference to the following description taken in connection with the accompanying drawings, in which:

Figure 1:
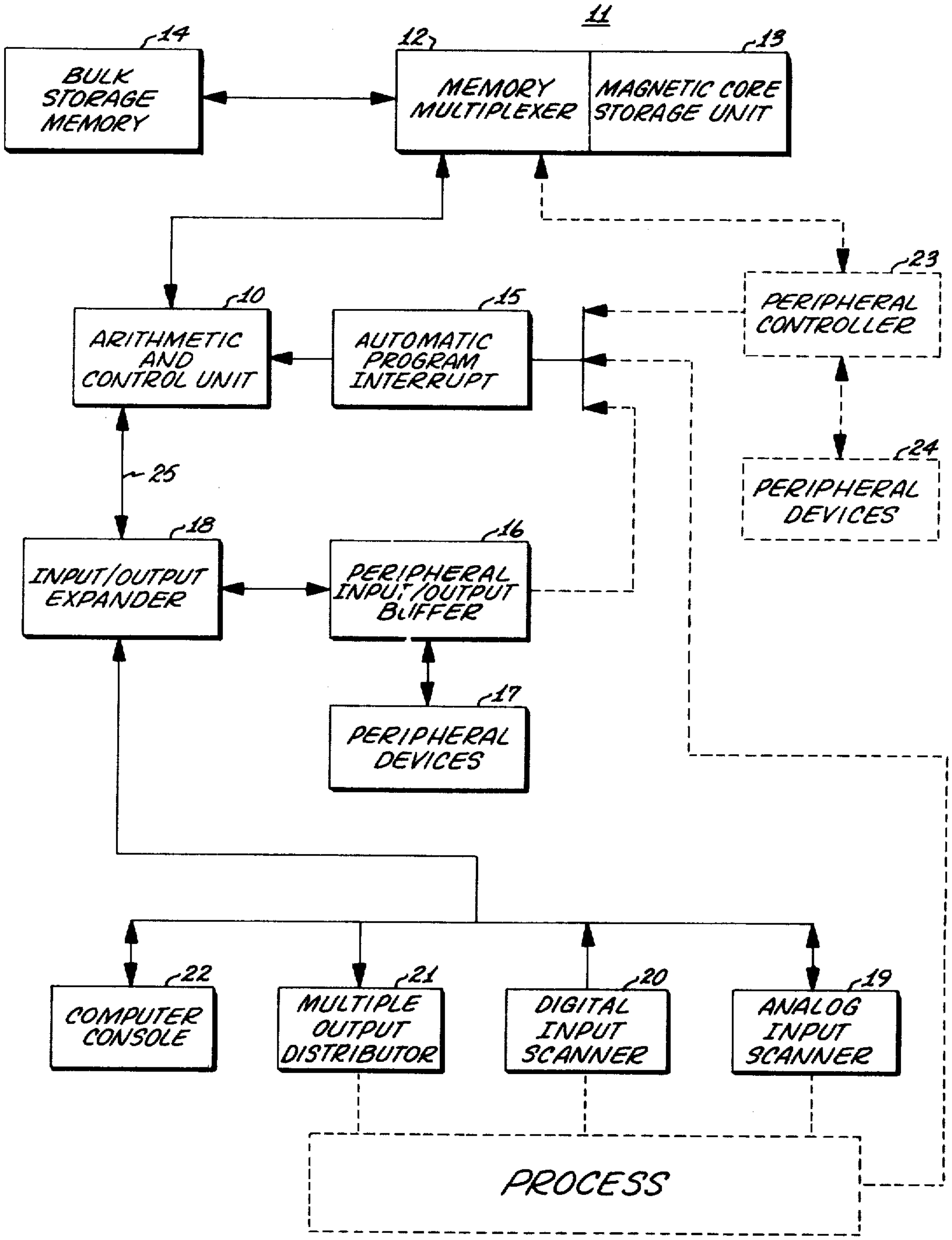
FIG. 1 is a block diagram of a computer system to which the instant invention is applicable.
Figure 4:
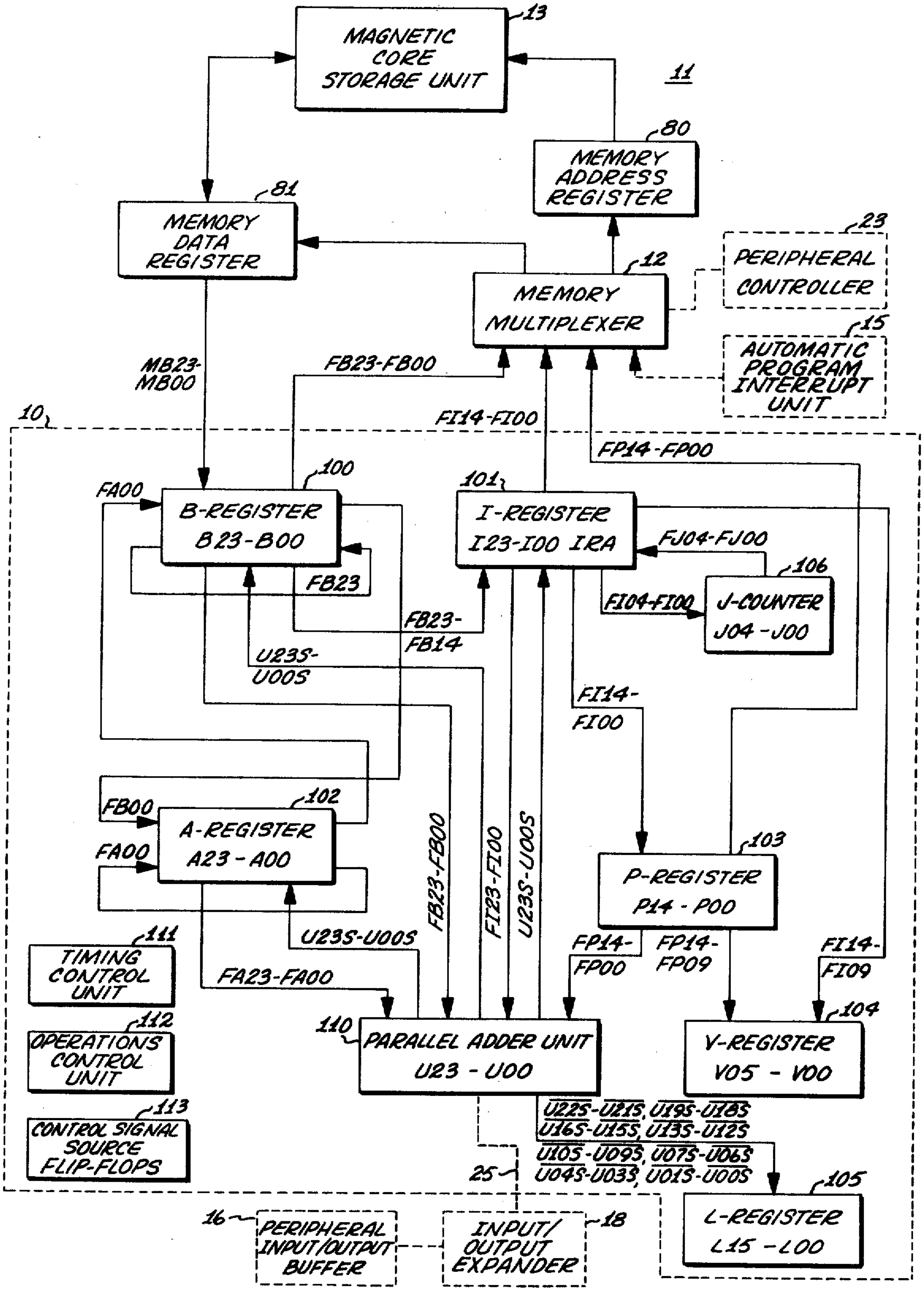
Figure 5:
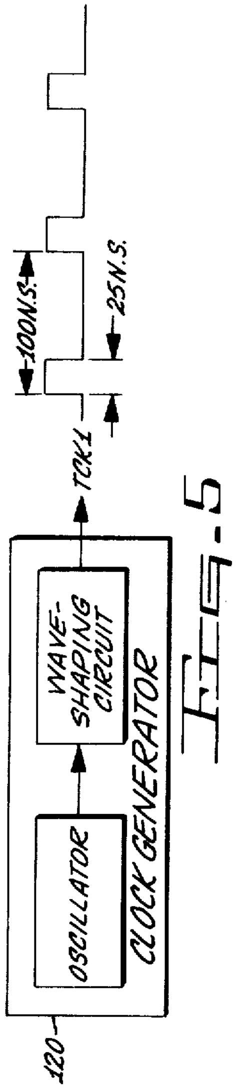
Figure 6:
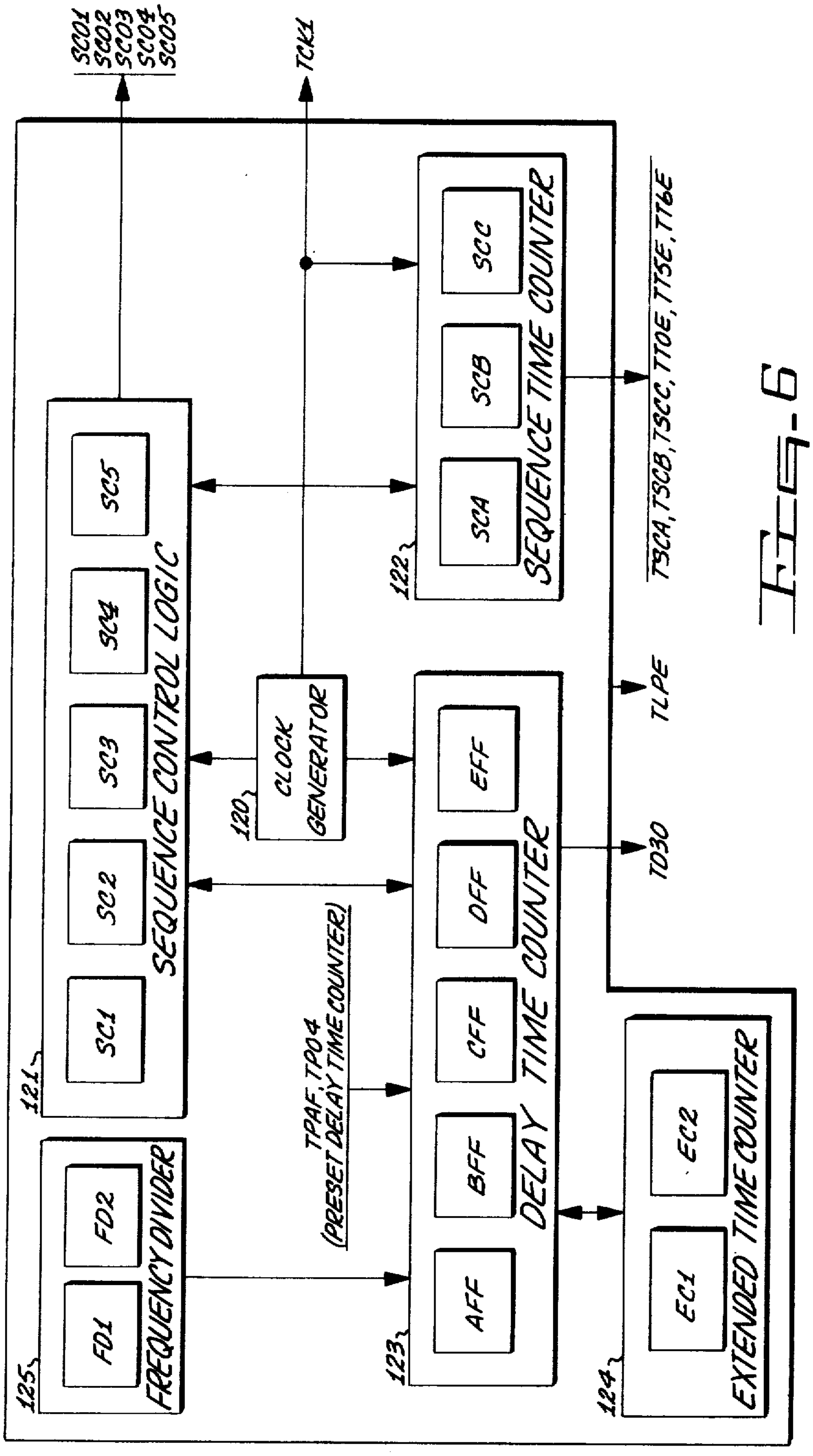
Figure 7:
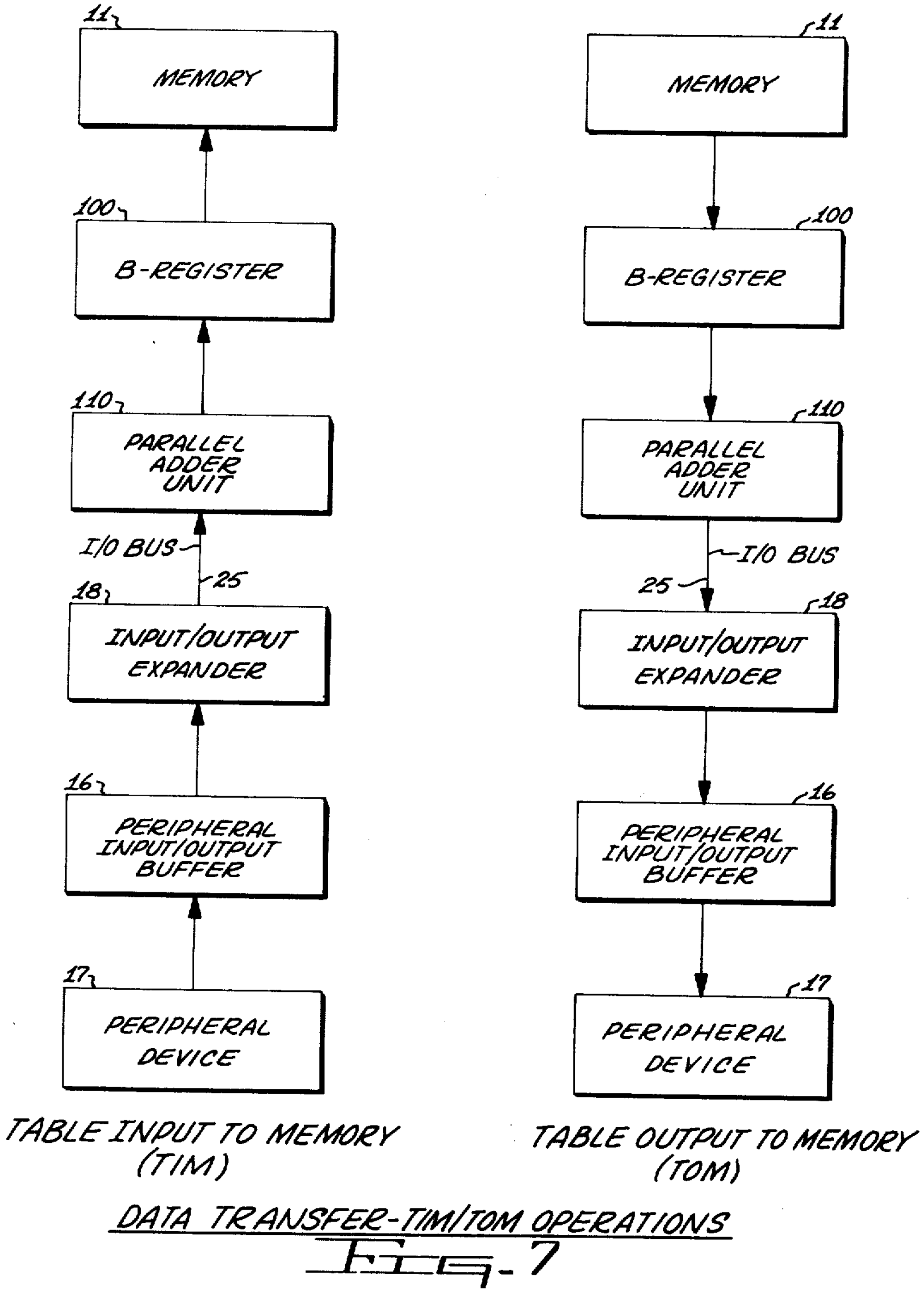
Figure 8:
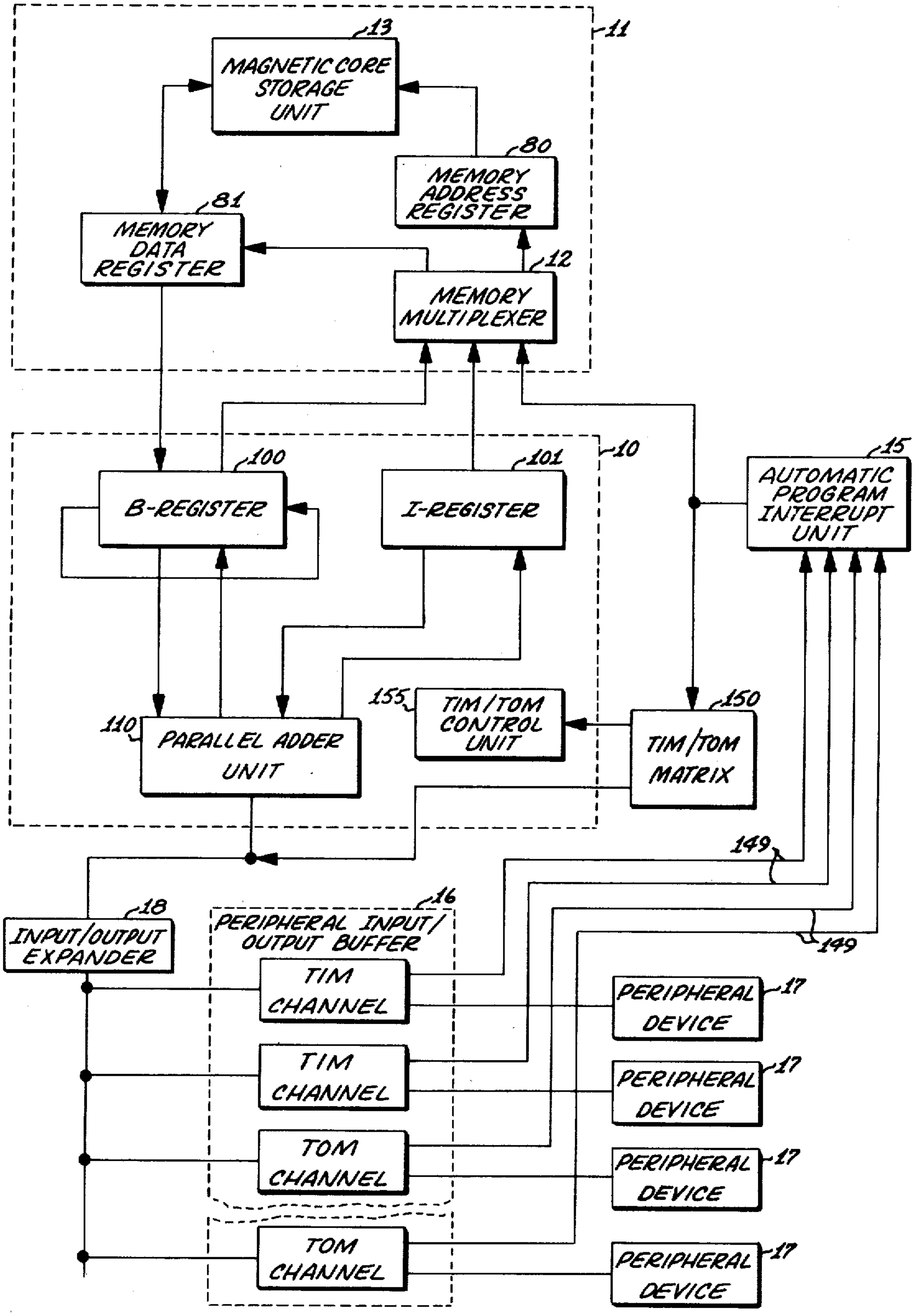
Figure 9:
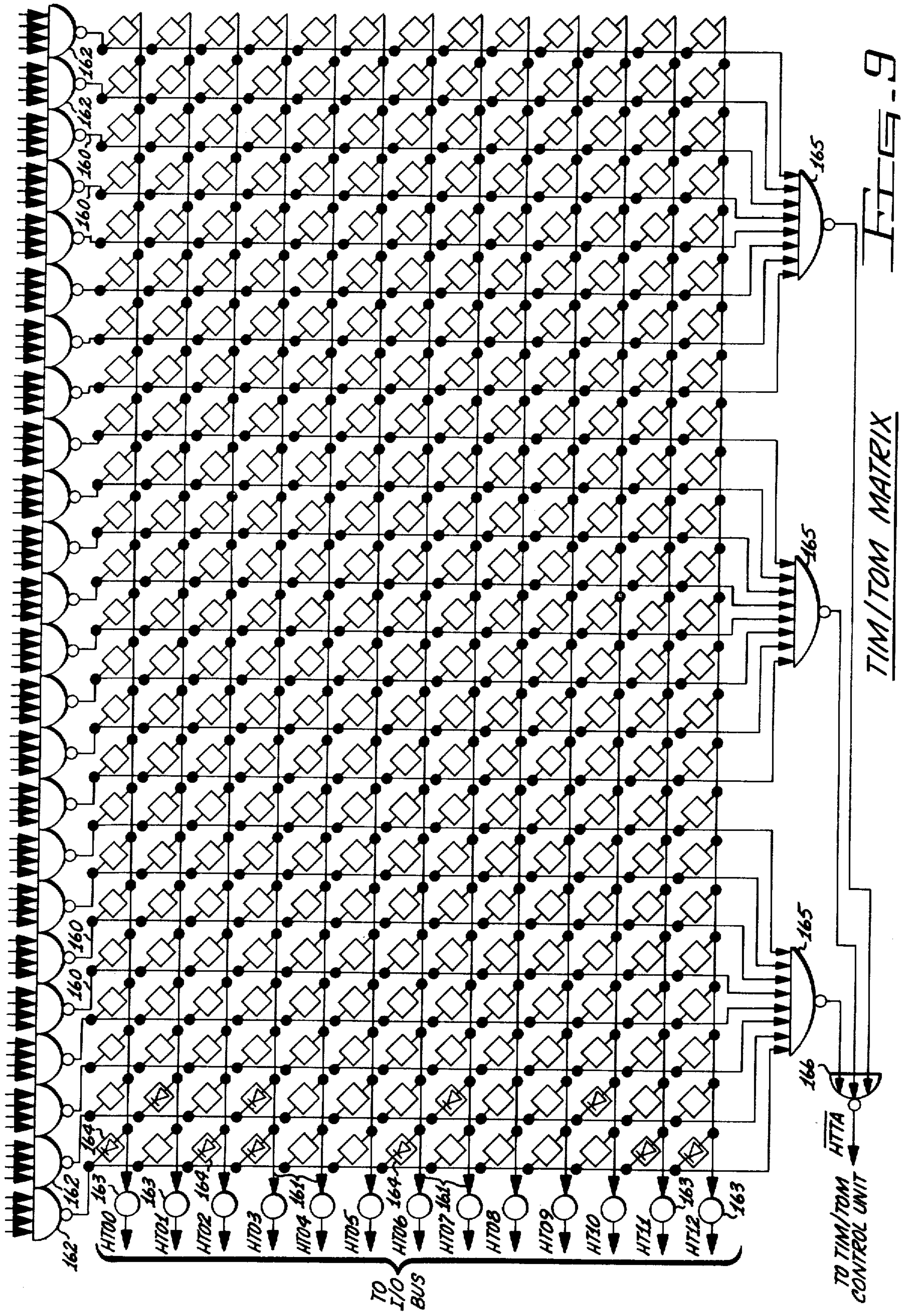
Figure 10A:
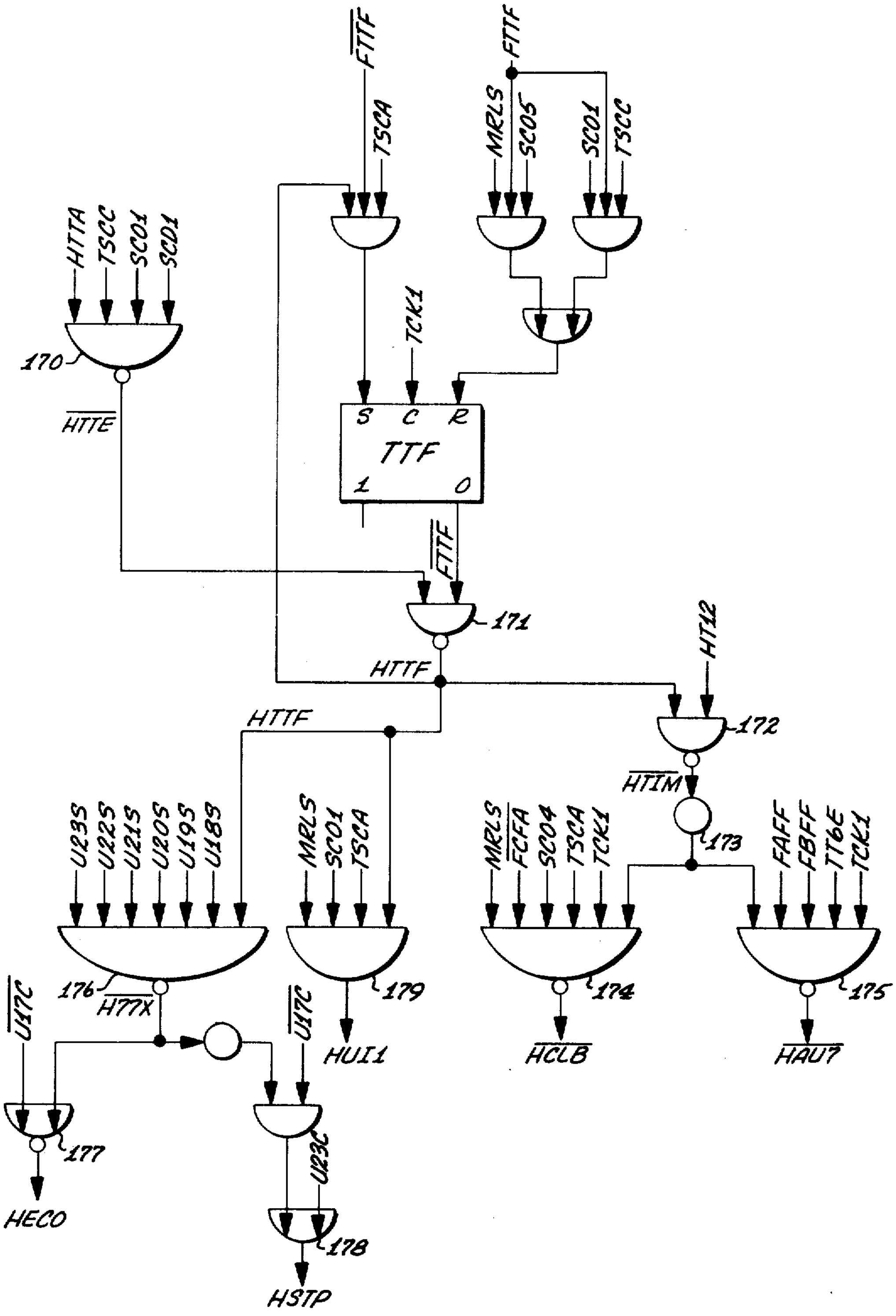
Figure 10B:
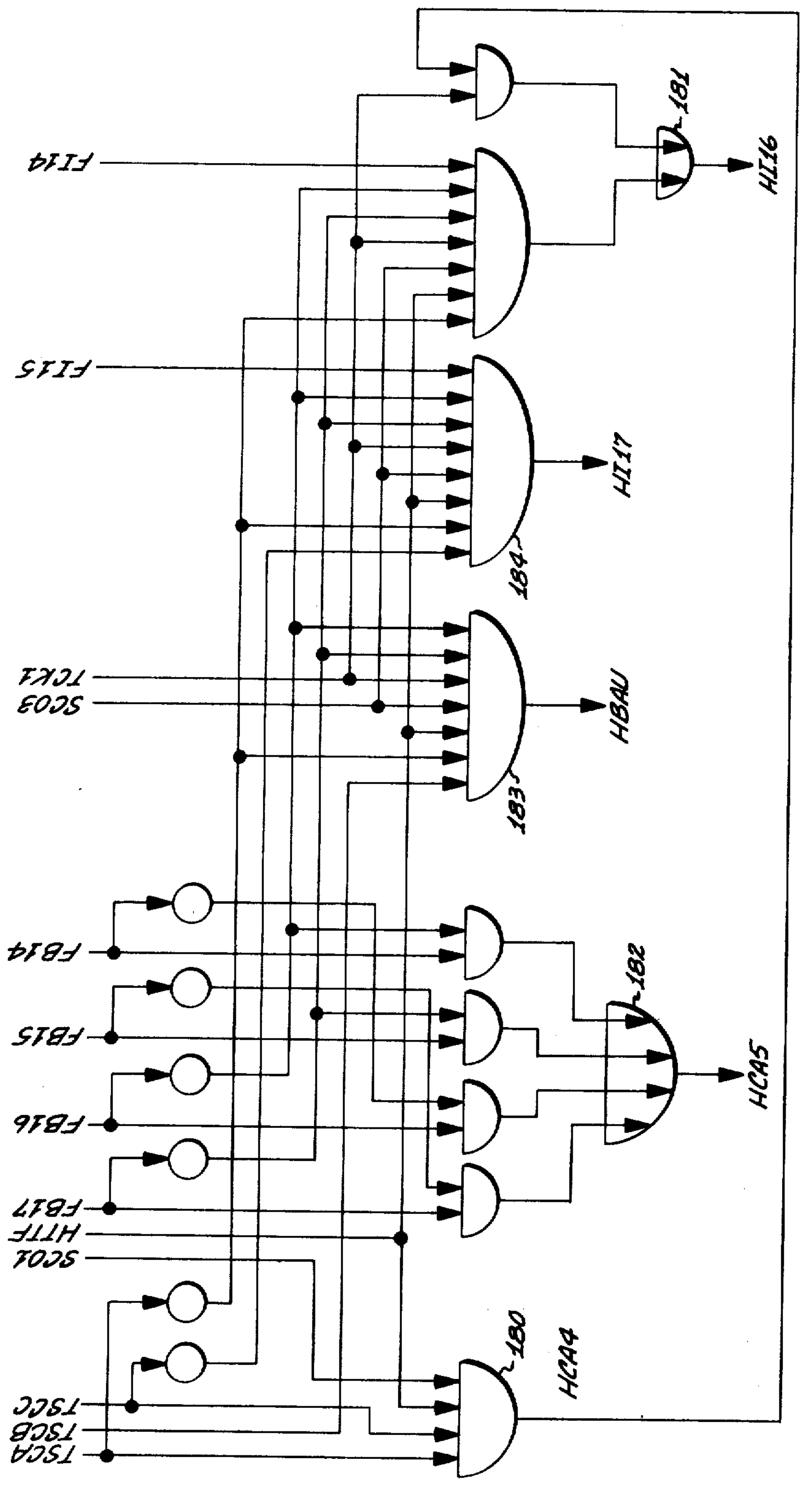
Figure 10C:
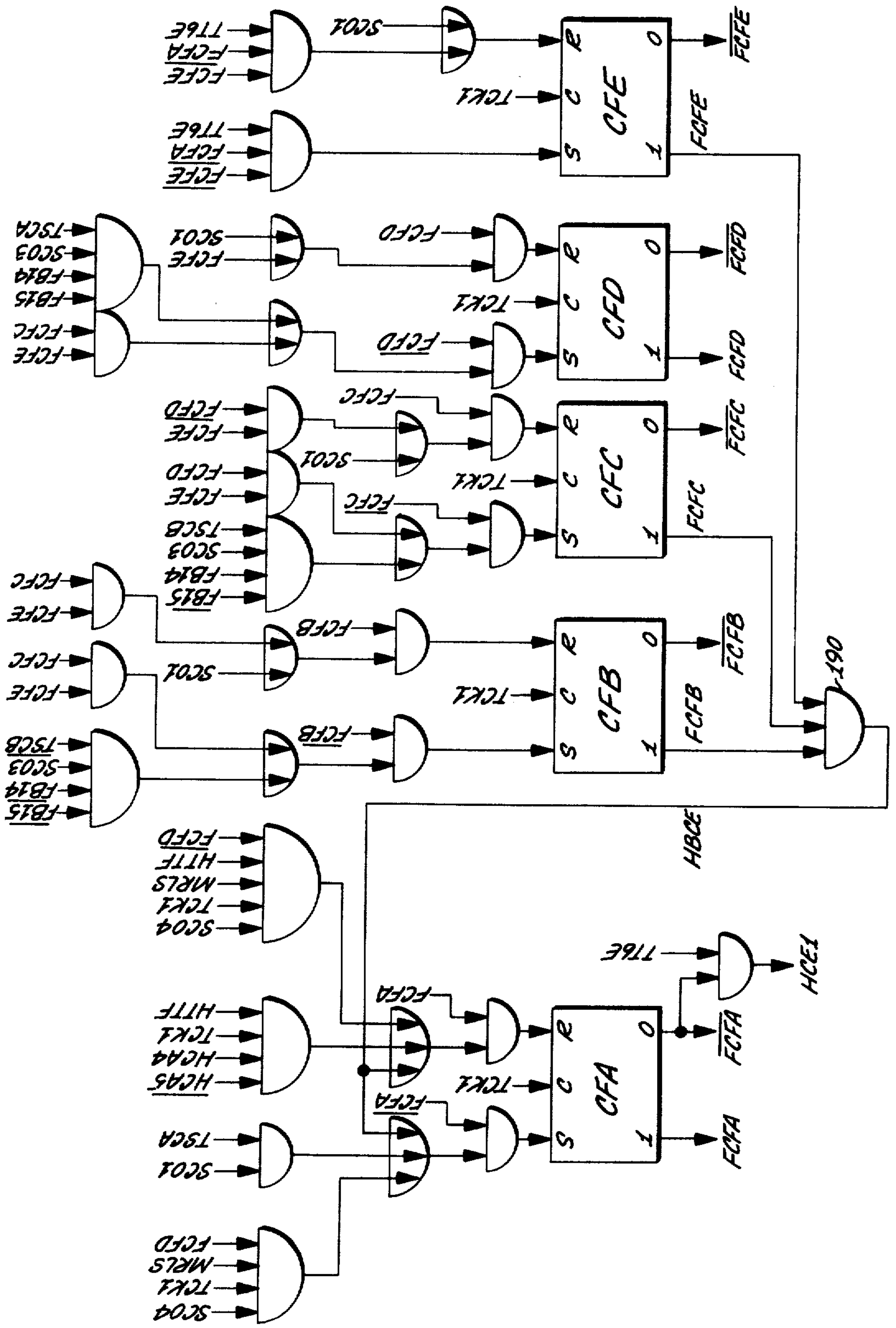
Figure 11:
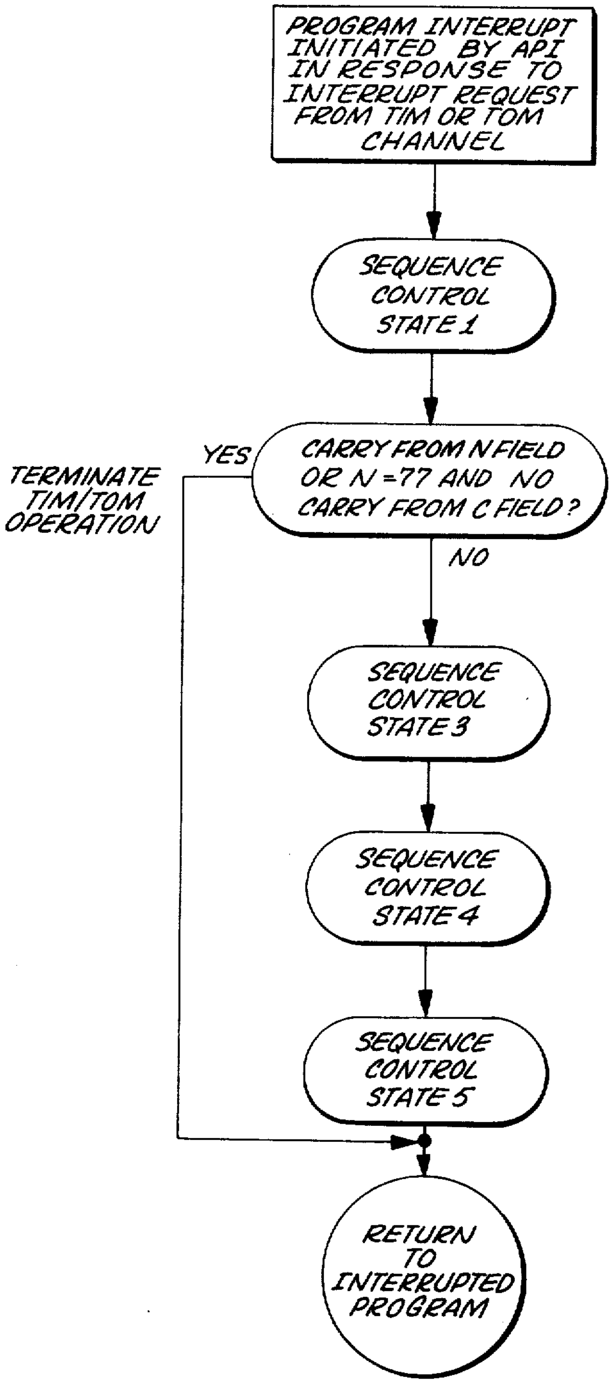
Figure 12:
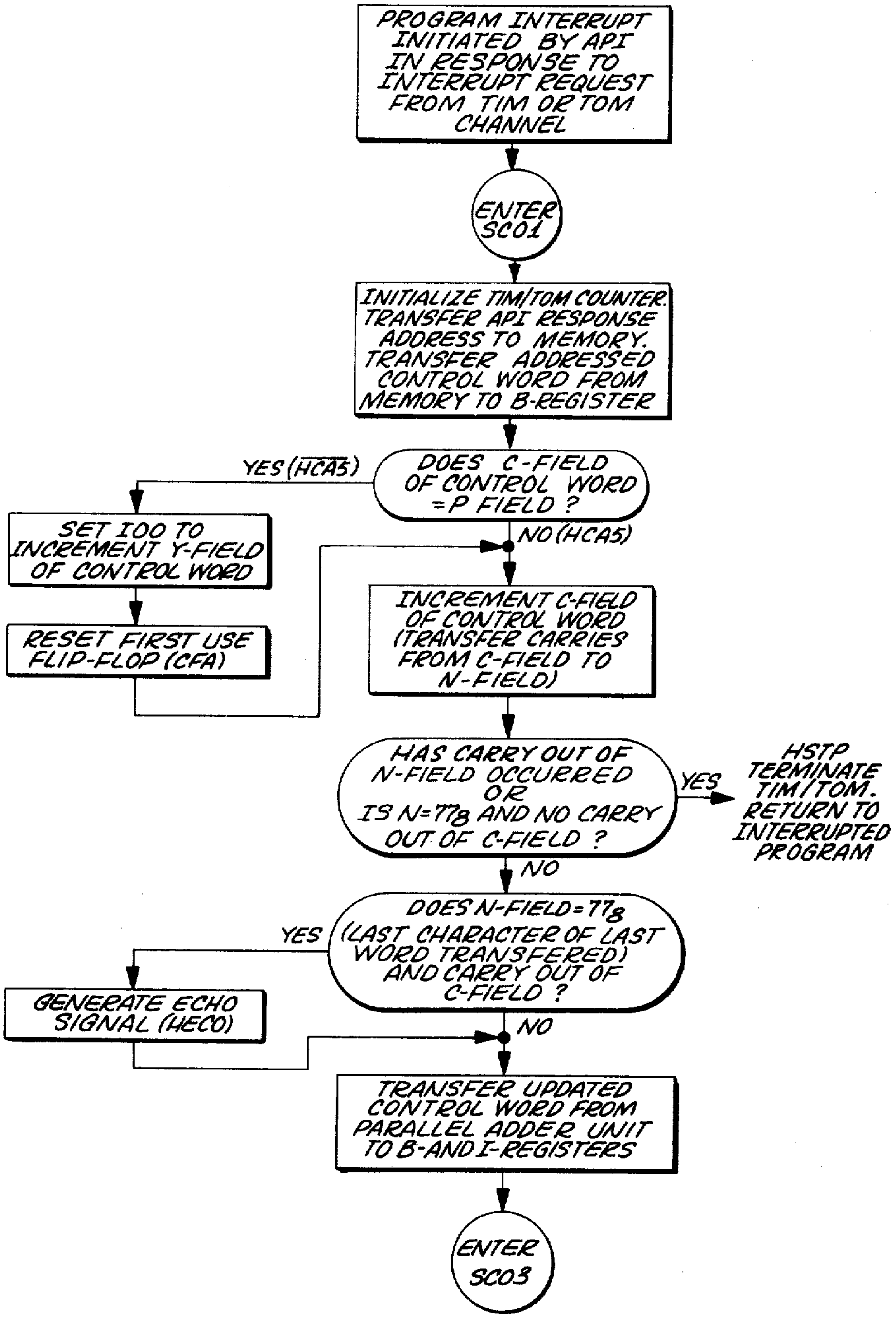
Figure 13:
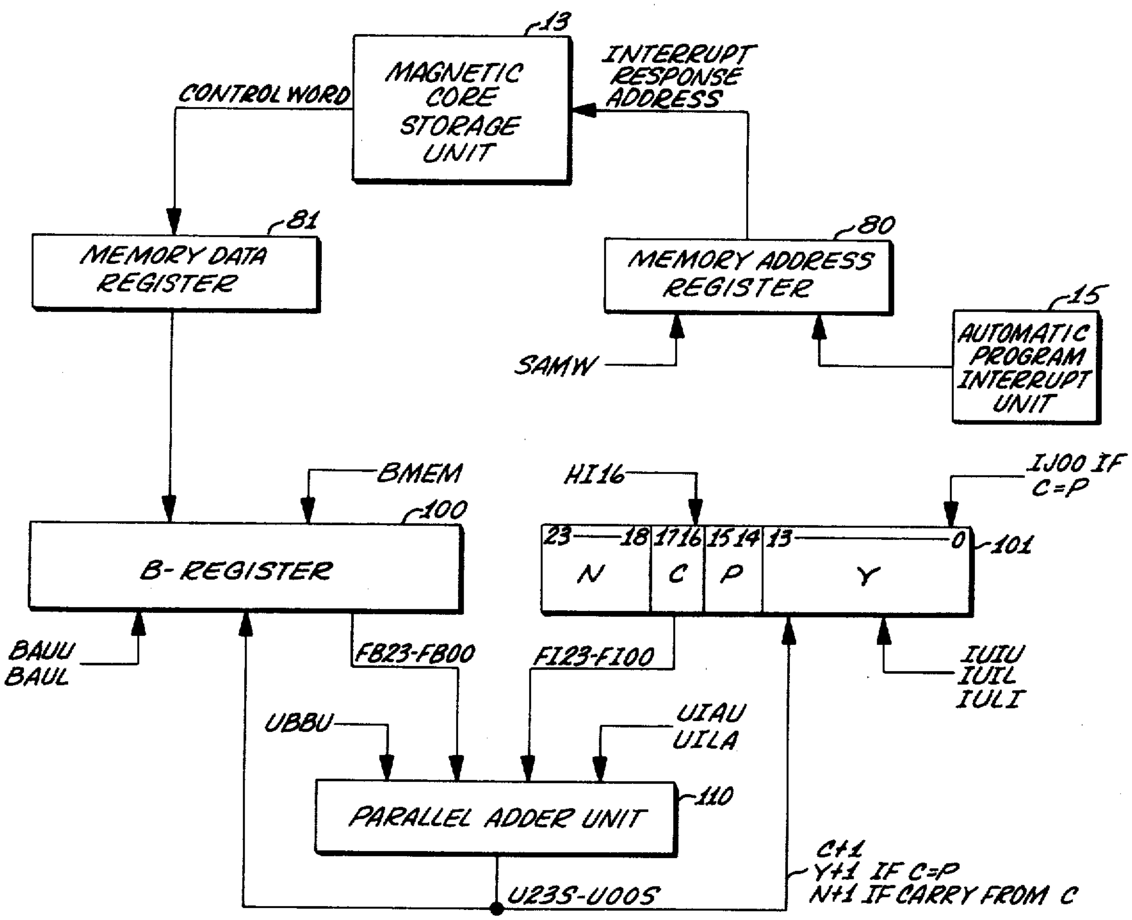
Figure 14:
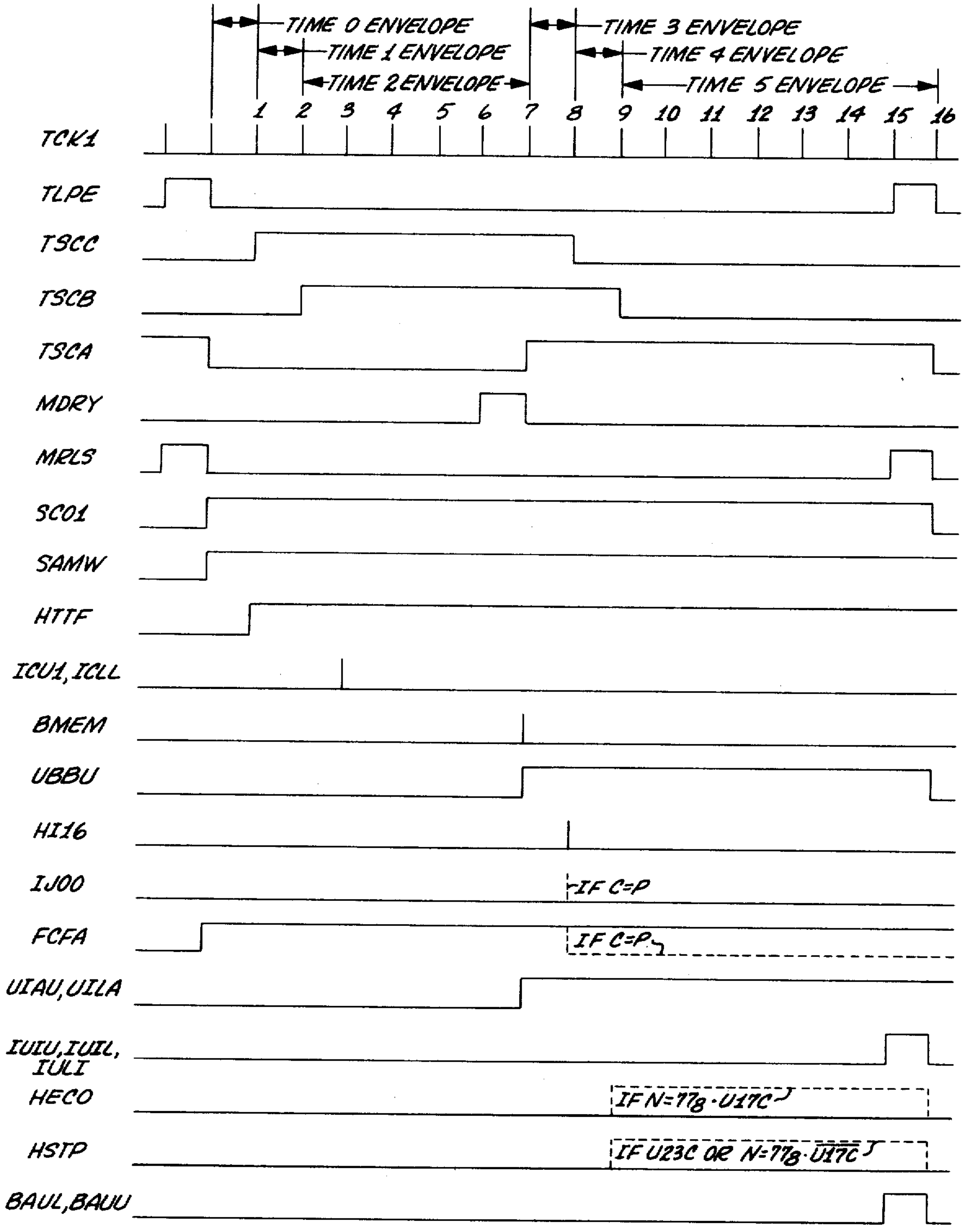
Figure 15:
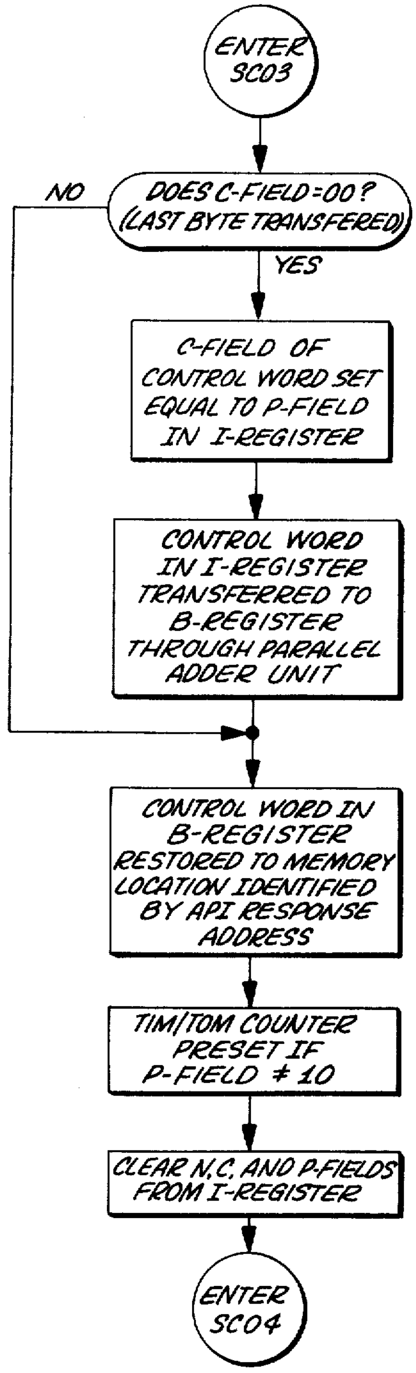
Figure 16:
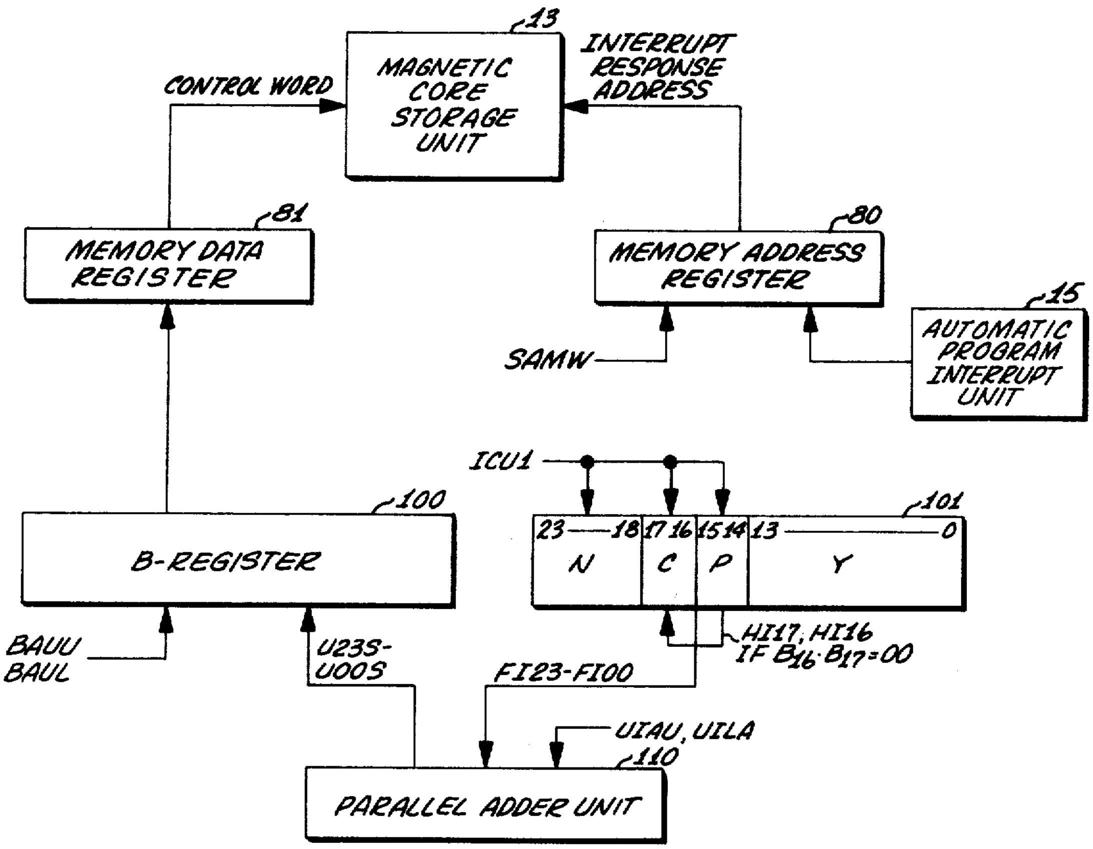
Figure 17:
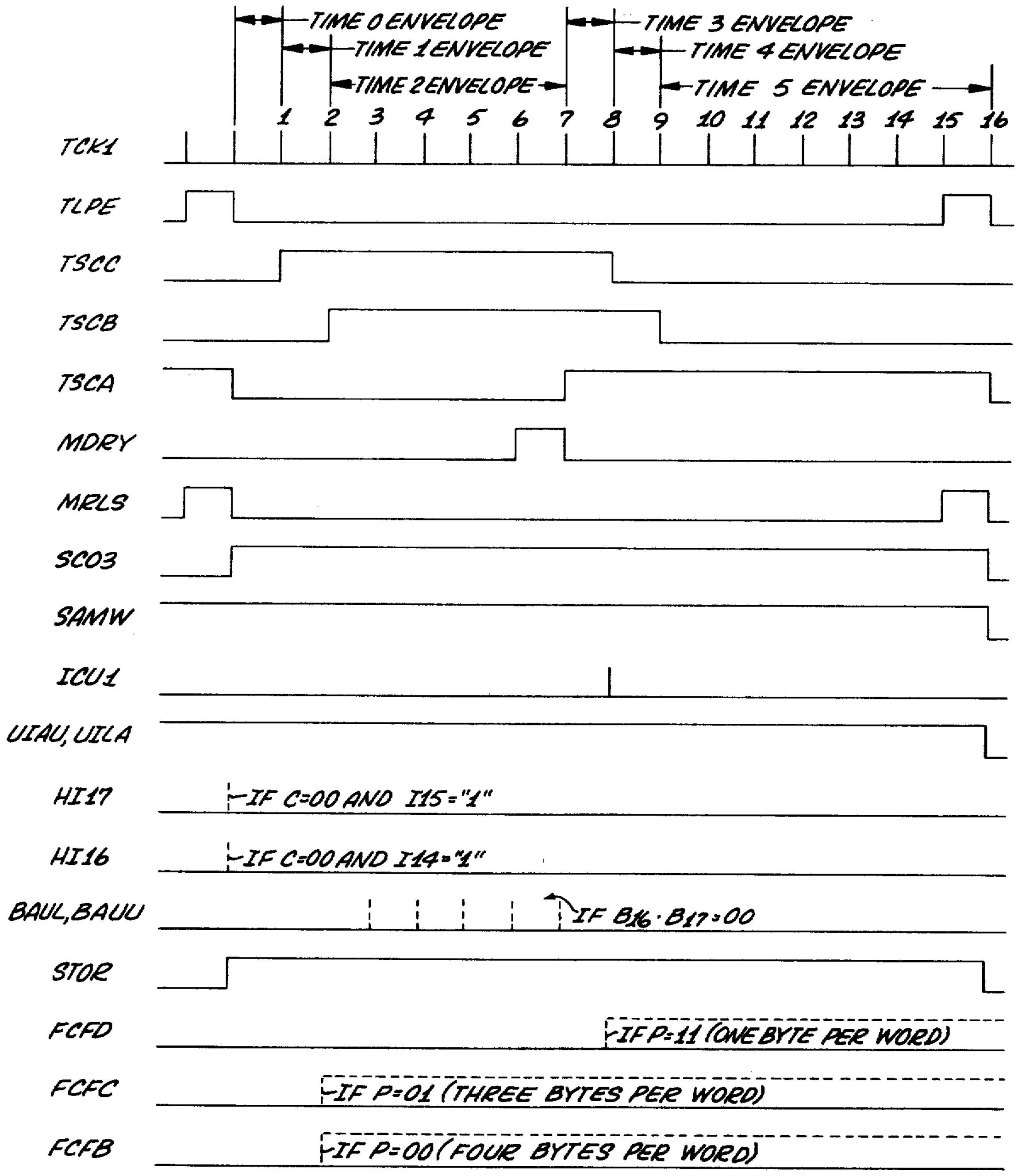
Figure 18:
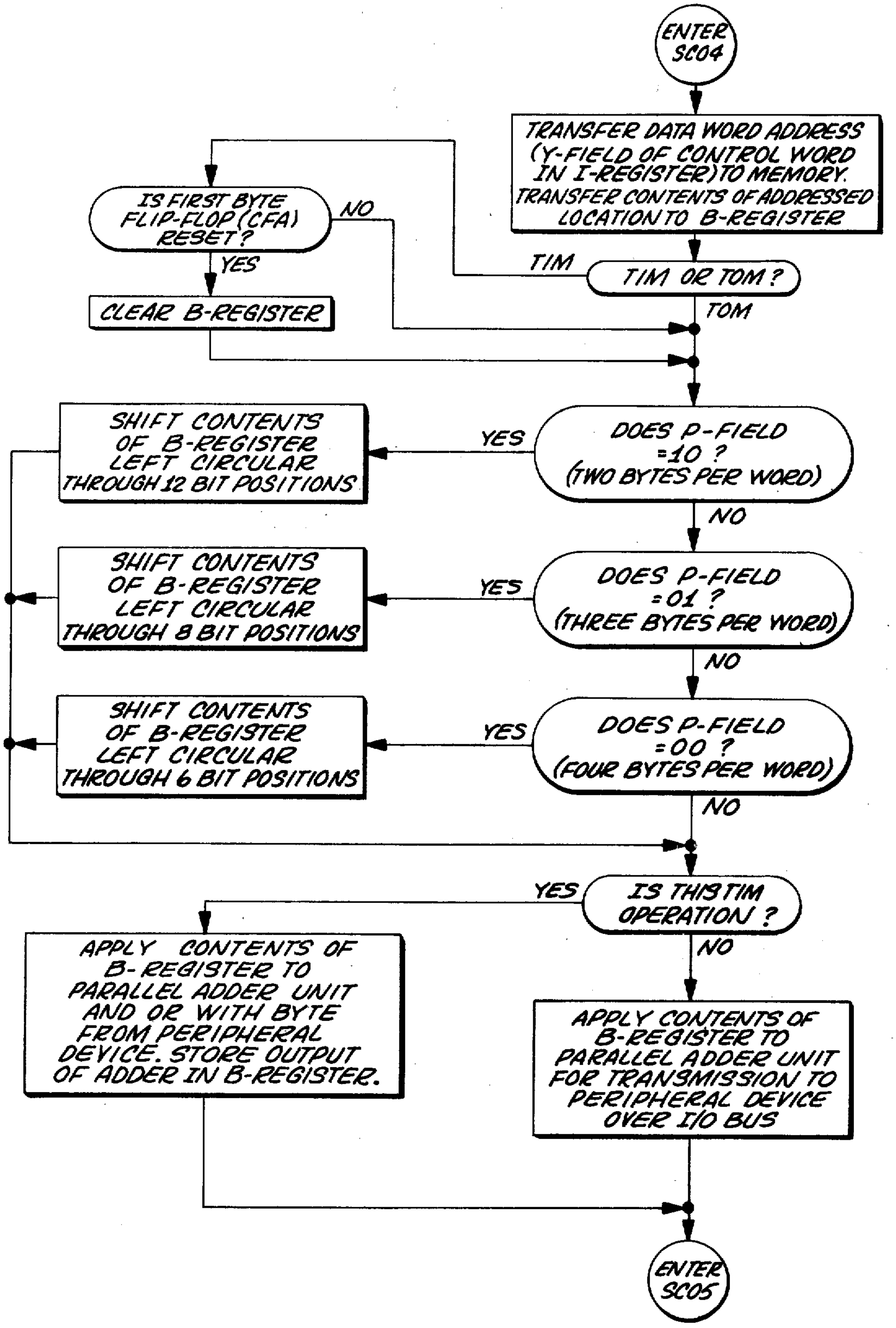
Figure 19:
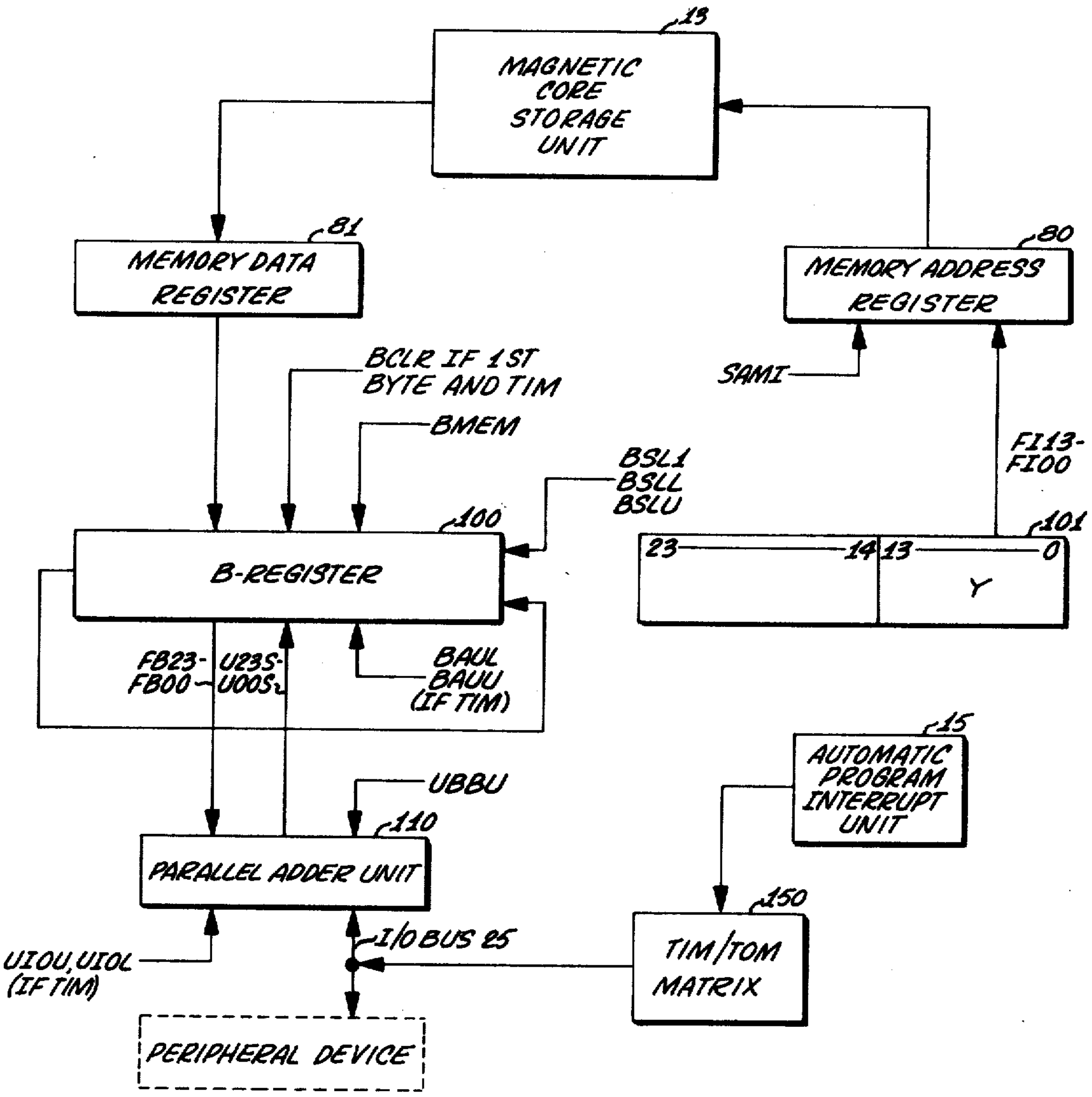
Figure 20:
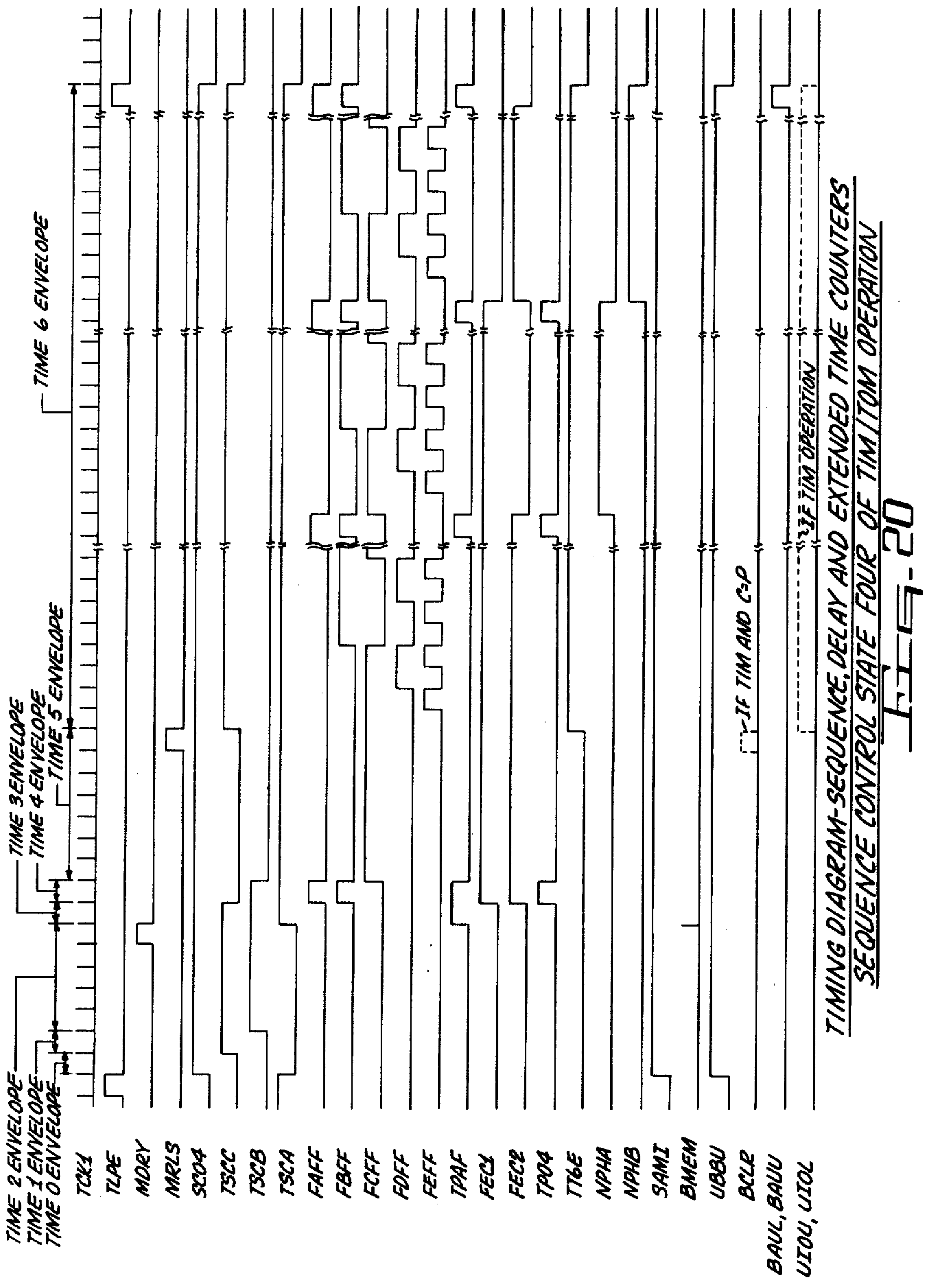
Figure 21:
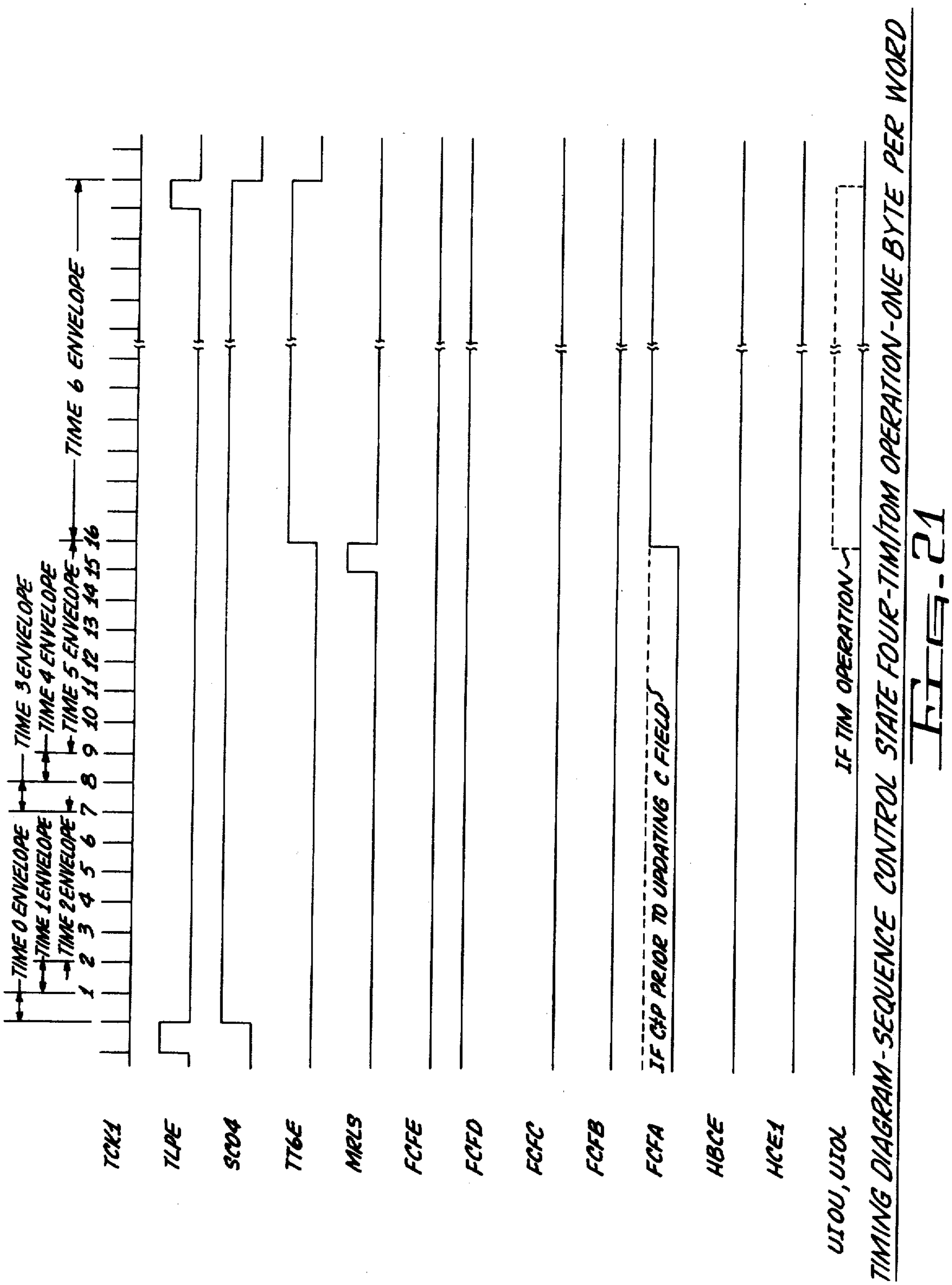
Figure 22:
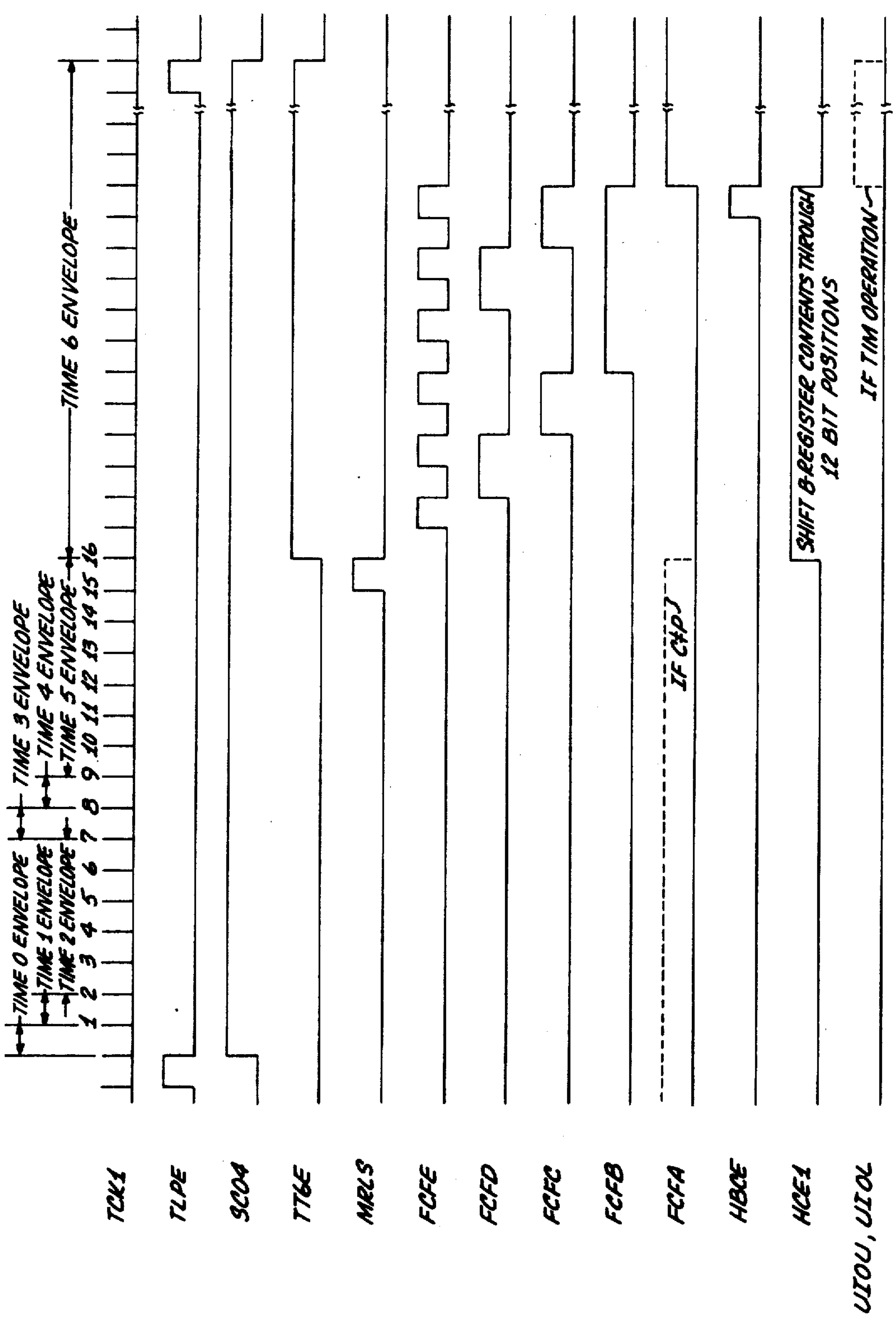
Figure 23:
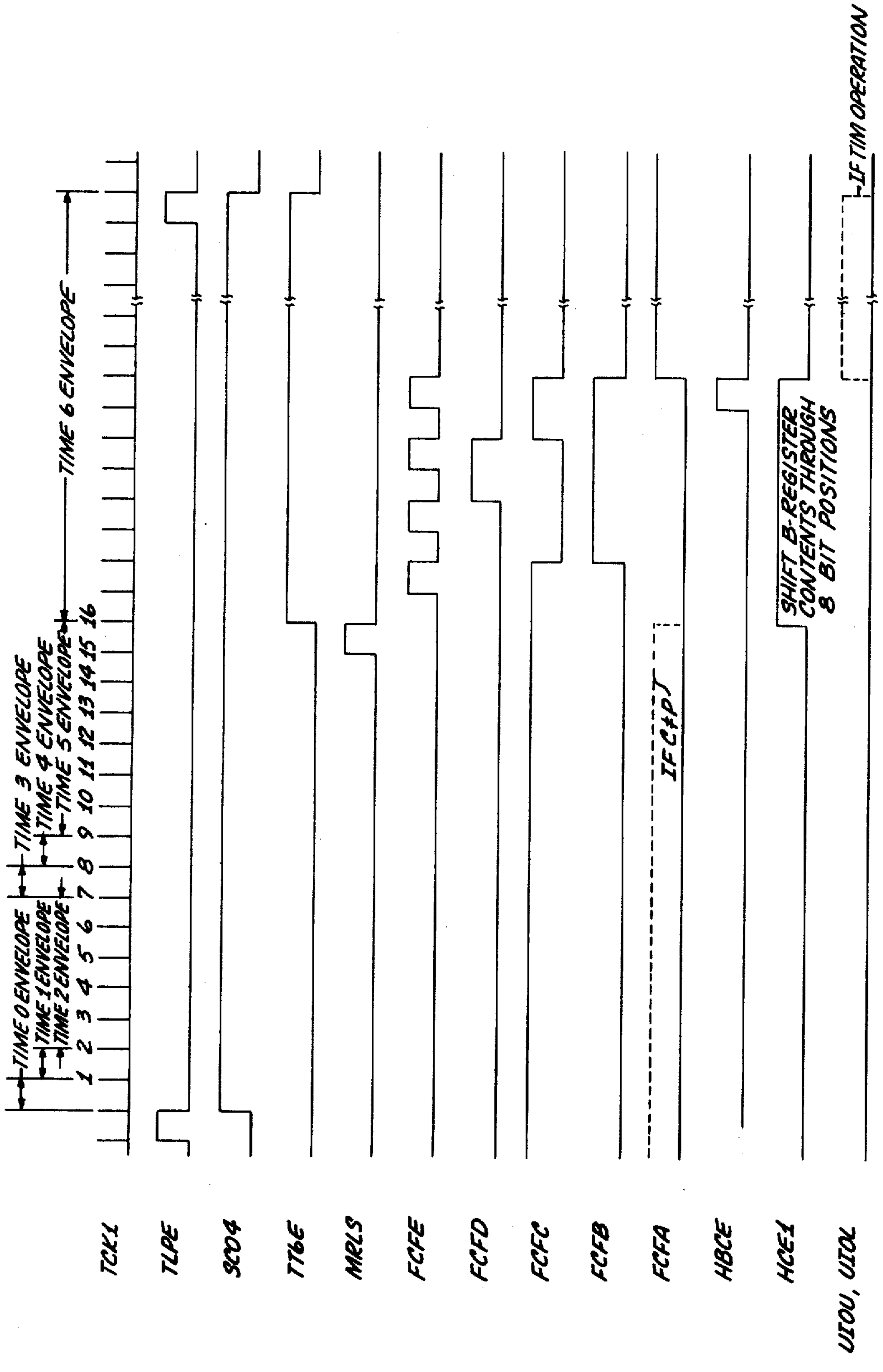
Figure 24:
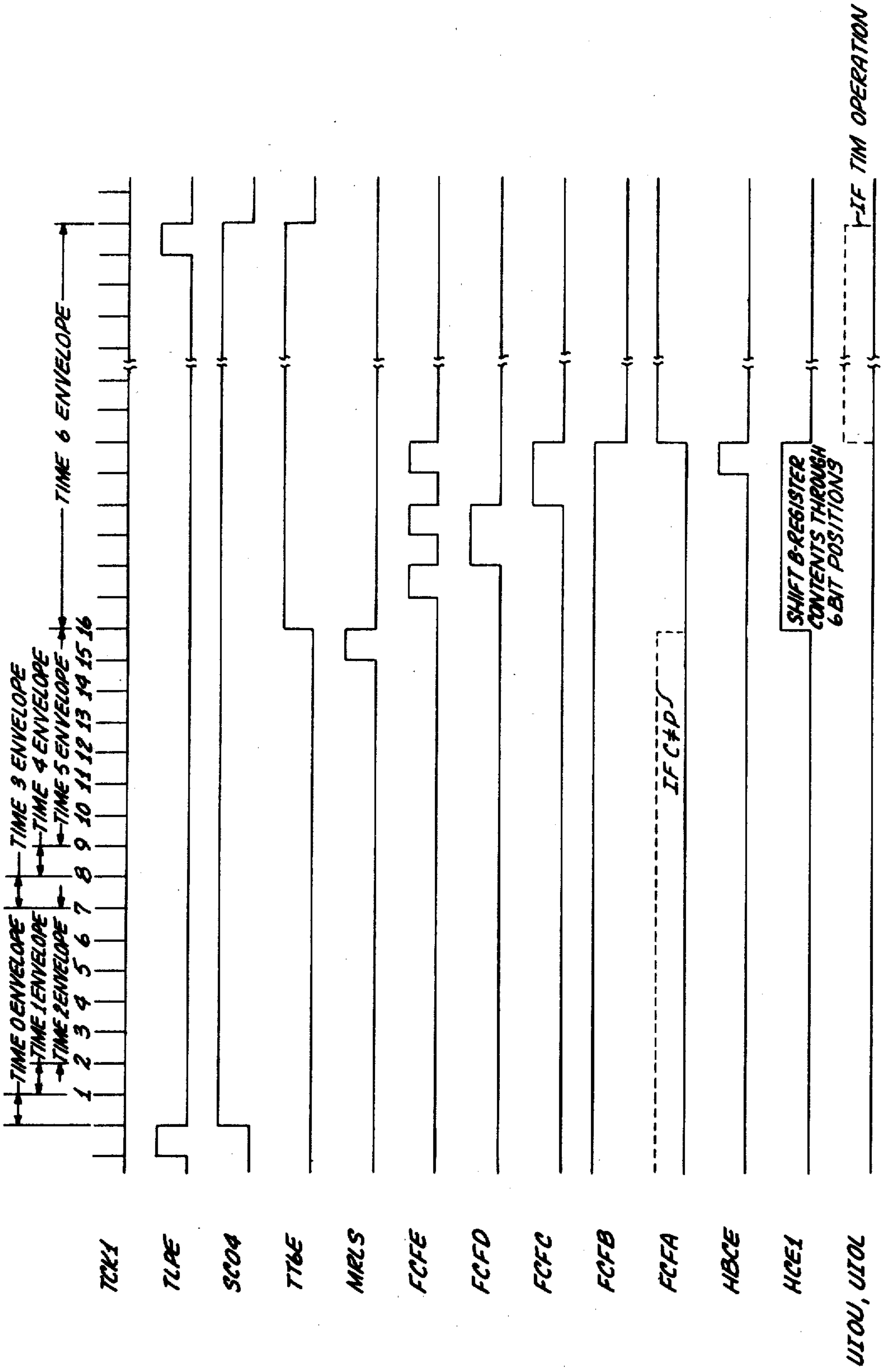
Figure 25:
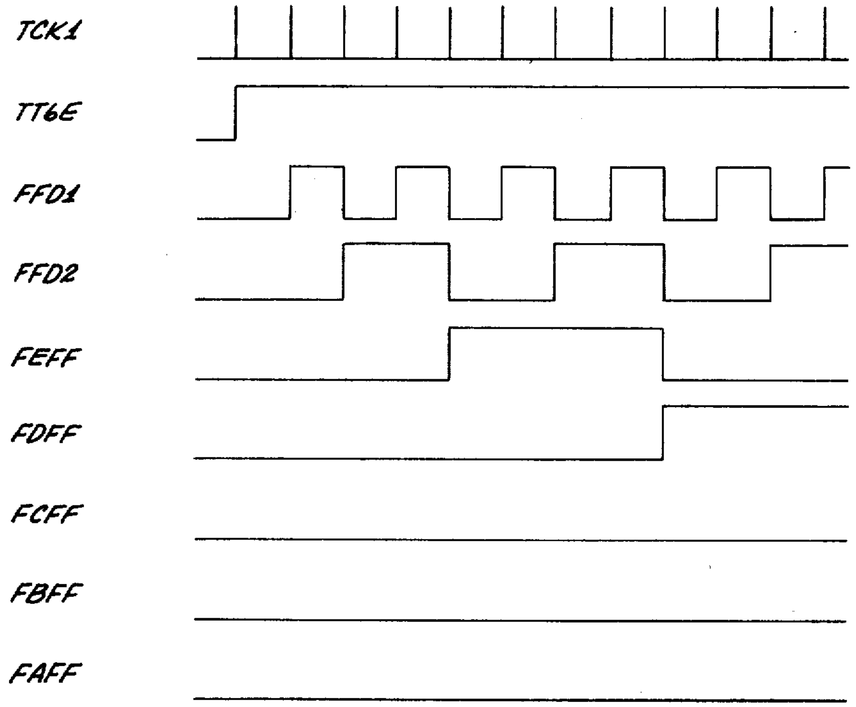
Figure 26:
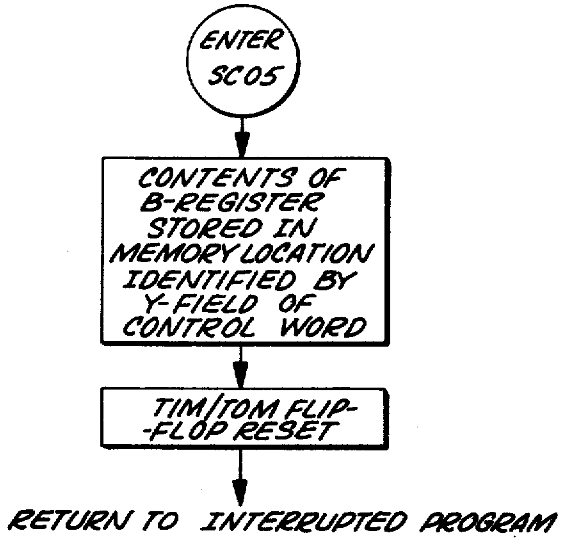
Figure 27:
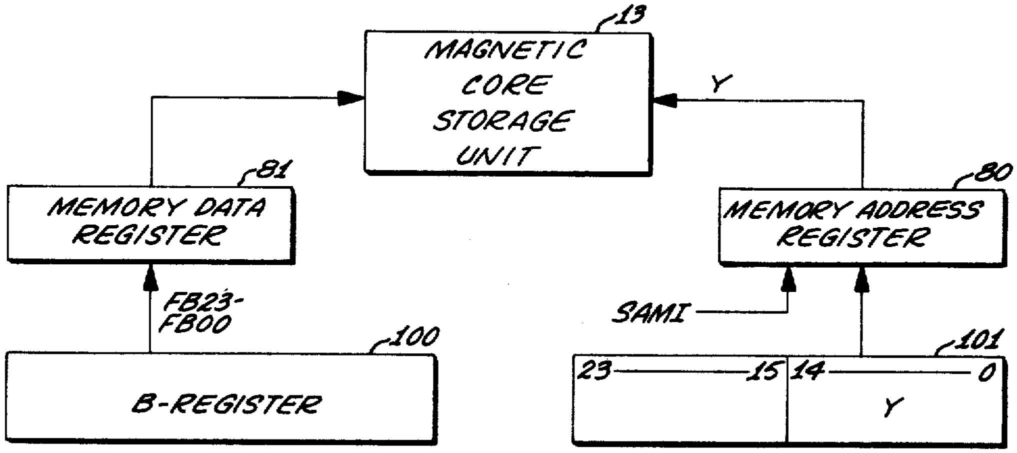
Figure 28:
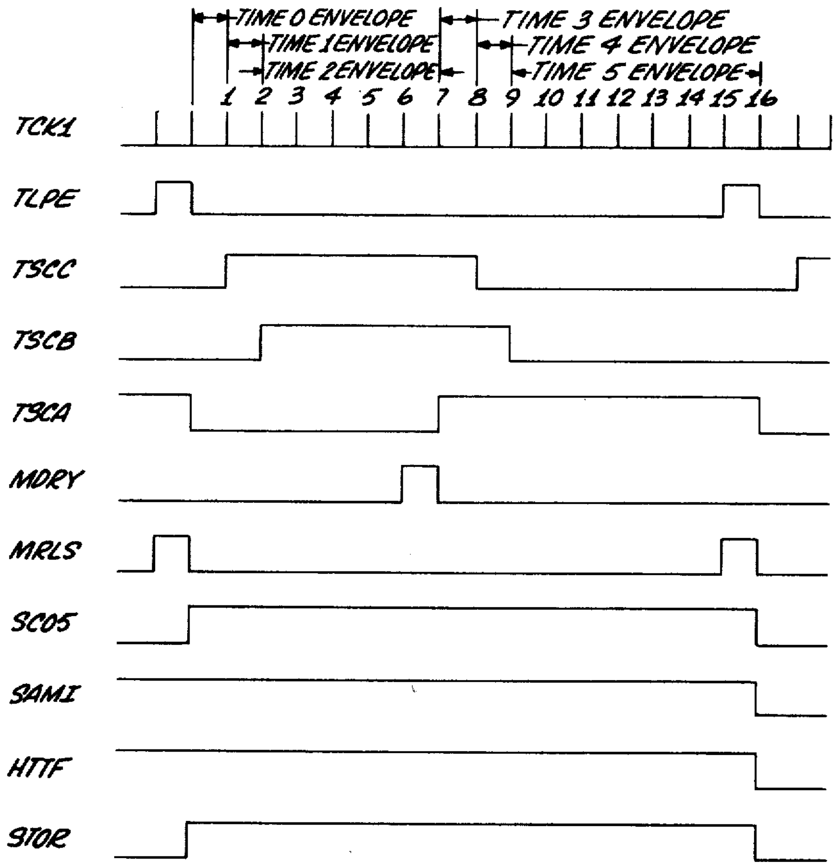

FIGS. *2a–2e* are symbolic diagrams illustrating the organization of the various types of word formats employed in the computer system of FIG. 1;

FIGS. *3a–3g* illustrate symbols employed to represent circuit elements in the computer ssytem of FIG. 1;

FIG. 4 is a block diagram illustrating the information storage elements, the information and control signal transfer paths between these elements, and the major control elements of the computer system of FIG. 1;

FIG. 5 is a block diagram illustrating the organization of the clock generator employed in the computer system of FIG. 1 and illustrating the wave form of the basic clock signal provided by the clock generator for use in the system;

FIG. 6 is a block diagram illustrating the details of the Timing Control Unit of the Arithmetic and Control Unit in the system of FIG. 1;

FIG. 7 is a block diagram illustrating the data transfer paths in the computer system during a table input to memory (TIM) operation for transferring data from a peripheral device to memory and during a table output from memory (TOM) operation for transferring data from memory to a peripheral device;

FIG. 8 is a block diagram illustrating the primary information storage and control elements of the system of FIG. 1 employed in a TIM or a TOM operation and the information and control signal transfer paths between these elements;

FIG. 9 is a logic diagram illustrating the details of the TIM/TOM matrix of the computer system;

FIGS. 10*a*–10*c* are logic diagrams illustrating the logical details of the TIM/TOM control unit of the computer system of FIG. 1;

FIG. 11 is a flow diagram identifying the sequence control states employed in the computer system of FIG. 1 during performance of TIM/TOM operations;

FIG. 12 is a flow diagram illustrating the operations performed in the computer system during Sequence Control State 1 of a TIM or a TOM operation;

FIG. 13 is a block diagram illustrating the major information flow paths between various elements of the Arithmetic and Control Unit of the system during Sequence Control State 1 of a TIM or TOM operation;

FIG. 14 is a timing diagram illustrating the timing sequence of signals which cause the information movement indicated in FIG. 13 and also illustrating the relationship of the signals with timing signals generated in the Timing Control Unit of FIG. 6;

FIG. 15 is a flow diagram illustrating the operations performed in the computer system during Sequence Control State 3 of a TIM or a TOM operation;

FIG. 16 is a block diagram illustrating the major information flow paths between various elements of the Arithmetic and Control Unit and the system during Sequence Control State 3 of a TIM or TOM operation;

FIG. 17 is a timing diagram illustrating the timing sequence of signals which cause the information movement indicated in FIG. 15 and also illustrating the relationship of the signals with timing signal generated in the Timing Control Unit of FIG. 6;

FIG. 18 is a flow diagram illustrating the operations performed in the computer system during Sequence Control State 4 of a TIM or a TOM operation;

FIG. 19 is a block diagram illustrating the major information flow paths between various elements of the Arithmetic and Control Unit during Sequence Control State 4 of a TIM or a TOM operation;

FIG. 20 is a timing diagram illustrating the timing sequence of signals which cause the information movement indicated in FIG. 19 and also illustrating the relationship of these signals with timing signals generated in the Timing Control Unit of FIG. 6;

FIG. 21 is a timing diagram illustrating the operation of the TIM/TOM counter in conjunction with related timing and logic signals during Sequence Control State 4 of a TIM or a TOM operation when the TIM or TOM control word specifies one byte in each word transferred between memory and a peripheral device;

FIG. 22 is a timing diagram illustrating the operation of the TIM/TOM counter in conjunction with related timing and logic signals during Sequence Control State 4 of a TIM or a TOM operation when the TIM or TOM control word specifies two bytes in each word transferred between memory and a peripheral device;

FIG. 23 is a timing diagram illustrating the operation of the TIM/TOM counter in conjunction with related timing and logic signals during Sequence Control State 4 of a TIM or a TOM operation when the TIM or TOM control word specifies three bytes in each word transferred between memory and a peripheral device;

FIG. 24 is a timing diagram illustrating the operation of the TIM/TOM counter in conjunction with related timing and logic signals during Sequence Control State 4 of a TIM or a TOM operation when the TIM or TOM control word specifies four bytes in each word transferred between memory and a peripheral device;

FIG. 25 is a timing diagram illustrating the timing sequence of signals in the Delay Time Counter and the Frequency Divider of the Timing Control Unit of FIG. 6 when information transfer with a peripheral device is effected through a low-speed channel;

FIG. 26 is a flow diagram illustrating the operations performed in the computer system during Sequence Control State 5 of a TIM or a TOM operation;

FIG. 27 is a block diagram illustrating the major information flow paths between various elements of the Arithmetic and Control Unit during Sequence Control State 5 of a TIM or a TOM operation;

FIG. 28 is a timing diagram illustrating the timing sequence of signals which cause the information movement indicated in FIG. 27 and also illustrating the relationship of these signals with timing signals generated in the Timing Control Unit of FIG. 6;

FIGS. 29*a*–29*i* illustrate a typical TOM operation in the computer system of FIG. 1; and FIGS. 30*a*-30*g* illustrate a typical TIM operation in the computer system of FIG. 1.

DESCRIPTION OF THE PREFERRED EMBODIMENT

Computer system—General

FIG. 1 illustrates diagrammatically a typical computer system organized to control or monitor a process. The major units of the computer system are Arithmetic and Control Unit 10, Memory 11 comprising Memory Multiplexer 12 and Magnetic Core Storage Unit 13. Bulk Storage Memory 14, which may comprise a disc or drum storage unit, Automatic Program Interrupt Unit 15, Input/Output Expander 18, Peripheral Input/Output Buffer 16, Peripheral Devices 17, Analog Input Scanner 19, Digital Input Scanner 20, Multiple Output Distributor 21 and Computer Console 22. Peripheral Devices 17, connected to Peripheral Input/Output Buffer 16, may include, for example, an input/output typer, a logging typer, an alarm typer, a tape or card punch and a tape or card reader. A Peripheral Controller 23 may also be connected to Memory Multiplexer 12 with Peripheral Devices 24 communicating with Memory 11 through Peripheral Controller 23. Peripheral Devices 24 may include, for example, data links, high-speed printers, card readers, card punches, magnetic tape units, or disc storage units. The lines interconnecting the various units illustrated in FIG. 1 represent symbolically paths of information and control signal transfer in the computer system.

The computer system responds to a plurality of distinct instructions which are supplied in the sequential order necessary to perform particular processing, control and monitoring functions. Magnetic Core Storage Unit 13 of Memory 11 stores data words which are to be processed, data words which are the result of processing, data words representing process parameters and other process information, instruction words and auxiliary words for addressing and control. Memory Multiplexer 12 includes control circuitry to permit transfer of information between Magnetic Core Storage Unit 13 and Arithmetic and Control Unit 10, Bulk Storage Memory 14 and Peripheral Controller 23.

Bulk Storage Memory 14 may comprise drum or disc storage units or magnetic tape storage units used for storing large quantities of information or instruction routines which can be transferred to Magnetic Core Storage Unit 13 as required for use in the computer system.

Arithmetic and control unit 10 controls the sequence of events required for instruction execution in the computer system, performs binary arithmetic operations, and serves as a path for transfer of information between Memory 11 and Peripheral Input/Output Buffer 16 and Input/Output Expander 18. Arithmetic and Control Unit 10 contains the logical elements necessary to access Memory 11 and to perform all operations required for instruction execution. Arithmetic and Control Unit 10 communicates with Memory 11 to obtain instruction words, auxiliary words, data words on which operations are to be performed, to store data words on which operations have been performed, to obtain or store data words representing process parameters and other process information and to obtain control signals for synchronizing the timing of Arithmetic and Control Unit 10 with operations in Memory 11.

Peripheral Input/Output Buffer 16 communicates with Arithmetic and Control Unit 10 through Input/Output Expander 18 and serves as a data buffer, translator, and sequencer for Peripheral Devices 17. Peripheral Input/Output Buffer 16 includes a plurality of channels, each connected to one of Peripheral Devices 17 to handle the data transfers between Memory 11 and that device. A plurality of Peripheral Input/Output Buffers maybe provided to communicate with Arithmetic and Control Unit 10 through Input/Output Expander 18 when the peripheral device requirements of a specific system exceed the capacity of a single Peripheral Input/Output Buffer.

Input/Output Expander 18 is a communication link between Arithmetic and Control Unit 10 and Peripheral Input/Ouput Buffer 16 and between Arithmetic and Control Unit 10 and the input and output devices connected to the control and/or monitored process. Input/Output Expander 18 is connected to Arithmetic and Control Unit 10 through I/O Bus 25. Input/Output Expander 18 serves as a multiplexer for digital and analog inputs from the process and as a multiplexer and amplifier for output signals to the process. Signal inputs may be from contact closures, pulse generators, or measuring devices. Input/Output Expander 18 communicates corrective or alarm information to the process to change the process control variable or to activate the proper alarm devices or displays. A plurality of Input/Output Expanders may be connected to Arithmetic and Control Unit 10 if the requirements of the system exceed the capacity of a single Input/Output Expander. Arithmetic and Control Unit 10 employs the control information stored in Memory 11 to decide whether control or alarm actions are required and provides the necessary control or alarm information to Input/Output Expander 18. Input/Output Expander 18 also provides a transfer path for information transmitted between Arithmetic and Control Unit 10 and Peripheral Input/Output Buffer 16.

Analog Input Scanner 19 selects and amplifies process analog sensor signals and also converts analog information into a digital form compatible with that used in Arithmetic and Control Unit 10 and other system elements. The digital output signals of Analog Input Scanner 19 are transmitted to Arithmetic and Control Unit 10 through Input/Output Expander 18.

Digital Input Scanner 20 selects and conditions, by filtering, amplifying and attenuating, contact or digital process inputs. The output signals of Digital Input Scanner 70 are applied to Arithmetic and Control Unit 10 through Input/Output Expander 18. Multiple Output Distributor 21 receives digital, decimal and analog outputs from Input/Output Expander 18 and transmits this information to the controlled and/or monitored process and to operator displays.

Automatic Program Interrupt Unit 15 detects and identifies program interrupt signals from Peripheral Input/Output Buffer 16 and Peripheral Controller 23 indicating that a peripheral device is ready to perform a data transfer. Automatic Program Interrupt Unit 15 also detects signals which indicate condition changes in the controlled and/or monitored process. Upon detection of interrupt request signals, Automatic Program Interrupt Unit 15 causes a word to be transferred to Arithmetic and Control Unit 10 from the memory location identified by the memory address supplied by Automatic Program Interrupt Unit 15, corresponding to the highest-priority interrupt request present at that time. This word may be a single instruction word or the first instruction of a subroutine, or may be a control word for directing an information transfer with a perpiheral device.

Computer Console 22 provides a communication path between the operator and computer system for programming and maintenance. In addition, Computer Console 22 is provided with visual displays illustrating the instantaneous states of various registers and elements within Arithmetic and Control Unit 10 to aid the operator in monitoring system and program performance.

INFORMATION REPRESENTATION

The computer system of FIG. 1 stores and processes information represented by the binary code. In the binary code each element of information is represented by a binary digit, sometimes termed a "bit," each binary digit being either a "1" or a "0." In the computer system, a binary "0" is represented by a potential of approximately 0 volts or ground while a binary "1" is represented by a positive potential relative to ground. The fundamental unit of information employed in processing and communication in the described system is the word, each word comprising 24 binary digits. The first binary digit or bit of a data word is termed the most-significant digit (MSD) of the word and is designated as bit 23. The last binary digit of the word is termed the least-significant digit (LSD) of the word and is designated as bit 0. The binary digits between bits 23 and 0 are accorded successively decreasing order of significance.

Three general categories of words are employed in the computer system of FIG. 1, viz.: (1) data words, (2) instruction words, and (3) auxiliary words for address and control. Auxiliary words are of the following types:

(a) index word
(b) TIM/TOM control word

The organization of each type of word is illustrated in FIGS. 2*a*–2*e*.

Data words

Figure 2A:
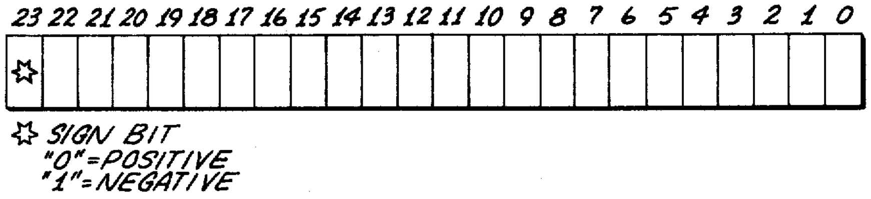

Data in the computer system of FIG. 1 is in fixed-point binary form. Each binary data word represents a single number. The binary digit in bit position 23 of the data word, termed bit 23, identifies the sign of the binary data word. The orginzation of a binary data word is illustrated in FIG. 2*a*. Bit 23 is the MSD and bit 0 is the LSD of the binary data word. Bit 0 of the binary data word thus represents $2^0$ and is equal to the decimal number 1, if bit 0 is a binary 1. Bit 1 represents $2^1$ and is equal to the decimal number 2 if bit 1 is a binary 1. Bit 5 represents $2^5$ and is equal to the decimal number 32, if bit 5 is a binary 1. Thus, in general, the $(i)$th bit of the binary data word represents $2^i$ if the $(i)$th bit is a binary 1. The $(i)$th bit represents 0 if the bit is a binary 0. During information transfers between Memory 10 and certain peripheral devices, the binary data words being transferred are selectively divided into 2 bytes of 12 bits each, 3 bytes of 8 bits each or 4 bytes of 6 bits each.

Positive binary data words are stored and operated upon in true binary while negative binary data words are stored and operated upon in two's complement form. The two's complement of a binary number is its one's complement increased by one. The one's complement of a binary number is the number which results when each binary 1 in the number is replaced by a binary 0 and each binary 0 is replaced by a binary 1. For convenience, a binary word may be more compactly represented by a series of "octal" digits in which each octal digit represents three adjacent binary digits.

Instruction words

Operations for accomplishing processing and control are preformed in the computer system under the control of a series of instruction words which are stored in Magnetic Core Storage Unit 13 and executed one at a time. The sequence in which instructions are executed is called the P-Sequence or Program Sequence and is controlled by a counter. Instruction words executed by the computer system of FIG. 1 are of five types, viz full operand, quasi, Gen I, Gen II and Gen III instructions.

Figure 2B:
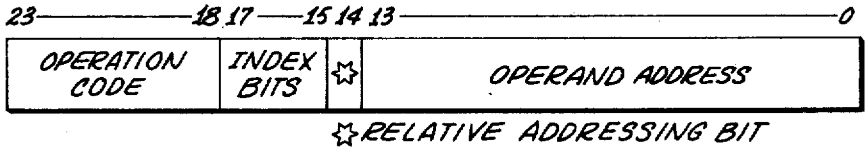

The organization of full operand and quasi instruction words is illustrated in FIG. 2*b*. Full operand instruction words are most commonly used in the computer system of FIG. 1. These instructions are used to perform arithmetic operations, logical operations, index control operations, and data transfers to and from Memory 10. The operation code of a full operand instruction word (bits 23–18) identifies the operation or program step to be performed. The operand address field (bits 13–0) designates the address of a storage location in Memory 10 from which a word is to be extracted for processing or control or in which a word is to be stored during execution of the instruction.

Quasi instruction words are utilized to initiate quasi subroutines which perform special functions. The address in Memory 10 of the first instruction word in a quasi subroutine is defined by the operation code of the quasi instruction word. The operand address field of the quasi instruction word is stored in memory during execution of the quasi subroutine.

Bits 15–17 of the instruction word illustrated in FIG. 2*b* are index bits which are employed to indicate whether the operand address of the instruction word is to be modified by an index quantity and, if index modification is specified, the location in memory of the index quantity. If bits 17–15 of an instruction word are all binary 0's, no index modification will occur when the command word is transferred to Arithmetic and Control Unit 10 for execution. If bits 17–15 are any other possible combination (001–111), the operand address of the instruction word will be modified by adding to it the contents of the memory location designated by the index bits ($00001_8$–$00007_8$).

Modification of the operand address of an instruction word may also be effected under control of bit 14, termed the relative addressing bit, of the instruction word. If bit 14 is a binary 1, the final address of the operand is automatically determined in the computer system relative to the address of the instruction being executed. Relative addressing permits the instructions of a program to address other memory locations by specifying the number of memory locations between the instruction location and the desired memory location. Programs so written are easily relocated and executed anywhere in memory.

Figure 2C:
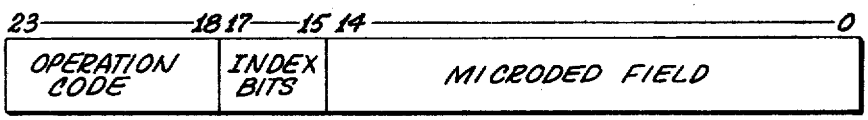

The organization of a Gen I, Gen II or Gen III instruction word is illustrated in FIG. 2*c*. The operation code of the instruction word (bits 23–18) identifies the instruction as a Gen I instruction, a Gen II instruction or a Gen III instruction. Bits 14–0 comprise a microcoded field which is employed to specify a plurality of sub-operations to be performed under control of the operation code. As with the full operand and quasi instructions, the microcoded field may be modified by an index quantity specified by the index bits 17–15. Gen I commands are used primarily to effect bit manipulation within the principal accumulator or A-Register of Arithmetic and Control Unit 10. Gen II commands are employed within the computer system to (a) select peripheral devices, (b) transfer data to or from these devices, and (c) provide for program control transfers as determined by various internal or external conditions to which the system is responsive. Gen III commands are used to manipulate the contents of the principal accumulator or A-Register and the secondary accumulator or Q-Register and to affect other elements within Arithmetic and Control Unit 10.

Auxiliary words

The computer system permits address modification to materially reduce total processing time and program memory requirements. During instruction processing, the system follows this general sequence:

(1) The instruction word is obtained from memory.

(2) Any address development specified by the indexing bits or the relative addressing bit is performed.

(3) The instruction is executed.

Figure 2D:
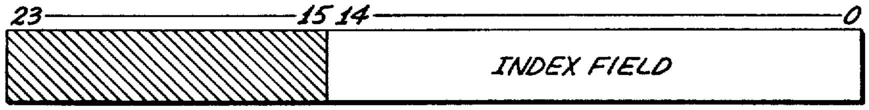

The address development specified by the index bits in step (2) of the above sequence is effected in the computer system by the use of index words. The organization of an index word is illustrated in FIG. 2*d*. In operand address or microcoded field development employing an index word, the index field (bits 14–0) of the index word is added to the operand address field or microcoded field of the instruction word. The instruction is then executed using the modified operand address or modified microcoded field.

Figure 2E:
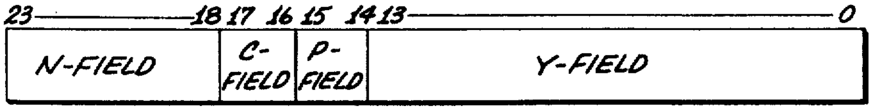

FIG. 2*e* illustrates another type of auxiliary word, viz. a control word employed in executing a TIM operation for transferring information from a peripheral device to Memory 10 or a TOM operation for transferring information to a peripheral device from Memory 10. The N-Field (bits 23–18) of the control word specifies, in ones complement form, the number of words to be transferred between the corresponding peripheral device and Memory 10. The N-Field may specify up to 63 words. The C-Field (bits 17 and 16) of the control word specifies at any given point in time the number of bytes yet to be transferred between the peripheral device and Memory 10 to complete transfer of the current word. The C-Field is initially set to equal the P-Field. The P-Field (bits 15 and 14) specifies, in twos complement form, the number of bytes, one, two, three or four, in each word transferred between the peripheral device and memory 10, as follows:

| Bit 15 | Bit 14 | Number of Bytes per Word |
|---|---|---|
| 0 | 0 | 4 |
| 0 | 1 | 3 |
| 1 | 0 | 2 |
| 1 | 1 | 1 |

The -Field (bits 13–0) of the control word initially specifies the starting address less one of the group of memory locations to which or from which data is to be transferred.

SYSTEM CIRCUIT ELEMENTS

The functions of circuits useful as elements of the computer system of FIG. 1 will now be described. Circuits for performing these functions are well known in the art. The following circuits find general employment in the computer system: AND-gates, OR-gates, Inverters, NAND-gates, NOR-gates, Flip-Flops and Full Adders. The symbols illustrated in FIGS. 3*a*–3*g* are employed throughout the drawings to represent the corresponding circuits.

AND-gate

Figure 3A:
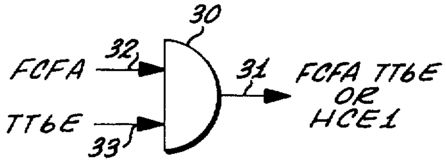

The AND-gate provides the logical operation of conjunction for binary 1 signals applied thereto. Since a binary 1 is represented by a relatively positive potential in the system, the AND-gate provides a positive output signal representing a binary 1 when, and only when, all the input signals applied thereto are positive and represent binary 1's. The symbol identified by reference 3 in FIG. 3*a* represents a two-input AND-gate. Such an AND-gate delivers a binary 1 output signal on output line 31 only when each of the two input signals applied on respective input lines 32 and 33 are binary 1's.

The two output signals applied to AND-gate 30 of FIG. 3*a* are designated FCFA and TT6E. The output signal of AND-gate 30 is represented by "FCFA TT6E," a conjunctive logic expression. This form of expression is used in logic equations, which are also termed Boolean equations, and which are often employed to represent a logical structure. The conjunctive operation on two signals, such as the FCFA and TT6E signals, is indicated by writing the two signal designation terms adjacent to each other with no operator notation between them, as written above, or with the operation notation (.) between the terms, as follows: $FCFA \cdot TT6E$. This conjunctive expression is read as "FCFA and TT6E."

Alternatively, the output of AND-gate 30 may be identified by another signal designation, such as signal designation HCE1 in FIG. 3*a*. Output signal HCE1 of AND-gate 30 is a binary 1, therefore, only when both input signals FCFA and TT6E are binary 1's. This relationship between the output signal AND-gate 30, the input signals to AND-gate 30, and the logical operation of conjunction performed by AND-gate 30 may be expressed in the form of a logic equation, viz.:

$$FCFA\ TT6E = HCE1$$

This logic equation fully represents the conditions necessary to the generation of output signal HCE1 and may be employed to structurally represent the relationship between signal HCE1 and signals FCFA and TT6E.

The logical operation of conjunction is not limited to AND-gates having only two input signals, but instead is applicable to AND-gates having any number of input signals. In each such instance, the output signal of the corresponding AND-gate represents a binary 1 when, and only when, all of the input signals applied to the gate represent binary 1's.

OR-gate

Figure 3B:
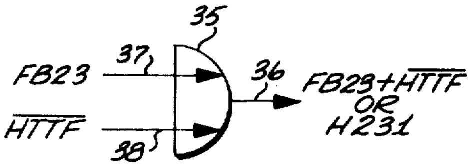

The OR-gate provides the logical operation of inclusive-OR for binary 1 input signals applied thereto. In the computer system, since a binary 1 is represented by a relatively positive signal, the OR-gate provides a positive output signal representing a binary 1 when any one or more of the input signals applied thereto are positive and represent binary 1's. The symbol identified by reference numeral 35 in FIG. 3*b* represents a two-input OR-gate. Such an OR-gate delivers a binary 1 output signal on output line 36 when either or both input signals applied to input lines 37 and 38 represent binary 1's.

The two input signals applied to OR-gate 35 of FIG. 3*b* are designated FB23 and $\overline{HTTF}$. The output signal may be represented by "$FB23+\overline{HTTF}$," an inclusive-OR disjunctive logic expression. This form of expression is used in logic equations which may be employed to represent logical structures. The inclusive-OR operation on any two signals, such as the FB23 and $\overline{HTTF}$ signals, is indicated by writing the two signal designation terms adjacent each other with the operator notation (+) between the terms, as written above. This inclusive-OR expression is read as "FB23 or $\overline{HTTF}$."

Alternatively, the output of OR-gate 35 may be identified by another signal designation, such as signal designation H231 in FIG. 3*b*. Output signal H231 of OR-gate 35 is a binary 1, therefore, when either or both of input signals FB23 and $\overline{HTTF}$ are binary 1's. This relationship between the output signal of OR-gate 35, the input signals to OR-gate 35 and the logical operation of inclusive-OR performed by OR-gate 35 may be expressed in the form of a logic equation as follows:

$$FB23+\overline{HTTF}=H231$$

This logic equation fully represents the conditions necessary to the generation of output signal H231 and may be employed to structurally represent the relationship between signal H231 and signals FB23 and $\overline{HTTF}$.

The logical operation of inclusive-OR is not limited to OR-gates having only two input signals, but instead is applicable to OR gates having any number of input signals. In each such instance, the output signal of the corresponding OR-gate represents a binary 1 when any one or more of the input signals applied to the gate are positive and represent binary 1's.

Inverter

The inverter provides a logical operation of invention, or NOT, for an input signal applied thereto. The inverter provides a relatively positive output signal, representing a binary 1, when the input signal applied to the inverter is relatively negative, representing a binary 0. Conversely, the inverter provides an output signal representing a binary 0 when the input signal represents a binary 1.

Figure 3C:
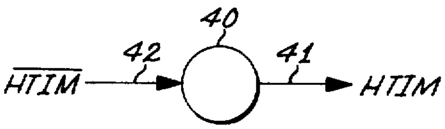

The symbol identified by reference number 40 in FIG. 3*c* represents an inverter. Inverter 40 delivers a binary 1 output signal on output line 41 when the input signal applied on input line 42 represents a binary 0, and provides a binary 0 output signal on output line 41 when the input signal on line 42 is a binary 1.

The output signal delivered by the inverter is designated as having the inverse binary logical significance of the input signal. The input signal applied to the inverter of FIG. 3*c* is designated as signal $\overline{HTIM}$. The output signal of this inverter is therefore designated as signal HTIM, which signifies that the output signal has inverse logical significance compared to the input signal.

This designation for a signal having inverse binary logical significance with respect to another signal is employed generally in the description of the system. Thus, a signal designation, such as $\overline{DNDP}$, indicates that when the DNDP signal is relatively positive, representing a binary 1, the $\overline{DNDP}$ signal is relatively negative, representing a binary 0, and vice versa. It is to be understood herein that whenever a particular signal is generated, its logical inverse may be generated by applying the original signal to an inverter.

NAND-gate

Figure 3D:
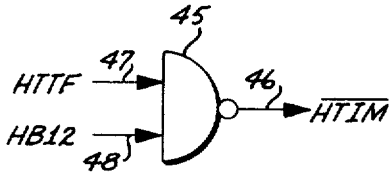

The NAND-gate provides the logical operation of conjunction and inversion for binary 1 signals applied thereto. In the system, since a binary 1 is represented by a positive signal, the NAND-gate provides a relatively negative output signal representing a binary 0 when, and only when, all of the input signals applied to the NAND-gate are positive, representing binary 1's. The symbol identified by numeral 45 in FIG. 3*d* represents a two input NAND-gate. Such a NAND-gate delivers a binary 0 output signal on output lead 46 only when each of the two input signals applied to input leads 47 and 48 represents a binary 1. The two input signals applied to NAND-gate 45 are designated HTTF and HB12. The output signal of NAND-gate 45 is designated $\overline{HTIM}$. The logical relation between the output and input signals of NAND-gate 45 may be expressed by the logic equation:

$$\overline{HTTF\ HB12}=\overline{HTIM}$$

This logical relation may also be expressed as:

$$\overline{HTTF}+\overline{HB12}=\overline{HTIM}$$

These equations indicate that output signal $\overline{HTIM}$ is a binary 0 when both input signals HTTF and HB12 are binary 1's. Under all other conditions, output signal $\overline{HTIM}$ is a binary 1. The logical relation between the output and input signals of NAND-gate 45 may also be expressed in terms of signal HTIM which has inverse logical significance with respect to signal $\overline{HTIM}$ as follows:

$$HTTF\ HB12=HTIM$$

This equation indicates that output signal HTIM is a binary 1 when both input signals HTTF and HB12 are binary 1's; this is equivalent to saying that output signal $\overline{HTIM}$ is a binary 0 when both input signals HTTF and HB12 are binary 1's, as previously discussed.

The logical operation of conjunction and inversion is not limited to NAND-gates having only two input signals, but is applicable to NAND-gates having any number of input sinals. In each such instance, the output signal of the corresponding NAND-gate represents a binary 0 when, and only when, all of the input signals applied to the NAND-gate represent binary 1's.

NOR-gate

Figure 3E:
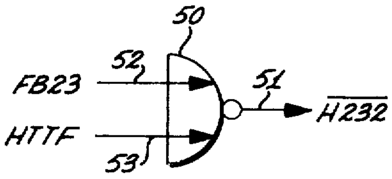

A NOR-gate provides the logical operation of inclusive-or and inversion for binary 1 input signals applied thereto. In the system, since a binary 1 is represented by a positive signal, a NOR-gate provides a relatively negative output signal representing a binary 0 when any one or more of the input signals applied thereto are positive and represent binary 1's. The symbol identified by reference numeral 50 in FIG. 3*e* represents a two input NOR-gate. Such a NOR-gate delivers a binary 0 output signal on output lead 51 when any one or both of the input signals applied to input leads 52 and 53 represent binary 1's.

The two input signals applied to NOR-gate 50 are designated FB23 and HTTF. The output signal is designated $\overline{\mathrm{H232}}$. The logical relationship between the input and output signals of NOR-gate 50 may be represented by the following equation:

$$\overline{FB23}+\overline{HTTF}=\overline{H232}$$

This equation indicates that output signal $\overline{\mathrm{H232}}$ is a binary 0 when either of input signals FB23 or HTTF are binary 1's. The equation may also be written as:

$$\overline{FB23}\ \overline{HTTF}=\overline{H232}$$

This equation indicates that $\overline{\mathrm{H232}}$ is a binary 1 when both input signals $\overline{\mathrm{FB23}}$ and $\overline{\mathrm{HTTF}}$ are binary 1's, i.e. when both input signals FB23 and HTTF are binary 0's. Under all other conditions, output signal $\overline{\mathrm{H232}}$ is a binary 0. The logical relation between the output and input signals of NOR-gate 50 may also be expressed in terms of signal H232 as follows:

$$FB23+HB12=H232$$

This equation indicates that output signal H232 is a binary 1 or output signal $\overline{\mathrm{H232}}$ is a binary 0 when either of input signals FB23 or HTTF are binary 1's.

The logical operation of inclusive-or and inversion is not limited to NOR-gates having only two input signals, but instead is applicable to NOR-gates having any number of input signals. In each such instance, the output signal of the corresponding NOR-gate represents a binary 0 when any one or more of the input signals applied to the NOR-gate represent binary 1's.

Flip-flop

The flip-flop provides temporary storage of a binary digit of data or control information. A pair of output signals is delivered by the flip-flop to denote the type of binary digit that is currently being stored.

The flip-flop, or bistable multivibrator, is a circuit adapted to operate in either one of two stable states. The flip-flop may be transferred to one or the other of its states in response to suitable input signals to store information. In one of its stable states (1-state), the flip-flop represents a binary 1 and in the other stable state (0-state), the flip-flop represents a binary 0. When the flip-flop is transferred to the 1-state, it is said to be "set." When the flip-flop is transferred to the 0-state, it is said to be "reset."

Figure 3F:
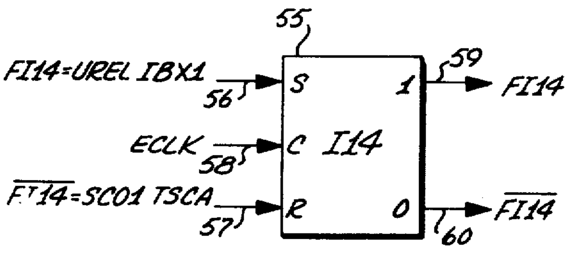

A flip-flop is generally identified mnemonically in accordance with the function it performs. For example, a typical flip-flop employed in the system for control is designated the TTF flip-flop. The TTF designation stands for "TIM/TOM and the TTF flip-flop, when the 1-state, indicates that a TIM or a TOM operation is being performed in the system. A typical flip-flop employed in the system for temporary storage of data is the I14 flip-flop. The symbol identified by reference numeral 55 in FIG. 3*f* is employed to represent a flip-flop. Symbol 55, in this instance, represents the I14 flip-flop.

The I14 flip-flop is employed to temporarily store the fifteenth bit in the I-Register. The two lines 56 and 57 entering the left-hand side of the flip-flop symbol are input lines and provide the two required trigger signals. The line 58 entering the left-hand side of the flip-flop is an input line providing the clock signal required to enable a change in state of the flip-flop. Line 56, the one input line, provides a one input (or "set") signal and line 57, the zero input line, provides a zero input (or "reset") signal. When the one input signal increases positively and the clock signal on input line 58 issues, the flip-flop is transferred to its 1-state (or "set" state), if it is not already in the 1-state. When the zero input signal increases positively and the clock signal on input 58 issues, the flip-flop is transferred to its 0-state (or "reset" state), if it is not already in the 0-state. The notation $$FI14=UREL\ IBX1\ ECLK$$

indicates the logical gate structure employed to generate the "set" trigger signal. Similarly, the notation $$\overline{FI14}=SC01\ TSCA\ ECLK$$

indicates the logical gate structure employed to generate the "reset" trigger signal for the I14 flip-flop.

The two lines 59 and 60 extending from the right-hand side of symbol 55 are output line that deliver the two output signals, viz. FI14 identifying the 1-output signal and $\overline{\mathrm{FI14}}$ identifying the 0-output signal. When the I14 flip-flop is in the 1-state, a relatively positive signal is delivered on the 1-output line while a relatively negative signal is delivered on the 0-output line. Conversely, when the I14 flip-flop is in the 0-state, relatively negative signal is delivered on the 1-output line and a relatively positive signal is delivered on the 0-output line. Flip-flop circuits are well known in the art and will not here be described in detail.

Register

A register is a set of flip-flops providing temporary storage for a group of related binary digits of data or control information. The size of a register is dependent on the number of binary digits of information to be stored. For example, the A-Register in the Arithmetic and Control Unit 10 of the computer system is employed to temporarily store an information word and therefore comprises twenty-four flip-flops.

The flip-flops of a register are identified according to the register designation and the numerical significance of the information bits stored therein. Thus, a particular flip-flop of a register may be designated as the "O*i*" flip-flop, where "O" identifies the register and "*i*" identifies the order of significance of the bit stored in the flip-flop. For example, flip-flop A23 stores the twenty-fourth or the most-significant bit stored in the A-Register while flip-flop B00 stores the least-signficant bit stored in the B-Register. Data movement between the registers of the system is normally by parallel transfer of the bits stored in the flip-flops of one register to predetermined flip-flops of the receiving register. Data movements may also be accomplished by serial shift of bits between certain registers.

Full adder

Figure 3G:
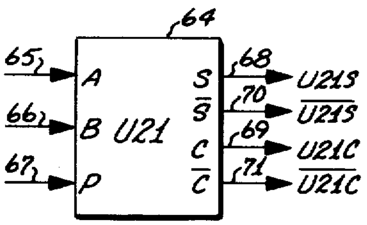

The full adder is employed in the computer system to perform binary arithmetic operations. The symbol identified by reference numeral 64 in FIG. 3*g* is employed to represent a full adder. Symbol 64, in this instance, represents the U21 full adder. As illustrated in FIG. 3*g*, the full adder receives three input signals on lines 65, 66 and 67 and provides sum and carry output signals S and C on lines 68 and 69 respectively in addition to complementary sum and carry output signals $\overline{S}$ and $\overline{C}$ on lines 70 and 71 respectively. A plurality of full adder circuits may be employed to perform binary arithmetic operations on two data words each comprising a corresponding plurality of binary digits.

If all three inputs to a full adder are binary 0's, the sum and carry output signals S and C are binary 0's, while the complementary signals $\overline{S}$ and $\overline{C}$ are binary 1's. If one of the full adder input signals is a binary 1, the sum output signal S is a binary 1 and the carry output signal C is a binary 0. If two input signals of a full adder are binary 1's, the sum output signal S is a binary 0 and the carry output signal C is a binary 1. If all three input signals to a full adder are binary 1's, both the sum and carry output signals are binary 1's. The relationship between the input and output signals of a full adder, such as illustrated in FIG. 3*g*, is represented in the following table:

FULL ADDER CHARACTERISTIC TABLE

| Full-Adder Inputs | | | Full-Adder Outputs | | | |
|---|---|---|---|---|---|---|
| A | B | P | S | $\overline{S}$ | C | $\overline{C}$ |
| 0 | 0 | 0 | 0 | 1 | 0 | 1 |
| 0 | 0 | 1 | 1 | 0 | 0 | 1 |
| 0 | 1 | 0 | 1 | 0 | 0 | 1 |
| 0 | 1 | 1 | 0 | 1 | 1 | 0 |
| 1 | 0 | 0 | 1 | 0 | 0 | 1 |
| 1 | 0 | 1 | 0 | 1 | 1 | 0 |
| 1 | 1 | 0 | 0 | 1 | 1 | 0 |
| 1 | 1 | 1 | 1 | 0 | 1 | 0 |

Referring to FIG. 3*g*, sum output signal U21S of full adder 64 is a binary 1 and output signal $\overline{\text{U21S}}$ is a binary 0 if either one or three inputs to full adder 64 are binary 1's. In all other instances, output signal U21S is a binary 0 and output signal $\overline{\text{U21S}}$ is a binary 1. If either two or three inputs to full adder 64 arebinary 1's, carry output signal U21C is a binary 1 and output signal $\overline{\text{U21C}}$ is a binary 0. In all other instances, output signal U21C is a binary 0 and output signal $\overline{\text{U21C}}$ is a binary 1.

COMPUTER SYSTEM—DETAILS

The computer system is shown symbolically in FIG. 4 to illustrate the elements of the system which store data, the paths of data transfer between these elements, and major control elements of the system. Temporary storage of instruction, auxiliary and data words is provided, during processing and control operations, in the various registers of the system. Transfer of data between register and other elements of the system, as indicated by the interconnecting lines of FIG. 4, is normally effected by the parallel transfer of binary digits from the source register or element to the receiving register or element.

Memory

Memory 11, illustrated diagrammatically in FIGS. 1 and 4, stores data words which are to be processed, data words which have resulted from processing, data words representing process parameters and other process information, instruction words to direct processing and control and auxiliary words for addressing and control. Memory 11 of the computer system is adapted to store up to 32,768 words of 24 bits each plus a parity bit. Of the memory locations provided for storage of information, the following are reserved for special purposes as indicated in the table.

RESERVED MEMORY LOCATIONS

| Memory locations (octal): | Use |
|---|---|
| 00000 | Primary bulk storage memory pointer word. |
| 00001–00007 | Storage of index words for address and microcoded field modification. |
| 00010 | Q-Register (auxiliary arithmetic register). |
| 00011–00017 | Additional bulk storage memory pointer words. |
| 00020 | Memory protect error response location. |
| 00021 | Memory protect, saved I-Register word. |
| 00024 | API Stall Alarm error exit location. |
| 00031–00037 | Peripheral device pointer words. |
| 00040–00077 | Quasi instruction branch vectors or single word quasi. |
| 00100–00177 | Memory protect status words. |
| 00200–00377 | Automatic program interrupt control word storage locations. |

Magnetic Core Storage Unit 13 of Memory 11 utilizes coincident-current storage elements well known in the art. The structure and operation of such storage elements is described, for example, in the publication by C. V. L. Smith, "Electronic Digital Computers," chapter 12, McGraw-Hill Company, Inc., New York, 1959. The location of a word stored in Magnetic Core Storage Unit 13 is identified by the binary number representing the address of the particular storage location in the three-dimensional magnetic core matrix where the word is stored. To obtain information from Memory 11, the appropriate address is supplied to Memory Address Register 80, illustrated in FIG. 4. Address decode circuits and sense amplifiers (not shown) cause the transfer of the contents of the addressed memory location from Magnetic Core Storage Unit 13 to Memory Data Register 81, as well known in the art, making the data word available to Arithmetic and Control Unit 10.

The extraction of an information word from a storage location of Magnetic Core Storage Unit 13 may change the magnetic state of the individual cores comprising that memory location, destroying the information stored therein. As well known in the art, automatic apparatus is provided to immediately restore to the storage location the information word transferred to Memory Data Register 81.

In storing an information word in Magnetic Core Storage Unit 13, the information word is transferred through Memory Multiplexer 12 from Arithmetic and Control Unit 10 into Memory Data Register 81. The address of the storage location into which the information word is to be transferred is placed in Memory Address Register 80. The address decode apparatus and inhibit drivers (not shown) of Memory 11 cause transfer of the information word from Memory Register Data 81 to the magnetic cores of the addressed storage location of Magnetic Core Storage Unit 13, as well known in the art.

Memory Address Register 80, illustrated in FIG. 4, is a 15-bit register forming part of Memory 11 which receives a 15-bit address through Memory Multiplexer 12 specifying the storage location of Magnetic Core Storage Unit 13 from which or to which an information word is to be transferred via Memory Data Register 81. Memory Data Register 81 also forms part of Memory 11 and is a 24-bit register for temporarily storing an information word which is to be stored in Magnetic Core Storage Unit 13 during a memory write operation or which has been received from Magnetic Core Storage Unit 13 during a memory read operation. Information words are transferred from Arithmetic and Control Unit 10 to Memory Data Register 81 through Memory Multiplexer 12 while information words stored in Memory Data Register 81 during a memory read operation are transferred directly to the Arithmetic and Control Unit 10, as illustrated in FIG. 4.

During a memory read operation, Memory 11 provides signal MDRY to Arithmetic and Control Unit 10 when the information word from the addressed memory location is available in Memory Data Register 81. Signal MRLS is provided to Arithmetic and Control Unit 10 by Memory 11 when the memory read or write operation is completed. Signals MDRY and MRLS serve to synchronize operations in Arithmetic and Control Unit 10 with operations in Memory 11.

Arithmetic and Control Unit

Arithmetic and Control Unit 10 exercises operational control over the computer system in response to a plurality of distinct instructions which are supplied thereto from Memory 11 in the sequential order necessary to perform a particular processing or control operation. The information which is processed by Arithmetic and Control Unit 10 is supplied primarily from Memory 11. This information is usually transferred into and out of Memory 11 under control of Arithmetic and Control Unit 10.

Arithmetic and Control Unit 10 comprises registers for temporarily storing data, logic circuits for transferring data through and between registers and flip-flops employed as control signal sources. Arithmetic and Control Unit 10 further includes a timing control unit for controlling the timing of the operations performed by Arithmetic and Control Unit 10 and an operations control unit for directing operations performed by Arithmetic and Control Unit 10. FIG. 4 illustrates diagrammatically the elements of Arithmetic and Control Unit 10 which store data, the paths of data transfer between these elements and certain control elements. Arithmetic and Control Unit 10 comprises the following registers, shown in FIG. 4: B-Register 100, I-Register 101, A-Register 102, P-Register 103, V-Register 104, L-Register 105 and J-Counter 106. Arithmetic and Control Unit 10 also includes Parallel Adder Unit 110, Timing Control Unit 111, Operations Control Unit 112 and control signal source Flip-Flops 113. Transfer of information between the registers and parallel adder unit of Arithmetic and Control Unit 10 and other elements of the computer system, as indicated by the interconnecting lines of FIG. 4, is normally effected by parallel transfer of binary digits from the source element to the receiving element. The basic characteristics and functions of the registers and other elements are summarized below as a basis for the more detailed discussion of the invention.

B-Register 100 is a 24-bit register comprising Flip-Flops B23–B00. B-Register 100 stores all instruction and data words being transferred to or from Memory 11. During the transfer of an instruction word from Memory 11 to Arithmetic and Control Unit 10, the operation code, index bits and relative addressing bit of the instruction word are transferred in parallel from B-Register 100 to I-Register 101 while the address field of the instruction word is transferred in parallel from B-Register 100 to Parallel Adder Unit 110. The entire contents of B-Register 100 may also be transferred in parallel to Parallel Adder Unit 110. In transferring information from Arithmetic and Control Unit 10 to Memory 11, the information word in B-Register 100 is transferred in parallel to Memory Multiplexer 12. Information is thus transferred in parallel from B-Register 100 to Memory Multiplexer 12, I-Register 101 and Parallel Adder Unit 110.

B-Register 100 is adapted to receive, by parallel transfer, the contents of Memory Data Register 81 and the output of Parallel Adder Unit 110. B-Register 100 may serve as an extension of A-Register 102 when performing a left or right shift. During a left shift, the contents of either Flip-Flop B22 or B23 of B-Register 100, as specified by the instruction word, are transferred to Flip-Flop A00 of A-Register 102. During a right shift, the contents of Flip-Flop A00 of A-Register 102 are transferred to either Flip-Flop B22 or B23 of B-Register 100, as specified by the instruction word. During a multiplication operation, B-Register 100 stores the multiplier and upon completion of the multiplication operation, holds the least significant bits of the product. During a division operation, B-Register 100 holds the least-significant bits of the dividend and, upon completion of the division operation, stores the quotient. The contents of B-Register 100 are shifted left circular during a TIM or TOM input or output operation. During a left circular shift, the binary digit stored in Flip-Flop B23 of B-Register 100 is transferred to Flip-Flop B00 as the contents of B-Register 100 are shifted left circular through one bit position.

I-Register 101 is a 25-bit register for storing the instruction word which is to be executed by Arithmetic and Control Unit 10. I-Register 101 comprises Flip-Flops I23–I00 and IRA. The extra bit position has as its purpose the provision of relative addressing capability. The operation code of the instruction word may have any one of a plurality of bit configurations, each configuration directing a fundamentally different processing or control operation in the computer system. I-Register 101 is adapted to receive, by parallel transfer, the contents of Flip-Flops B23–B14 of B-Register 100, the output of Parallel Adder Unit 110 and the contents of J-Counter 106. The contents of I-Register 101 are applied in parallel to Parallel Adder Unit 110. The information stored in Flip-Flops I14–I09 is applied in parallel to V-Register 104. Similarly, the contents of Flip-Flops I14–I00 are applied in parallel to P-Register 103 while the contents of Flip-Flops I04–I00 are applied to J-Counter 106. During the multiplication operation, I-Register 101 stores the multiplicand and during a division operation stores the divisor.

A-Register 102 is a 24-bit register comprising Flip-Flops A23–A00. A-Register 102 is adapted to receive, by parallel transfer, the output of Parallel Adder Unit 110. The contents of A-Register 102 are also applied in parallel to the inputs of Parallel Adder Unit 110. A-Register 102 stores the augend during an add operation, the minuend during a subtract operation and the sum or difference upon completion of the operation. During a multiplication operation, A-Register 102 stores the partial product and during a divide operation stores the twenty-four most-significant bits of the dividend. Upon completion of a multiplication operation, A-Register 102 stores the twenty-four most-significant bits of the product and upon completion of a divide operation stores the 24-bit remainder. As described in conjunction with B-Register 100, A-Register 102 may be shifted left or right. In addition, A-Register 102 may be shifted with the information being transmitted to Flip-Flop A23 for each bit position shifted, being derived from Flip-Flop A00 or other flip-flop of A-Register 102. During a left shift, the contents of flip-flop A23 are lost.

P-Register 103 is a 15-bit counter comprising Flip-Flops P14–P00. The sequence in which successive instructions are executed is controlled by P-Register 103 which serves as a program counter. The count in P-Register 103 is used to provide the address of instruction words in memory and is advanced in response to execution of an instruction to form the address of the next instruction to be executed. The amount by which the P-Register count is advanced is determined by the type of action required in Arithmetic and Control Unit 10 as follows:

(a) Normal Program Sequence—count in P-Register advanced by 1.

(b) Jump—count in P-Register advanced by 2.

(c) Branch—P-Register is set to quantity specified by the address field of the branch instruction.

P-Register 103 is adapted to receive by parallel transfer information from Flip-Flops I14–I00 of I-Register 101. The contents of P-Register 103 may be transferred in parallel to Memory Multiplexer 12 and to Parallel Adder Unit 110. The contents of Flip-Flops P14–P09 of P-Register 103 are transferred to V-Register 104.

V-Register 104 is a 6-bit register comprising Flip-Flops V05–V00. V-Register 104 is termed the status word address or the volume register and stores the address of one of 64 protect status words utilized in protecting the contents of Magnetic Core Storage Unit 13. V-Register 104 is adapted to receive, by parallel transfer, information from either P-Register 103 or I-Register 101. During addressing of Memory 11, the contents of V-Register 104 are employed to determine whether or not the appropriate protect status word is available to identify the protect status of the addressed memory location.

L-Register 105 is a 16-bit register comprising Flip-Flops L15–L00. L-Register 105 is employed to store the appropriate protect status word which identifies the protect status for eight 64-word blocks of memory locations in Magnetic Core Storage Unit 13. L-Register 105 is adapted to receive, by parallel transfer, the output of selected bits of Parallel Adder Unit 110. J-Counter 106 is a 5-bit binary counter comprising Flip-Flops J04–J00. J-Counter 106 is normally employed to count shifts during shift operations in Arithmetic and Control Unit 10 and is also used during multiply and divide operations. J-Counter 106 is capable of receiving, by parallel transfer, information from I-Register 101. The contents of J-Counter 106 may be transferred in parallel to I-Register 101.

The Q-Register of Arithmetic and Control Unit 10 comprises memory location $00010_8$ of Magnetic Core Storage Unit 13 and is an auxiliary register used to assist A-Register 102 in performing arithmetic and logical operations. The Q-Register is used to store the multiplier and the least-significant bits of a product during a multiplication operation. During a division operation, the Q-Register stores the least-significant bits of the dividend and quotient. The Q-Register may be utilized in conjunction with A-Register 102 to form a double-length register which may be shifted left or right. The contents of the Q-Register may be directly affected by certain instructions.

Parallel Adder Unit 110 is a conventional 24-bit parallel adder which performs all arithmetic operations in Arithmetic and Control Unit 10. Parallel Adder Unit 110 is capable of receiving, by parallel transfer, the contents of B-Register 100, I-Register 101, A-Register 102 and P-Register 103. The output of Parallel Adder Unit 110 may be applied to B-Register 100, I-Register 101, A-Register 102 and L-Register 105. Parallel Adder Unit 110 also serves as a buffer during input/output operations involving data transfers with peripheral Input/Output Buffer 16 and Input/Output Expander 18. During input/output operations, Parallel Adder Unit 110 receives inputs from I/O Bus 25 and applies its output to I/O Bus 25.

Timing Control Unit 111 provides timing signals to control the sequence and time of occurrence of events in Arithmetic and Control Unit 10. The details of Timing Control Unit 111 are illustrated in FIGS. 5 and 6. Operations Control Unit 112 is responsive to Timing Control Unit 111, to the operation code of instruction words in I-Register 101 and to initiation of input/output operations by Automatic Program Interrupt Unit 15 and provides the necessary gating and logic signals to cause appropriate operations and information transfers to occur in Arithmetic and Control Unit 10 to execute the instruction or perform the input/output operation. The gating and logic signals and their timing necessary to the invention are described in detail in the section entitled "Table Input to Memory (TIM)/Table Output from Memory (TOM)." Control signal source flip-flops 113 comprise various flip-flops which temporarily store signals employed in the operation of Arithmetic and Control Unit 10.

Peripheral Input/Output Buffer

The Peripheral Input/Output Buffer 16 of the computer system comprises a plurality of channels for providing information transfer paths between Arithmetic and Control Unit 10 and peripheral devices of the computer system. Each channel is connected to one peripheral device and provides data transfer in one direction between Arithmetic and Control Unit 10 and the peripheral device. Peripheral Input/Output Buffer 16 also includes control logic circuitry for directing the operation of Peripheral Input/Output Buffer 16 and the transfer of information through the channels of Buffer 16 between the peripheral devices and Arithmetic and Control Unit 10, as known in the art. The control logic circuitry receives signals from Arithmetic and Control Unit 10 identifying the operation to be performed in Peripheral Input/Output Buffer 16 and the channel in which the data transfer is to occur. When a peripheral device connected to Peripheral Input/Output Buffer 16 requires information from Arithmetic and Control Unit 10 or is ready to transfer information to Arithmetic and Control Unit 10, the control logic circuitry of Peripheral Input/Output Buffer 16 provides an appropriate program interrupt request signal to Automatic Program Interrupt Unit 15 identifying the channel which requires the program interrupt. Peripheral Input/Output Buffer 16 thus serves to control information transfers between Arithmetic and Contol Unit 10 and the connected peripheral subsystems and initiates interruption of the main program in the computer system when a data transfer is required by a connected peripheral device.

Input/Output Expander

Input/Output Expander 18 of the computer system comprises a plurality of channels for providing test information, control information and data transfer paths between Arithmetic and Control Unit 10 and Peripheral Input/Output Buffer 16 and between Arithmetic and Control Unit 10 and the elements of the system associated with the controlled and/or monitored process. Input/Output Expander 18 also includes logic circuitry for directing information transfers through Expander 18 in an orderly manner. The communication of data and test and control information from Arithmetic and Control Unit 10 to the process is effected by Gen II instructions. Similarly, the transfer of information from the process to Arithmetic and Control 10 occurs through execution of Gen II instructions by the system. The channel of Input/Output Expander 18 employed in an information transfer is selected by channel identification signals transmitted to Input/Output Expander 18. Timing within Input/Output Expander 18 is provided by NPHA and NPHB signals generated in Arithmetic and Control Unit 10.

Timing control unit

Movement of information between the registers of Arithmetic and Control Unit 10 and other operations are performed in relative synchronism under control of a common timing or clock generator. This clock generator may conveniently be a stable oscillator coupled with a suitable wave-shaping circuit to produce a train of uniformly spaced rectangular pulses designated clock pulses. FIG. 5 is a block diagram representing the clock generator 120 and illustrates the wave form of the basic clock signal TCK1 employed in the computer system. As shown in FIG. 5, the basic clock signal of the computer system comprises a series of pulses spaced from each other in time by a period of 100 nanoseconds, the clock rate being 10 megacycles. The individual pulses of the pulse train have an approximate width of 25 nanoseconds.

To control and maintain an orderly and efficient succession of operations within Arithmetic and Control Unit 10, Sequence Control Logic 121, as illustrated in FIG. 6, is provided. Sequence Control Logic 121 comprises five sequence control flip-flops designated SC1, SC2, SC3, SC4 and SC5 to define five mutually exclusive sequence control states. The sequence control states designated by flip-flop SC1 is identified by output signal SC01 of Sequence Control Logic 121. Similarly, the sequence control states designated by flip-flops SC2, SC3, SC4 and SC5 are identified by output signals SC02, SC03, SC04 and SC05 respectively of Sequence Control Logic 121. Sequence Control Logic 121 receives clock signals TCK1 from Clock Generator 120 and is responsive to output signals from Sequence Time Counter 122 and Delay Time Counter 123 in defining the timing of the sequence control states.

During Sequence Control State 1, the instruction word stored in the memory location of Magnetic Core Storage Unit 13 identified by the program count in P-Register 103 is transferred from Memory Data Register 81 through B-Register 100 to I-Register 101 of Arithmetic and Control Unit 10. In addition, the program count in P-Register 103 may be incremented if instruction execution is completed in Sequence Control State 1, and other information movement between other registers may occur. A few instructions which can be completed by a simple group of operations are completely executed during Sequence Control State 1. Relative addressing, when specified by the relative addressing bit 14 of full operand and quasi-instructions, is performed during Sequence Control State 1.

Sequence Control State 2, when required, is entered immediately following Sequence Control State 1. During Sequence Control State 2, any index modification of the instruction word operand address field required by the index bits of the instruct-word is performed. Certain full operand instructions also utilize Sequence Control State 2 to partially execute the instruction.

Sequence Control State 3 is normally entered following Sequence Control States 1 or 2 during execution of certain instructions and during performance of a TIM or a TOM operation.

Sequence Control State 4 is normally entered following Sequence Control States 1, 2 or 3, depending upon the nature of the instruction or operation being executed. Sequence Control State 4 is entered during execution of most instruction words and during performance of a TIM or a TOM operation. Sequence Control State 4 may be extended in time as required for certain commands and operations.

Sequence Control State 5 is entered after Sequence Control State 4 for certain instructions and is utilized for performing additional functions required by certain instructions and operations. Execution of these instructions and performance of a TIM or TOM operation is completed during Sequence Control State 5.

The timing control signals required to control the sequence of events within each sequence control state and for providing timely changes from one sequence control state to another are generated primarily by Sequence Time Counter 122 comprising flip-flops SCA, SCB and SCC. Sequence Time Counter 122 receives clock signals TCK1 from Clock Generator 120 and is responsive to output signals of Sequence Control Logic 121 and also provides signals to Sequence Control Logic 121. The states of flip-flops SCA, SCB and SCC define specific time intervals in which various operations are performed. The relationship between the states of flip-flops SCA, SCB and SCC and the six different time intervals specified by Sequence Time Counter 122 are illustrated in the following table:

| SCA | SCB | SCC | Time (Output Signal) |
|---|---|---|---|
| 0 | 0 | 0 | Time 0 envelope (TT0E). |
| 0 | 0 | 1 | Time 1 envelope. |
| 0 | 1 | 1 | Time 2 envelope. |
| 1 | 1 | 1 | Time 3 envelope. |
| 1 | 1 | 0 | Time 4 envelope. |
| 1 | 0 | 0 | Time 5 envelope (TT5E). |
| 1 | 0 | 1 | Time 6 envelope (TT6E). |

The Time 0, Time 1, Time 2, Time 3, Time 4 and Time 5 envelopes are common to each sequence control state. The Time 6 envelope is entered only during execution of certain instructions, namely the Gen I, Gen II, Gen III, multiply and divide instructions, and during performance of TIM or TOM operations.

Delay Time Counter 123 comprises flip-flops AFF, BFF, CFF, DFF and EFF and is employed to provide timing within the Time 6 envelope when the Time 6 envelope is entered during execution of certain instructions and operations. Delay Time Counter 123 thus provides timing during extension of the normal duration of Sequence Control State 4. During sequence control states in which Time 6 envelope is not entered, Delay Time Counter 123 is reset to $30_8$ and is inhibited from being incremented. During Time 6 envelope, Delay Time Counter 123 may be preset to $30_8$ in response to signal TPAF and subsequently changed to a count of $4_8$ by signal TP04 in order to provide time intervals of appropriate length within Time 6 envelope. Output Signal TD30 of Delay Time Counter 123 issues during Time 6 envelope when the count of Delay Time Counter 123 reaches $30_8$. Delay Time Counter 123 receives clock signals TCK1 from Clock Generator 120 and also receives signals from Sequence Control Logic 121 and Frequency Divider 125.

Extended Time Counter 124 cooperates with Delay Time 6 envelope. The first of such time intervals is identified as the period during which flip-flop EC1 is set to the 1-state and flip-flop EC2 is reset to the 0-state. The second of such time intervals is identified as the period during which flip-flop EC1 is reset to the 0-state and flip-flop EC2 is set to the 1-state. The change in states of flip-flops EC1 and EC2 of Extended Time Counter 124 are controlled by Delay Time Counter 123 and occur when the count in Delay Time Counter 123 reaches $30_8$ during Time 6 envelope.

Frequency Divider 125 comprises flip-flops FD1 and FD2 and serves to adjust the counting rate of Delay Time Counter 123 in accordance with the rate at which information bits are being transmitted between Arithmetic and Control Unit 10 and a peripheral device. If a peripheral device has a high data transfer rate and is connected to a high speed channel of Peripheral Input/Output Buffer 16, Delay Time Counter 123 is responsive to each clock pulse TCK1 provided by Clock Generator 120, with the result that Delay Time Counter 123 counts 20 clock pulses advancing from a count of $4_8$ to a count of $30_8$ in 2 microseconds. If the peripheral device being communicated with has a low data transfer rate and is connected to a low speed channel, Frequency Divider 125 causes Delay Time Counter 123 to count every fourth clock pulse provided by Clock Generator 120, with the result that Delay Time Counter 123 advances from a count of $4_8$ to a count of $30_8$ in response to 80 clock pulses provided by Clock Generator 120 to define a time period of 8 microseconds.

TABLE INPUT TO MEMORY (TIM)/TABLE OUTPUT FROM MEMORY (TOM)

The transfer of information between Memory 11 and the controlled and/or monitored process and between Memory 11 and various peripheral devices can be accomplished in the computer system in three ways, viz. direct-to-memory transfers, Gen II instructions and TIM/TOM operations. The direct-to-memory method of input/output utilizes channels in Memory Multiplexer 12 while Gen II instructions and TIM/TOM operations utilize I/O bus 25 of Arithmetic and Control Unit 10.

During direct-to-memory input/output, the operation of Arithmetic and Control Unit 10 is suspended for one memory cycle for each data transfer required. During the memory cycle, the data is transferred between Magnetic Core Storage Unit 13 and the peripheral controller to which the peripheral device is connected through Memory Multiplexer 12. Access to Magnetic Core Storage Unit 13 through Memory Multiplexer 12 can be obtained at the end of any memory cycle and does not require that the instruction currently being executed be completed. As soon as the data transfer has occurred, program execution continues in Arithmetic and Control Unit 10. Peripheral devices utilizing this method of input/output are normally high speed devices having high data transfer rates, such as magnetic disc units and magnetic drum units. Control words stored in Memory 11 are employed to control the direct-to-memory input/output operations.

Both the Gen II and TIM/TOM methods of input/output employ I/O bus 25 of Arithmetic and Control Unit 10. I/O bus 25 is time-shared by the peripheral devices connected to Peripheral Input/Output Buffer 16.

When a data transfer with a peripheral device is required, the address of the appropriate buffer and device is placed on I/O bus 25 to initiate the data transfer with the appropriate device. Each buffer requests service from Arithmetic and Control Unit 10 through I/O bus 25 as required. While I/O bus 25 is being used to accomplish a data transfer with one peripheral device, it is not available to other peripheral devices during the period of actual use by the communicating peripheral device.

The Gen II method of data transfer between Arithmetic and Control Unit 10 and peripheral devices requires execution of a Gen II instruction for each character or word transferred over I/O bus 25. A-Register 102, Parallel Adder Unit 110, Input/Output Expander 18 and Peripheral Input/Output Buffer 16 comprise the data transfer path between the communication peripheral device and Arithmetic and Control Unit 10 during execution of Gen II instructions. At least one additional instruction must be executed in addition to a Gen II instruction to complete the transfer of information from a peripheral device to Memory 10.

The TIM/TOM method of input/output also utilizes I/O bus 25 and enables input/output data transfer at a higher rate than the Gen II method, because of elimination of normal housekeeping operations. The data transfer path between the communicating peripheral device and Memory 11 during a TIM/TOM operation comprises B-Register 100 and Parallel Adder Unit 110 of Arithmetic and Control Unit 10, I/O bus 25 and the appropriate channel of Peripheral Input/Output Buffer 16. The contents of A-Register 102 and all other registers of Arithmetic and Control Unit 10 are not affected by a TIM or a TOM operation. FIG. 7 illustrates the data transfer paths employed during TIM/TOM operations in the computer system.

A TIM or TOM input/output operation comprises a predetermined sequence of events which automatically occurs in response to a program interrupt request from one of a plurality of selected channels of Peripheral Input/Output Buffer 16 connected to a corresponding plurality of selected peripheral devices as shown in FIG. 8. In response to the grant of a program interrupt request by Automatic Program Interrupt Unit 15, an automatic program interrupt or API response address is generated by Unit 15. When the interrupt request is honored by Arithmetic and Control Unit 10, the contents of the memory location identified by the generated response address are obtained from memory. The word stored in the addressed location is either a TIM or a TOM control word and is used to further identify the memory locations to be utilized in the data transfer with the peripheral device and to identify the quantity of information to be transferred during the input/output operation. The TIM or TOM control word also defines the organization of the transferred data, viz. the number of bytes contained in each 24-bit word. The organization of TIM/TOM control words is illustrated in FIG. 2*d*. If a channel providing a program interrupt request to Automatic Program Interrupt Unit 15 is not associated with a TIM or a TOM control word, a TIM/TOM operation does not occur.

TIM/TOM—General

The portions of the computer system of FIG. 4 employed during a TIM/TOM input/output operation and the apparatus controlling the operation are illustrated in FIG. 8. The channels of Peripheral Input/Output Buffer 16 apply program interrupt requests to Automatic Program Interrupt Unit 15 on lines 149 when an information transfer is required by the associated peripheral devices during program execution. If the interrupt request of a TIM or TOM channel is granted by Unit 15, a TIM or TOM operation is initiated. During a TIM or a TOM operation, B-Register 100 of Arithmetic and Control Unit 10 receives TIM/TOM control words in addition to the contents of memory locations to which or from which data is to be transferred from Magnetic Core Storage Unit 13 through Memory Data Register 81. Updated TIM/TOM control words and information being transferred during the TIM/TOM operation are transmitted from B-Register 100 to Magnetic Core Storage Unit 13 through Memory Multiplexer 12 and Memory Data Register 81. When Automatic Program Interrupt Unit 15 grants a program interrupt request of a channel, an address, termed a response address, of a memory location containing the TIM/TOM control word corresponding to the channel whose program interrupt request was granted is supplied by Automatic Program Interrupt Unit 15 to Memory Address Register 80 through Memory Multiplexer 12. Addresses of storage locations to which or from which data is transferred during a TIM/TOM operation are transmitted to Memory Address Register 80 through Memory Multiplexer 12 from I-Register 101. Parallel Adder Unit 112 serves as an information transfer path between B-Register 100 and I-Register 101 and between B-Register 100 and the TIM channels and the TOM channels of Peripheral Input/Output Buffer 16 during TIM/TOM operations. The contents of B-Register 100 are shifted left circular during TIM/TOM information transfers.

TIM/TOM Matrix 150 receives the response address generated by Automatic Program Interrupt Unit 15 when the peripheral device connected to either a TIM channel or a TOM channel of Peripheral Input-Output Buffer 16 is granted priority. TIM/TOM Matrix 150 receives the response address generated by Automatic Program Interrupt Unit 15 and generates a group of signals which are transmitted to the I/O bus to select a peripheral input/output buffer and peripheral device, to specify special sub-operations to be performed by the peripheral device and to specify the direction of data transfer between Memory 11 and the peripheral device. TIM/TOM Matrix 150 also provides an output signal to TIM/TOM Control Unit 155. TIM/TOM Control Unit 155 includes a counter and other logic employed to control the TIM/TOM operation in Arithmetic and Control Unit 10. If the channel granted priority by Automatic Program Interrupt Unit 15 is not a TIM or a TOM channel, no signals are generated by TIM/TOM Matrix 150 and a TIM or a TOM operation is not performed.

TIM/TOM—Matrix

Referring to FIG. 9, TIM/TOM Matrix 150 comprises a plurality of input conductors 160 and a plurality of output conductors 161 positioned transverse to the input conductors 160. A NAND-gate 162 is connected to one end of each input conductor 160, each of NAND-gates 162 receiving predetermined output signals of Automatic Program Interrupt Unit 15. The other ends of input conductors 160 are connected to NAND-gates 165. Each output conductor 161 is connected to an inverter 163. Diodes 164 are selectively connected between each input conductor 160 and predetermined ones of output conductors 161, the anode of the diode being connected to output conductor 161 and the cathode being connected to input conductor 160. The output signals of NAND-gates 165 are connected to the input terminals of NOR-gate 166. The output signal of NOR-gate 166 is designated $\overline{\text{HTTA}}$.

In operation, one of NAND-gates 162 is enabled in response to an appropriate response address output from Automatic Program Interrupt Unit 15, when Unit 15 grants the interrupt request of a TIM or a TOM channel, initiating interruption of the program to service the corresponding TIM channel or TOM channel of Peripheral Input/Output Buffer 16 and its associated peripheral device. The output signal of the enabled NAND-gate 162 on the associated input conductor 160 of the matrix becomes a binary 0. The signals on the output conductors 161 connected to the input conductor 160 through diodes 165 become binary 0's, the binary 0's being inverted to binary 1's at the output terminals of the associated inverters 163. The output signals of the remaining inverters 163 remain binary 0's. The output signals HT00-HT12 of inverters 103 are applied to I/O bus 25. Signal HT12 identifying a TIM operation if a binary 1 or a TOM operation if a binary 0 is also transmitted to TIM/TOM Control Unit 155. Signals HT00–HT11 specify the peripheral input/output buffer and the peripheral device whose channel interrupt request has been granted priority by Automatic Program Interrupt 15 and also specify any special sub-operations to be performed by the peripheral device. Signals HT00–HT11 on I/O bus 25 are transmitted to and decoded by the input/output controller and specified peripheral device.

Each of NAND-gates 165 produces a binary 1 output signal when the input signal on any one of the input conductors 160 connected thereto becomes a binary 0, indicating an input to the TIM/TOM Matrix from Automatic Program Interrupt Unit 15. In response to a binary 1 output from any one of NAND-gates 165, output signal $\overline{HTTA}$ of NOR- gate 166 becomes a binary 0, indicating that a TIM or a TOM operation is to be performed in the computer system. Output signal $\overline{HTTA}$ is applied to TIM/TOM Control Unit 155 to cause appropriate operations to occur in Arithmetic and Control Unit 10 during performance of the TIM or TOM input/output operation.

FIG. 9 illustrates diode connections between two input conductors 160 and output conductors 161. The diode connection pattern between the left-most or first input conductor 160 in the drawing and output conductors 161 causes the matrix output signals in response to enabling of the associated NAND-gate 162 to be HT00 $\overline{HT01}$ HT02 HT03 $\overline{HT04}$ $\overline{HT05}$ HT06 $\overline{HT07}$ $\overline{HT08}$ $\overline{HT09}$ $\overline{HT10}$ HT11 HT12. Signal HT12 identifies the channel granted priority as a TIM channel. The remaining signals identify the particular buffer, device and special suboperations in accordance with a desired code. The matrix output signals in response to enabling of the NAND-gate connected to the second input conductor 160 are $\overline{HT00}$ HT01 $\overline{HT02}$ HT03 $\overline{HT04}$ $\overline{HT05}$ $\overline{HT06}$ HT07 $\overline{HT08}$ $\overline{HT09}$ HT10 $\overline{HT11}$ $\overline{HT12}$. Signal $\overline{HT12}$ identifies the channel whose interrupt request was granted priority as a TOM channel and the resulting operation as a TOM operation. The remaining signals identify the buffer, device and special suboperations in accordance with a predetermined code. The remaining input conductors 160 may be connected to output conductors 161 through diodes 164 as necessary to generate desired output signals from the matrix in response to enabling of the associated NAND-gates 162.

TIM/TOM Control Unit

The logical structure of TIM/TOM Control Unit 155 is illustrated in FIGS. 10*a*–10*c*. Referring to FIG. 10*a*, output signal $\overline{HTTE}$ of NAND-gate 170 becomes a binary 0 when all four input signals to NAND-gate 170 are binary 1's indicating that Automatic Program Interrupt Unit 15 is interrupting program execution in response to an interrupt request (SCD1), Automatic Program Interrupt Unit 15 has provided an input response address to TIM/TOM Matrix 150 causing TIM/TOM Matrix 150 to generate an output (HTTA) and output signal TSCC has issued from Sequence Time Counter 122 during Sequence Control State 1 (SC01). In response to signal $\overline{HTTE}$ and to the reset output signal of TIM/TOM Flip-Flop TTF ($\overline{FTTF}$), output signal HTTF of NAND-gate 171 becomes a binary 1, causing flip-flop TTF to be set to the 1-state when timing signal TSCA issues from Sequence Time Counter 122 and clock signal TCK1 is generated by Clock Generator 120. Flip-flop TTF if reset to the 0-state during Sequence Control State 5 (SC05) when signal MRLS issues indicating the end of a memory cycle and completion of a TIM/TOM operation. Flip-flop TTF is also initially reset during Sequence Control State 1 (SC01) upon issuance of timing signal TSCC.

Output signal $\overline{HTIM}$ of NAND-gate 172 becomes a binary 0 in response to output signal HT12 from TIM/TOM Matrix 150 indicating that the operation is a TIM operation, i.e. information is to be transferred from a peripheral device to Memory 11. The output of NAND-gate 172 is inverted in inverter 173 and applied to input terminals of NAND-gates 174 and 175. Output signal $\overline{HCLB}$ of NAND-gate 174 becomes a binary 0 to clear B-Register 100 during Sequence Control State 4 (SC04) of a TIM operation when the first transfer of information from a peripheral device to the memory location identified by the TIM control word is to occur, with timing of output signal $\overline{HCLB}$ being controlled by signals MRLS, TSCA and TCK1. Output signal $\overline{HAU7}$ of NAND-gate 175 becomes a binary 0 to cause transfer of information from Parallel Adder Unit 110 to B-Register 100 during time 6 envelope (TT6E) of Sequence Control State 4 of a TIM operation with timing of signal $\overline{HAU7}$ controlled by output signals FAFF and FBFF of Delayed Time Counter 123 and clock signal TCK1.

Output signal $\overline{H77X}$ of NAND-gate 176 is a binary 0 during a TIM/TOM operation when output signals U23S–U18S of Parallel Adder Unit 110 indicate that the N-field of the TIM/TOM control word has reached $77_8$. Signal $\overline{H77X}$ thus indicates that all data words required to be transferred between memory and a peripheral device under control of the TIM/TOM control word presently stored in I-Register 101 have been completed.

Output signal HECO of NOR-gate 177 is a binary 1 when both signals $\overline{H77X}$ and $\overline{U17C}$ are binary 0's. Signal HECO therefore issues when the N-field of the TIM/TOM control word has reached $77_8$ and a carry occurs from bit position 17 of the control word C-field, indicating that the last transfer of information between memory and the peripheral device under control of the present control word is occurring. Output signal HSTP of OR-gate 178 issues if a carry out of the N-field of the control word occurs, indicated by signal U23C, or if the N-field of the control word has reached $77_8$ and no carry occurs out of the C-field upon incrementation of the C-field during Sequence Control State 1. Signal HSTP causes the TIM/TOM operation to be immediately terminated, leaving the N-field of the control word at $77_8$ in memory so that the control word cannot thereafter be inadvertently used to control information transfers between memory and a peripheral device.

Output signal HUI1 of AND-gate 179 issues during Sequence Control State 1 (SC01) of a TIM/TOM operation (HTTF), with timing of signal HUI1 being controlled by signals MRLS and TSCA. Signal HUI1 causes signal IUIU to issue to transfer the C and N fields of the control word from Parallel Adder Unit 110 to I-Register 101.

Referring to FIGURE 10*b*, output signal HCA4 of AND-gate 180 issues during Sequence Control State 1 (SC01) of a TIM/TOM operation (HTTF) when both signals TSCA and TSCC are issued by Sequence Time Counter 122. Signal HCA4 is employed to control the generation of output signal HI16 of OR-gate 181.

Output signal HCA5 of OR-gate 182 issues in response to any one of the four signal combinations FB16 $\overline{FB14}$, $\overline{FB16}$ FB14, FB17 $\overline{FB15}$ or $\overline{FB17}$ FB15, indicating that the C-field of the TIM/TOM control word in B-Register 100 is different from the P-field of the control word. Signal HCA5 controls the generation of signal IJ00 which causes incrementation of the Y-field of the TIM/TOM control word during Sequence Control State 1 of a TIM or a TOM operation. The Y-field of the control word is incremented only if signal HCA5 is a binary 0, indicating that the C and P fields of the control word are equal and the first transfer of information to or from a new memory location is to occur.

Output signal HBAU of AND-gate 183 issues during Sequence Control State 3 (SC03) of a TIM or a TOM operation (HTTF) if the contents of the C-field of a control word are 00, indicating that the last byte of the current word has been transferred. The timing of the signal HBAU in Sequence Control State 3 is controlled by output signals $\overline{TSCA}$ and TSCB of Sequence Time Counter 122 and clock signal TCK1 of Clock Generator 120. Signal HBAU controls the generation of signals BAUU and BAUL to cause transfer of the control word in I-Register 101 through Parallel Adder Unit 110 to B-Register 100.

Output signal HI17 of AND-gate 184 issues during Sequence Control State 3 (SC03) of a TIM or a TOM operation (HTTF) when the contents of the C-field of the control word are 00 ($\overline{FBI7}$ $\overline{FBI6}$) and the most significant bit of the P-field is a binary 1 (FI15). The timing of signal HI17 during Sequence Control State 3 is controlled by output signals $\overline{TSCA}$ and $\overline{TSCC}$ of Sequence Time Counter 122 and clock signal TCK1. Similarly, output signal HI16 of OR-gate 181 issues during Sequence Control State 3 (SC03) of a TIM or a TOM operation (HTTF) when the contents of the C-field of the control word are 00 ($\overline{FBI7}$ $\overline{FBI6}$) and the least significant bit of the P-field is a binary 1 (FI14). The timing of signal HI16 within Sequence Control State 3 is controlled by output signal $\overline{TSCA}$ of Sequence Time Counter 122 and by clock signal TCK1. Signals HI17 and HI16 serve to transfer the contents of the P-field to the C-field in I-Register 101 after a complete word has been transferred under control of the TIM/TOM control word. The control word is subsequently transferred from the I-Register 101 to B-Register 100 under control of signal HBAU. Signal HI16 also issues during Sequence Control State 1 in response to signal HCA4 and clock signal TCK1 to cause incrementation of the C-field of the control word.

FIG. 10*c* illustrates the TIM/TOM counter of TIM/TOM Control Unit 155. The TIM/TOM counter comprises flip-flops CFA, CFB, CFC, CFD and CFE. The TIM/TOM counter serves primarily to control the number of bit positions through which the contents of B-Register 100 are shifted during a TIM/TOM operation when the P-field of the TIM/TOM control word indicates that the data words to be transferred between memory and a peripheral device contain two, three or four bytes. Flip-flop CFA of the TIM/TOM counter is also employed to remember is the memory location identified by the TIM/TOM control word is being used for a data transfer for the first time during the TIM/TOM operation.

In operation, flip-flops CFB, CFC, CFD and CFE of the TIM/TOM counter are reset to the 0-state during Sequence Control State 1 by signal SC01 in combination with clock signal TCK1. Flip-flop CFA is set to the 1-state during Sequence Control State 1 by signal combination SC01 TSCA TCK1. Flip-flop CFA is subsequently reset to the 0-state during Sequence Control State 1 of a TIM/TOM operation at a time defined by signal combination HCA4 TCK1 if the C-field of the TIM/TOM control word equals the P-field ($\overline{HCA5}$), indicating that the memory location identified by the Y-field of the control word is being employed for the first time during a TIM/TOM operation directed by the control word presently stored in B-Register 100. Flip-flop CFA of the TIM/TOM counter stores this information for later use during the TIM/TOM operation.

During Sequence Control State 3 of the TIM/TOM operation, a count corresponding to the number of bytes in each word being transferred between Memory 11 and the peripheral device, as designated in the P-field of the TIM/TOM control word, is stored in the TIM/TOM counter. If the P-field of the TIM/TOM control word, as stored in flip-flops B15 and B14 of B-Register 100, is 00, indicating that each word be transferred under the direction of the control word contains four bytes of six bits each, flip-flop CFB of the TIM/TOM counter is set to the 1-state. The signal combination causing this change of state of flip-flop CFB is $\overline{FB15}$ $\overline{FB14}$ SC03 TSCB TCK1, as illustrated in FIG. 10*c*. If the states of flip-flops B15 and B14 of B-Register 100 represent a P-field bit combination of 01, indicating that each word transferred under the direction of the control word contains three bytes, each byte comprising eight binary digits, flip-flop CFC is set to the 1-state during Sequence Control State 3. The signal combination causing flip-flop CFC to be set to the 1-state is $\overline{FB15}$ FB14 SCO3 TSCB TCK1. If the P-field of the TIM/TOM control word, as represented in flip-flops B15 and B14 of B-Register 100, contains the bit combination 10 indicating that each word transferred under the direction of the control word contains two bytes of twelve bits each, flip-flops CFB, CFC, CFD and CFE remain reset to the 0-state. If the P-field of the control word contains the bit combination 11, indicating one byte per word, flip-flop CFD is set to the 1-state by signal combination FB15 FB14 SC03 TSCA TCK1.

The following table illustrates the states assumed by flip-flops CFB, CFC, CFD and CFE of the TIM/TOM counter during Sequence Control State 3 in accordance with the number of bytes contained in each word to be transferred under control of the TIM/TOM control word.

TIM/TOM COUNTER—SEQUENCE CONTROL STATE 3

| P | CFB | CFC | CFD | CFE |
|---|---|---|---|---|
| 00 | 1 | 0 | 0 | 0 |
| 01 | 0 | 1 | 0 | 0 |
| 10 | 0 | 0 | 0 | 0 |
| 11 | 0 | 0 | 1 | 0 |

During Sequence Control State 4 when signal MRLS issues indicating the end of Time 5 envelope, the count information stored in flip-flop CFD of the TIM/TOM counter is transfered to flip-flop CFA. Thus, if flip-flop CFD was set during Sequence Control State 3 to indicate tha each word transferred under direction of the TIM/TOM control word contains one byte, flip-flop CFA is set to he 1-state in response to signal combination SC04 TCK1 MRLS FCFD, if not already in the 1-state. Similarly, if flip-flop CFD is reset to the 0-state, flip-flop CFA is reset to the 0-state during Sequence Control State 4 at the end of Time 5 envelope by signal combination SC04 TCK1 MRLS HTTF $\overline{FCFD}$. The states of the flip-flops of the TIM/TOM counter after transfer of the information stored in flip-flop CFD to flip-flop CFA as the system enters Time 6 envelope of Sequence Control State 4 as well as the count sequence of the TIM/TOM counter as illustrated in the following table:

TIM/TOM COUNTER—SEQUENCE CONTROL STATE 4

| FCFA | FCFB | FCFC | FCFD | FCFE | |
|---|---|---|---|---|---|
| 0 | 0 | 0 | 0 | 0 | P=10 (two bytes per word, shift 12 places). |
| 0 | 0 | 0 | 0 | 1 | P=01 (three bytes per word, shift 8 places). |
| 0 | 0 | 0 | 1 | 0 | |
| 0 | 0 | 0 | 1 | 1 | |
| 0 | 0 | 1 | 0 | 0 | |
| 0 | 0 | 1 | 0 | 1 | P=00 (four bytes per word, shift 6 places). |
| 0 | 1 | 0 | 0 | 0 | |
| 0 | 1 | 0 | 0 | 1 | P=11 (one byte per word. no shift) or end of shift. |
| 0 | 1 | 0 | 1 | 0 | |
| 0 | 1 | 0 | 1 | 1 | |
| 0 | 1 | 1 | 0 | 0 | |
| 0 | 1 | 1 | 0 | 1 | |
| 1 | 0 | 0 | 0 | 0 | |

As illustrated in the above table, all flip-flops of the TIM/TOM counter are reset to the 0-state as the system enters Time 6 envelope of Sequence Control State 4 during a TIM/TOM operation if the P-field of the TIM/TOM control word specifies that each word contains two bytes of twelve bits each. Twelve states of the counter separate that initial state from the final counter state in which flip-flop CFA is set to the 1-state and all other flip-flops are reset to the 0-state. These intermediate twelve states enable the TIM/TOM counter to cause the contents of B-Register 100 to be shifted circularly through twelve bit positions to properly position the contents of B-Register 100 for transfers of 12-bit bytes.

The initial state of the counter is 00100 with flip-flop CFC set and all other flip-flops reset if the P-field of the control word specifies three 8-bit bytes per word. Eight states of the counter then separate the initial and final states to enable the counter to cause the contents of B-Register 100 to be circularly shifted through eight bit positions to properly locate the B-Register contents for transfers of 8-bit bytes. The initial state of the TIM/TOM counter is 01000 with flip-flop CFB set and all other flip-flops reset if the P-field of the control word specifies four 6-bit bytes per word. Six states of the counter then separate the initial and final states to enable the counter to cause the contents of B-Register 100 to be circularly shifted through six bit positions, properly locating the B-Register contents for transfer of 6-bit bytes. If the P-field of the control word specifies one byte per word, the initial state and also the final state of the counter is 10000 with flip-flop CFA set and all other flip-flops reset. Output signal FCFA of flip-flop CFA inhibits shifting of the contents of B-Register 100 and inhibits change in state of the lowest order flip-flop CFE and of all other flip-flops of the TIM/TOM counter.

The operation of the TIM/TOM counter in counting from its initial state to its final state, if the words being transferred during the TIM/TOM operation contain two, three or four bytes, is described as follows. When output signal $\overline{\text{FCFA}}$ of flip-flop CFA is a binary 1, indicating that each word contains more than one byte, signal HCE1 is generated during Time 6 envelope (TT6E) to permit the contents of B-Register 100 to be shifted left circular through 1-bit position for each clock pulse TCK1. Signal $\overline{\text{FCFA}}$ also enables the input gates to flip-flop CFE of the TIM/TOM counter during Time 6 envelope to permit flip-flop CFE to change state in response to each clock pulse TCK1.

Assuming an initial state of 00000 in the TIM/TOM counter (two bytes per word) flip-flop CFE is set to the 1-state in response to the first clock pulse TCK1, recording the first shift of the contents of B-Register 100. In response to the second clock pulse TCK1, flip-flop CFE is reset to the 0-state and flip-flop CFD is set to the 1-state to count the second shift in B-Register 100. The TIM/TOM counter responds to the next three clock pulses in a normal manner advancing the count to 00101. In response to the next clock pulse, flip-flop CFD would normally be set as flip-flop CFE is reset; however, flip-flop CFB is set to the 1-state during the next clock pulse in response to the input signal combination FCFE FCFC $\overline{\text{FCFB}}$ TCK1. Concurrently, flip-flop CFC is reset to the 0-state by input signal combination FCFE $\overline{\text{FCFD}}$ TCK1 while setting of flip-flop CFD is inhibited by signal FCFC. Thus, the state of the TIM/TOM counter following state 00101 is 01000.

The TIM/TOM counter responds to the next five clock pulses TCK1 in a conventional manner to advance the state of the counter to 01101 after the contents of the B-Register 100 have been shifted left circular through eleven bit positions. At this time, output signal HBCE of AND-gate 190 issues since flip-flops CFB, CFC and CFE are set to the 1-state. In response to the next clock pulse TCK1, flip-flop CFA is set to the 1-state in response to signal combination HBCE $\overline{\text{FCFA}}$ TCK1. In response to the same clock pulse, flip-flop CFB is reset to the 0-state by signal combination FCFE FCFC FCFB TCK1. Flip-flop CFC is concurrently reset to the 0-state by signal combination FCFE, $\overline{\text{FCFD}}$ TCK1, flip-flop CFE is reset to the 0-state and the setting of flip-flop CFD to the 1-state is inhibited by signal FCFC. Thus, in response to the twelfth clock signal TCK1, the TIM/TOM counter assumes state 100000 to indicate that the contents of B-Register 100 have been shifted left circular through 12 bit positions. The binary 0 state of output signal $\overline{\text{FCFA}}$ inhibits the generation of signal HCE1, to prevent further shifting of the contents of B-Register 100. The binary 0 state of signal $\overline{\text{FCFA}}$ also inhibits further changes in state of flip-flop CFE and the other flip-flops of the TIM/TOM counter in response to clock pulses TCK1. If the initial states of the TIM/TOM counter are either 00100 or 01000 corresponding to three 8-bit bytes or four 6-bit bytes per word respectively, the functioning of the TIM/TOM counter is as described above, except that the number of clock pulses TCK1 counted until the final state of the counter is reached corresponds to the shift distance in B-Register 100 required by the byte count in the P-field of the control word.

TIM/TOM operation—General

A TIM or a TOM operation is initiated in Arithmetic and Control Unit 10 when Automatic Program Interrupt Unit 15 grants the program interrupt request transmitted from a TIM channel or a TOM channel of Peripheral Input/Output Buffer 16. In responding to the program interrupt request, Automatic Program Interrupt Unit 15 generates the address of the memory location storing the control word corresponding to the channel whose program interrupt request was granted. The address generated by Automatic Program Interrupt Unit 15 is termed the interrupt response address. The address output of Automatic Program Interrupt Unit 15 is employed by TIM/TOM Matrix 150 to generate signals identifying the buffer and peripheral device whose program interrupt request has been granted, this information being applied to I/O bus 25 for transmission to the appropriate buffer and peripheral device. TIM/TOM Matrix 150 also generates a signal identifying the channel whose program interrupt request has been granted as either a TIM channel or a TOM channel, this signal being employed in Arithmetic and Control Unit 10 to control certain operations related to the TIM and TOM operations.

Tim operation: During a TIM operation, a TIM control word is obtained from the storage location of Memory 11 whose address is generated by Automatic Program Interrupt Unit 15 and is transferred to Arithmetic and Control Unit 10. The N and C fields are checked and the C, N and Y fields of the TIM control word are incremented, if necessary, to update the TIM control word. The updated TIM control word is restored to its memory location. The contents of the memory storage location identified by the Y-field of the TIM control word are transferred from Memory 11 to Arithmetic and Control Unit 10. The contents of the memory location are then cleared from Arithmetic and Control Unit 10 if the memory location is being employed for the first time in a data transfer operation (i.e. if the first byte of the word is being transferred) under the direction of the TIM control word. The contents of the memory location are shifted in Arithmetic and Control Unit 10, as required, in accordance with the number of bytes per word as specified by the TIM control word. The information being transferred from the peripheral device over I/O bus 25 is next combined with the shifted contents of the memory location identified by the Y-field of the TIM control word, if not the first use of the memory location, and restored to the memory location. The above sequence occurs each time the program interrupt request of the same TIM channel is granted by Automatic Program Interrupt Unit 15 until the number of words specified by the N-field of the control word have been transferred from the peripheral device connected to the TIM channel to Memory 11. When the proper number of words have been transferred, echo interrupt signal HECO is generated and the program loads the memory location associated with the TIM channel with another TIM control word, preparatory to the next data transfer from the peripheral device to Memory 11.

TOM operation: During a TOM operation, the TOM control word stored in the memory location of Memory 11 identified by the address generated by Automatic Program Interrupt Unit 15 and corresponding to the TOM channel whose program interrupt request has been granted, is transferred to Arithmetic and Control Unit 10. The N and C fields of the TOM control word are examined and the N, C and Y fields of the control word are incremented as required to update the TOM control word. The updated TOM control word is then transferred from Arithmetic and Control Unit 10 to Memory 11 for storage in its memory location.

The contents of the memory location identified by the Y-field of the TOM control word are transferred from Memory 11 to Arithmetic and Control Unit 10. If the P-field of the TOM control word specifies more than one byte per word, the contents of the memory location are shifted left circular through the appropriate number of bit positions to properly position the byte to be transferred to the peripheral device through the TOM channel. The information is then transferred to the appropriate peripheral device and the contents of the memory location identified by the Y-address of the TOM control word are restored to memory. The above sequence occurs each time that a program interrupt request from the TOM channel is granted by Automatic Program Interrupt 15 until the number of words specified by the N-field of the TOM control word are transferred from Memory 11 to the peripheral device. After the appropriate number of words have been transferred, an echo signal HECO is generated, causing the program to load the memory location containing the control word for that channel with another TOM control word in preparation for the next transfer of information from Memory 11 to the peripheral device.

TIM/TOM operation—Details

In performing a TIM or a TOM input or output operation, the computer system progresses through Sequence Control States 1, 3, 4 and 5 in that order to perform the data transfers and other functions required to accomplish the TIM or TOM operation, as illustrated in FIG. 11. During Sequence Control State 1, the control word is transferred from its memory location to B-Register 100 of Arithmetic and Control Unit 10. Any required updating of the control word is performed during Sequence Control State 1 in Parallel Adder Unit 110. The updated control word is then stored in both B-Register 100 and I-Register 101. The C and N fields of the updated control word are checked and if these fields indicate that the control word should not be used, the operation is terminated. Absent the latter condition, Sequence Control State 3 is entered.

During Sequence Control State 3, the contents of the C-field of the control word are adjusted if necessary and the updated control word is restored to its memory location. The correct count is inserted in the TIM/TOM counter in accordance with the number of bytes in each word being transferred between Memory 11 and the appropriate peripheral device, as specified by the P-field of the control word. Sequence Control State 4 is then entered.

During Sequence Control State 4, the contents of the memory location identified by the Y-field of the control word are transferred to B-Register 100 and any required clearing or shifting is performed in B-Register 100 to prepare the contents of the B-Register 100 for transfer of information to the I/O bus during a TOM operation or for receipt of information from the I/O bus during a TIM operation. The information transfer is effected and Sequence Control State 5 is next performed.

During Sequence Control State 5, the contents of B-Register 100 are stored in the memory location identified by the Y-field of the control word. The TIM or TOM operation is terminated and the computer system returns to the interrupted program. The events which occur during each of Sequence Control States 1, 3, 4 and 5 are described in detail in the following sections.

Sequence Control State 1: A flow chart showing the operations performed during Sequence Control State 1 of a TIM/TOM operation is illustrated in FIG. 12. FIG. 13 illustrates the information transfers which occur during Sequence Control State 1 of a TIM/TOM operation and FIG. 14 is a timing diagram illustrating the major timing, gating and logic signals which occur during Sequence Control State 1. In FIG. 14, clock signals TCK1 are not shown in true proportion as in FIG. 5, in order to simplify the timing diagram.

Referring to FIGS. 12, 13 and 14, upon initiation of a program interrupt by Automatic Program Interrupt Unit 15 in response to an interrupt request from a TIM or TOM channel, Sequence Control State 1 is entered by Arithmetic and Control Unit 10. Signal SAMW issues to gate the response address corresponding to the TIM or TOM channel being granted priority from Automatic Program Interrupt 15 to Memory Address Register 80. Flip-flop CFA of the TIM/TOM counter is simultaneously set to the 1-state and flip-flops CFB, CFC, CFD and CFE are cleared or reset to the 0-state. Signal HTTF next issues from the TIM/TOM control logic to indicate that TIM/TOM matrix 150 is generating information signals for application to I/C bus 25. Signals ICU1 and ICLL next issue to clear I-Register 101. In response to signal MDRY from memory indicating that the control word is available in Memory Data Register 81 from Magnetic Core Storage Unit 13, Signal BMEM issues to gate the control word from Memory Data Register 81 to B-Register 100 of the Arithmetic and Control Unit 10.

At this time, the C and P fields of the control word in B-Register 100 are examined to determine whether or not the C-field is equal to the P-field of the control word. If the equality exists, signal $\overline{\text{HCA5}}$ is a binary 1 causing signal IJ00 to issue, setting flip-flop 100 of I-Register 101. If the equality exists indicating that the memory location identified by the Y-field of the control word is being utilized for the first time for a data transfer under direction of the control word, flip-flop CFA of the TIM/TOM counter is also reset to the 0-state to store this fact. Signal HI16 issues at this time to set flip-flop I16 of I-Register 101. Signal UBBU issues to apply the control word in B-Register 100 to the inputs of Parallel Adder Unit 110. Gating signals UIAU and UILA also issue to apply the contents of I-Register 101 to the inputs of Parallel Adder Unit 110. The C-field of the control word is thus incremented in Parallel Adder Unit 110 by virtue of input signal FI16 from I-Register 101 and the Y-field is also incremented by virtue of output signal FI00 of I-Register 101 if flip-flop I00 had previously been set by signal IJ00.

At this point, TIM/TOM Control Logic 155 inspects the output signals of Parallel Adder Unit 110. If signal U23C has issued indicating a carry has occurred out of the N-field of the control word during updating in Parallel Adder Unit 110, signal HSTP issues, terminating the TIM/TOM operation. Signal U23C indicates that the N-field was equal to $77_8$ prior to the updating and therefore no more words are to be transferred between Memory 11 and a peripheral device under the direction of this control word. If output signals U23S–U18S of Parallel Adder Unit 110 indicate that the N-field after the update operation is equal to $77_8$ and if carry output signal U17C from the C-field of the control word is a binary 1 indicating that the N-field was incrmented to $77_8$ during the present update operation, signal HSTP also issues to terminate the TIM/TOM input/output operation, since the N-field was equal to $77_8$ prior to the updating operation.

If output signals U23S–U18S of Parallel Adder Unit 110 indicate that the N-field of the control word is $77_8$ and if carry output signal U17C from bit position 17 is a binary 1 indicating that the N-field was incremented to $77_8$ during the present update operation, signal HECO is generated by TIM/TOM control logic 155, causing a program interrupt to be initiated upon completion of the current TIM/TOM information transfer to cause the program to store a new TIM/TOM control word in the memory location corresponding to the channel being serviced, preparatory to the next data transfer operation involving that channel.

Gating signals BAUU and BAUL next issue to transfer the updated control word represented by output signals U23S–U00S of Parallel Adder Unit 110 to B-Register 100. Signal HUI1 is also generated by TIM/TOM control logic 155 at this time to cause Signal IUIU to isue, gating the C and N fields as represented by output signals U23S–U16S of Parallel Adder Unit 110 to the corresponding storage locations of I-Register 101. Gating signals IUIL and IULI also issue at this time to transfer the P and Y fields, represented by output signals U15S–U00S of Parallel Adder Unit 110, to the appropriate storage locations of I-Register 101. Arithmetic and control Unit 10 then enters Sequence Control State 3 to continue the TIM/TOM input/output operation.

TIM/TOM operation—Sequence Cotnrol State 3: A flow chart showing the operations performed during Sequence Control State 3 of a TIM/TOM operation is illustrated in FIG. 15. FIG. 16 illustrates the information transfers which occur and FIG. 17 is a timing diagram illustrating the major timing, gating and logic signals which occur during Sequence Control State 3. In FIG. 17, clock signals TCK1 are not shown in true proportion as in FIG. 5, in order to simplify the timing diagram. Referring to FIGS. 15, 16 and 17, upon entering Sequence Control State 3, signals HI17 and HI16 may issue if the C-field of the TIM/TOM control word in B-Register 100, as represented by the states of flip-flops B17 and B16, is equal to 00, indicating that the last byte of the present word is being transferred and that a new memory location will be employed during the next data trasnfer under direction of the TIM/TOM control word. Issuance of signal HI17 is conditioned on bit 15 of the P-field of the control word, as stored in flip-flop I15 of I-Register 101, being a binary 1. Similarly, the issuance of HI16 is conditioned on bit 14 of the P-field of the control word, as stored in flip-flop I14 of I-Register 101, being a binary 1. If signal HI17 issues, bit 17 of the C-field of the control word in I-Register 101 is made a binary 1. If signal HI16 issues, bit 16 of the C-field of the control in I-Register 101 is made a binary 1. Thus, signals HI17 and HI16 serve to render the C-field of the control word in I-Register 101 equal to the P-field of the control word, preparatory to employment of the control word to direct the transfer of a new information word between the peripheral device and the next memory location identified by the Y-field of the control word.

Signals UIAU and UILA issue to apply the control word in I-Register 101, with the C-field updated, i.e. made equal to the P-field, under the conditions described above, to the inputs of Parallel Adder Unit 110. If the C-field of the control word, as stored in flip-flops B17 and B16 of B-Register 100, is equal to 00, indicating that the last byte of the current word is being tarnsferred and that the C-field of the control word in B-Register 100 must be made equal to the P-field preparatory to the transfer of a new data word, signal HBAU is issued by TIM/TOM Control Logic 155 to cause gating signals BAUL and BAUU to issue. The latter two signals transfer the control word with updated C-field from the output terminals of Parallel Adder Unit 110 to B-Register 100 to position the updated control word for storage in the appropriate storage location of Magnetic Core Storage Unit 13.

Gating signal SAMW issues to transfer the address of the control word storage location generated by Automatic Program Interrupt Unit 15 to Memory Address Register 80. A memory write operation is initiated by signal STOR and the updated control word in B-Register 100 is transferred through Memory Data Register 81 for storage in the addressed memory location of Magnetic Core Storage Unit 13.

During Sequence Control State 3, the TIM/TOM counter is preset based on the contents of the P-field, as illustrated in FIG. 17. Signal ICUI is generated in Arithmetic and Control Unit 10 and applied to I-Register 101 to clear the N, C and P fields from I-Register 101. This is done in order to make the contents of I-Register 101 appear like a particular instruction word, simplifying the TIM/TOM logic. For the remainder of the operations, the TOM/TOM logic simply overrides this apparent instruction. Arithmetic and Control Unit 10 next enters Sequene Control State 4 to continue performance of the TIM/TOM operation.

TIM/TOM operation—Sequence Control State 4: The flow chart showing the operations which occur during Sequence Control State 4 of a TIM/TOM operation is illustrated in FIG. 18. FIG. 19 illustrates the information transfers which occur during Sequence Control State 4. FIG. 20 is a timing diagram illustrating the major timing, gating and logic signals which generally occur during Sequence Control State 4, irrespective of the number of bytes per word specified by the P-field of the TIM/TOM control word. FIG. 21 is a timing diagram illustrating the major timing, gating and logic signals which occur during Sequence Control State 4 if the P-field of the control word is 11, specifying one byte per word. FIG. 22 is a timing diagram illustrating the major timing, gating and logic signals which occur during Sequence Control State 4 if the P-field of the control word is 10, specifying two bytes per word. FIGS. 23 and 24 are timing diagrams illustrating the major timing, gating and logic signals which occur during Sequence Control State 4 if the P-field of the control word is 01, specifying three bytes per word, or 00, specifying four bytes per word, respectively. In FIGS. 20–24, clock signals TCK1 are not shown in true proportion as in FIG. 5, in order to simplify the timing diagram.

Referring to FIGS. 18, 19 and 20, upon entering Sequence Control State 4 during a TIM/TOM operation, gating signal SAMI issues to gate the Y-field of the control word in I-Register 101 to Memory Address Register 80. A memory read cycle is initiated and the contents of the storage location of Magnetic Core Storage Unit 13 identified by the Y-field of a control word are transferred to Memory Data Register 81. Gating signal BMEM then issues to transfer the contents of the address memory location or Y memory location to B-register 100.

During Time 3 envelope (TSCC TSCB TSCA) of Sequence Control State 4 during a TIM/TOM operation, signal TPAF issues to preset Delay Time Counter 123 to a count of thirty (FAFF FBFF $\overline{\text{FCFF}}$ $\overline{\text{FBFF}}$ $\overline{\text{FEFF}}$), as illustrated in FIG. 20. At the end of Time 3 envelope, both flip-flops EC1 and EC2 of Extended Time Counter 24 are set to the 1-state. In response to output signals FAFF and FBFF of Delay Time Counter 123 and output signal FEC1 of Extended Time Counter 124, signal TP04 issues, causing flip-flops AFF and BFF to be reset to the 0-state and causing flip-flop CFF of the Delay Time Counter 123 to be set to the 1-state. Delay Time Counter 123 is thus preset to a count of four.

During Time 5 envelope ($\overline{\text{TSCC}}$ $\overline{\text{TSCB}}$ TSCA), if the input/output operation being performed is a TIM operation, indicated by output signal HT12 of the TIM/TOM Matrix 150 being a binary 1, and if flip-flop CFA of the TIM/TOM counter was reset to the 0-state during Sequence Control State 1 of the TIM operation, indicating that the Y memory location is being used for the first time for an information transfer under the direction of the present TIM/TOM control word, signal HCLB issues in TIM/TOM Control Logic 155 causing signal BCLR to be applied to B-Register 100, clearing the contents of the Y memory location from B-Register 100. Signal MRLS issues to indicate the end of Time 5 envelope.

During Time 6 envelope (defined by signal TT6E) of Sequence Control State 4 of a TIM/TOM operation, Delay Time Counter 123 counts twenty pulses TCK1 to advance the count in the counter to thirty. In response to the count of thirty in Delay Time Counter 123, signal TPAF issues to reset all flip-flops of the counter to the 0-state. Simultaneously, signal TP04 issues to set flip-flop CFF to the 1-state, again presetting Delay Time Counter 123 to a count of four. In response to a count of thirty in Delay Time Counter 123, flip-flop EC2 of Extended Time Counter 124 is reset to the 0-state, causing Phase A signal NPHA to issue. Signal NPHA is provided during the period required by Delay Time Counter 123 to count an additional twenty clock pulses TCK1 and controls the timing of particular operations in the input/output buffer and peripheral device with which the information transfer is being accomplished.

When Delay Time Counter 123 again reaches a count of thirty, signals TPAF and TP04 again issue, presetting Delay Time Counter to a count of four. Concurrently, flip-flop EC1 of Extended Time Counter 124 is reset to the 0-state while flip-flop EC2 is again set to the 1-state to cause Phase B signal NPHB to issue as Delay Time Counter 123 again counts twenty clock pulses TCK1, advancing the count to thirty. Phase B signal NPHB controls the timing of certain operations within the input/output buffer and the peripheral device with which the information transfer is being effected. In response to the count of thirty in Delay Time Counter 123, signal TPAF again issues to reset Delay Time Counter 123 to a count of 0. Flip-flop EC2 is reset to the 0-state at this time.

Gating signal UBBU gates the contents of B-Register 100, cleared during Time 5 envelope or shifted during the early portion of Time 6 envelope as required, to the inputs of Parallel Adder Unit 110. If the operation is a TIM operation, signals UIOU and UIOL issue when flip-flop CFA of the TIM/TOM Counter is set to the 1-state to gate the information from the peripheral device on the I/O bus to the inputs of Parallel Adder Unit 110, combining or "ORing" the information from the peripheral device with the contents of B-Register 100. Gating signals BAUL and BAUU issue at the end of Time 6 envelope to gate the output of Parallel Adder Unit 110 including the information being transferred from the peripheral device to B-Register 100. If the operation is a TOM operation, the information being transmitted to the peripheral device over the I/O bus is available at the output terminals of Parallel Adder Unit 110. Arithmetic and Control Unit 10 next enters Sequence Control State 5.

The function of the TIM/TOM counter of TIM/TOM Contrfol Logic 155 during Time 6 envelope is illustrated by the timing diagrams of FIGS. 21–24. Referring to FIG. 21 which illustrates the timing diagram of the TIM/TOM counter and related functions when the P-field of the control word is 11 specifying one byte per word, flip-flop CFA is set to the 1-state in response to the clock pulse immediately preceding Time 6 envelope, inhibiting shifting in B-Register 100 and inhibiting change in state of other flip-flops of the TIM/TOM counter. If the operation is a TIM operation, gating signals UIOU and UIOL simultaneously issue to gate the information to be transferred from the peripheral device on the I/O bus to the inputs of Parallel Adder Unit 110, combining or "ORing" the information from the peripheral device with the contents of B-Register 100. Time 6 envelope and Sequence Control State 4 terminate as described in conjunction with FIG. 20.

Referring to FIG. 22 which illustrates the operation of the TIM/TOM Counter and related functions when the P-field of a control word specifies two bytes per word, the counter advances from an initial state of $\overline{FCFE}$ $\overline{FCFD}$ $\overline{FCFC}$ $\overline{FCFB}$ $\overline{FCFA}$ to a final state of $\overline{FCFE}$ $\overline{FCFD}$ $\overline{FCFC}$ $\overline{FCFB}$ FCFA in response to twelve clock pulses TCK1, as described in the section entitled "TIM/TOM Control Unit." Signal HCE1 issues to permit the contents of B-Register 100 to tbe shifted left circular through twelve bit positions, as counted by the TIM/TOM Counter. If the operation is a TIM operation, gating signals UIOU and UIOL issue after the counter reaches its final state with flip-flop CFA set to the 1-state to gate the information from the peripheral device on I/O bus 25 to the inputs of Parallel Adder Unit 110, combining or "ORing" the information from the peripheral device with the contents of B-Register 100. Time 6 envelope and Sequence Control State 4 terminate as described in conjunction with FIG. 20.

Referring to FIG. 23 which illustrates the operation of the TIM/TOM counter and related functions when the P-field of the control word specifies three bytes per word, signal HCE1 issues as Time 6 envelope is entered to permit the contents of B-Register 100 to be shifted left circular. The TIM/TOM counter simultaneously commences to count clock pulses TCK1 from an initial state of $\overline{FCFE}$ $\overline{FCFD}$ FCFC $\overline{FCFB}$ $\overline{FCFA}$ to final state of $\overline{FCFE}$ $\overline{FCFD}$ $\overline{FCFC}$ $\overline{FCFB}$ FCFA. The number of clock pulses counted by the TIM/TOM counter between its initial and final state is eight, with the contents of B-Register 100 being shifted left circular through eight bit positions. Signal HCE1 is inhibited when the TIM/TOM counter reaches its final state to inhibit further shifting of the contents of B-Register 100. Gating signal UIOU and UIOL issue, if the operation is a TIM operation, as the counter reaches its final state to gate the information from the peripheral device on the I/O bus to the inputs of Parallel Adder Unit 110, combining or "ORing" the information from the peripheral device with the contents of B-Register 100. Time 6 envelope and Sequence Control State 4 terminate as described in conjunction with FIG. 20.

When the P-field of the control word specifies four bytes per word, the operation of the TIM/TOM counter and related functions is as illustrated in FIG. 24. Upon entering Time 6 envelope, signal HCE1 issues to enable the contents of B-Register 100 to be shifted left circular through six bit positions. Simultaneously, the TIM/TOM counter advances from an initial state of $\overline{FCFE}$ $\overline{FCFD}$ $\overline{FCFC}$ FCFB $\overline{FCFA}$ to a final state of $\overline{FCFE}$ $\overline{FCFD}$ $\overline{FCFC}$ $\overline{FCFB}$ FCFA in response to six clock pulses TCK1. When the TIM/TOM counter reaches its final state, signal HCE1 is inhibited to prevent further shifting of the contents of B-Register 100. Signals UIOU and UIOL issue, if the operation is a TIM operation, as the TIM/TOM counter reaches its final state, to gate the information on I/O bus 25 being transferred from the peripheral device to the input terminals of Parallel Adder Unit 110, combining or "ORing" the information from the peripheral device with the contents of B-Register 100. Time 6 envelope and Sequence Control State 4 terminate as described in conjunction with FIG. 20.

In the foregoing descriptions of FIGS. 20–24, the timing in Time 6 envelope of Sequence Control State 4 was based on the use of a high speed TIM or TOM channel in Peripheral Input/Output Buffer 16. If the input/output operation utilizes a low speed channel, Frequency Divider 125 would be employed in conjunction with Delay Time Counter 123 so that advance of Delay Time Counter 123 would occur in response to every fourth clock pulse TCK1 instead of for every clock pulse TCK1 as illustrated. FIG. 25 is a timing diagram showing the operation of Delay Time Counter 123 in conjunction with Frequency Divider 125.

TIM/TOM operation—Sequence Control State 5: A flow chart showing the operations performed during Sequence Control State 5 of a TIM/TOM operation is illustrated in FIG. 26. FIG. 27 illustrates the information transfers and FIG. 28 is a timing diagram illustrating the major timing, gating and logic signals which occur during Sequence Control State 5. In FIG. 28, clock signals TCK1 are not shown in true proportion as in FIG. 5, in order to simplify the timing diagram. Referring to FIGS. 26, 27 and 28, upon entering Sequence Control State 5, gating signal SAMI issues to gate the address contained in the Y-field of the control word from I-Register 101 to Memory Address Register 80. The contents of B-Register 100 are transferred to Memory Data Register 81. Signal STOR causes a memory write operation to be performed, storing the contents of B-Register 100 in the memory location identified by the Y-field of the control word.

TIM/TOM flip-flop TTF is reset to the 0-state and Sequence Control State 5 terminates, ending the TIM/TOM operation. The computer system then returns to the interrupted program to continue program execution until the program interrupt request generated by another TIM or TOM channel is granted priority by Automatic Program Interrupt Unit 15, at which time Sequence Control State 1 is entered to again perform the TIM/TOM operation, as described in this section.

Examples of operation: The performance in the computer system of a TIM operation and a TOM operation is further illustrated in the examples presented in FIGS. 29*a*–29*i* and 30*a*–30*g* respectively. These examples illustrate the organization of data to be transferred, the updating of the control word, the shifting of information if the transferred words comprise more than one byte and the general sequence of events during the operations.

Figure 29A:
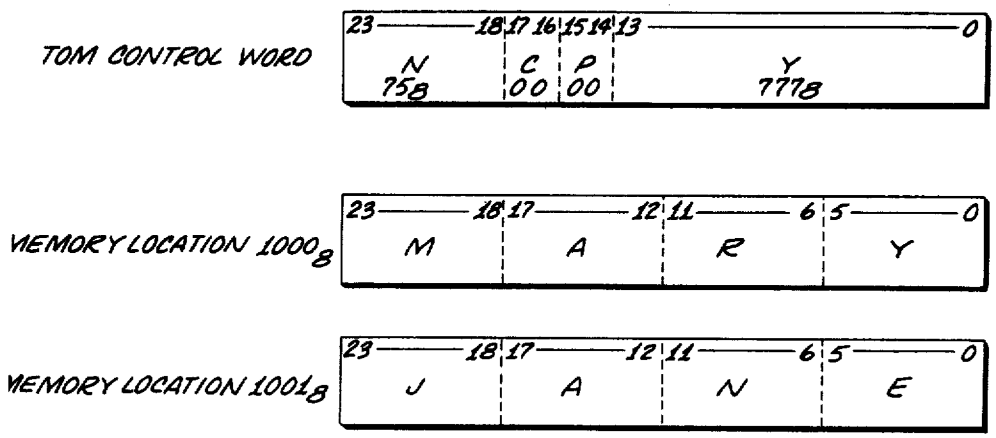

Referring to FIG. 29*a*, the initial state of the N-field of the TOM control word is $75_8$, indicating that two words are to be transferred from memory to the appropriate peripheral device corresponding to the TOM control word. The P-field is 00, indicating that each word transferred to the peripheral device comprises four bytes of six bits each. The C-field is initially set equal to the P-field to indicate that four bytes remain to be transferred from memory to the peripheral device. The Y-field contains the address of memory location $777_8$, indicating that the first information word to be transferred to the peripheral device is stored in memory location $1000_8$. The contents of memory location $1000_8$ and $1001_8$ are assumed to be as illustrated, the binary digits of each six-bit byte representing an alphanumeric character.

Figure 29B:
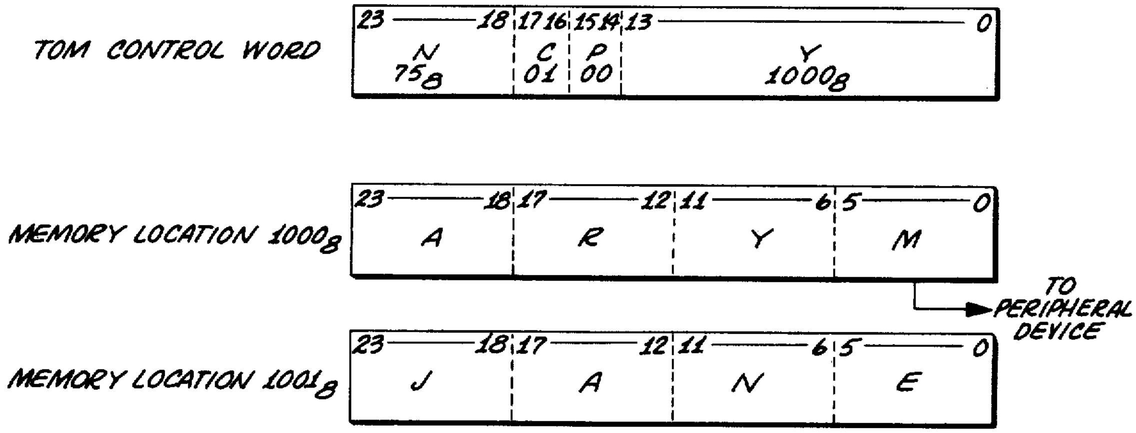

Referring to FIG. 29*b*, in response to servicing of the first interrupt request of the TOM channel in Arithmetic and Control Unit 10, the Y-field of the control word is incremented by one, because of equality of the C and P fields indicating that the first byte of an information word is to be transferred to the peripheral device. The C-field is incremented by one to record the transfer of an information byte to the peripheral device. The contents of memory location $1000_8$ are shifted left circular in B-Register 100 through six bit positions to position what was the most-significant byte of the information word in bit positions 0–5 of B-Register 100. The most-significant byte M is then transferred through Parallel Adder Unit 110 over I/O bus 25 to the perpiheral device.

Figure 29C:
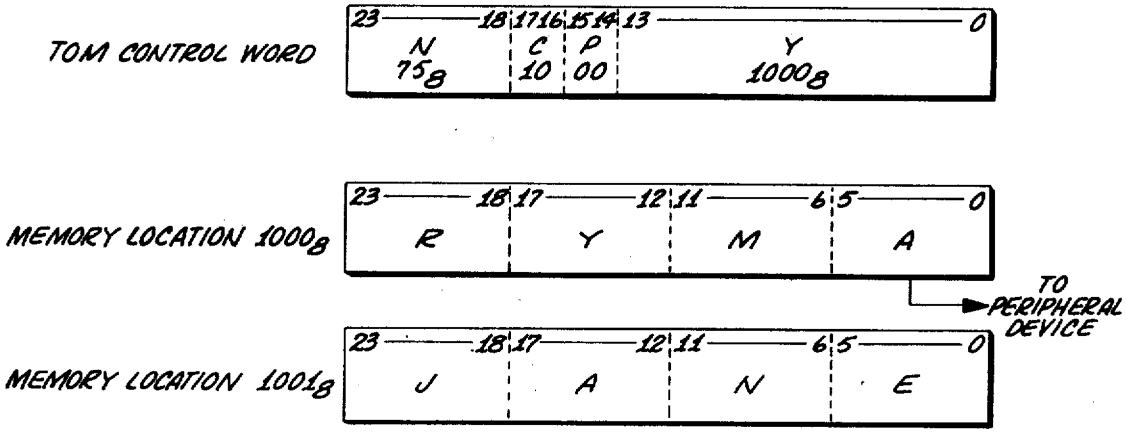
Figure 29D:
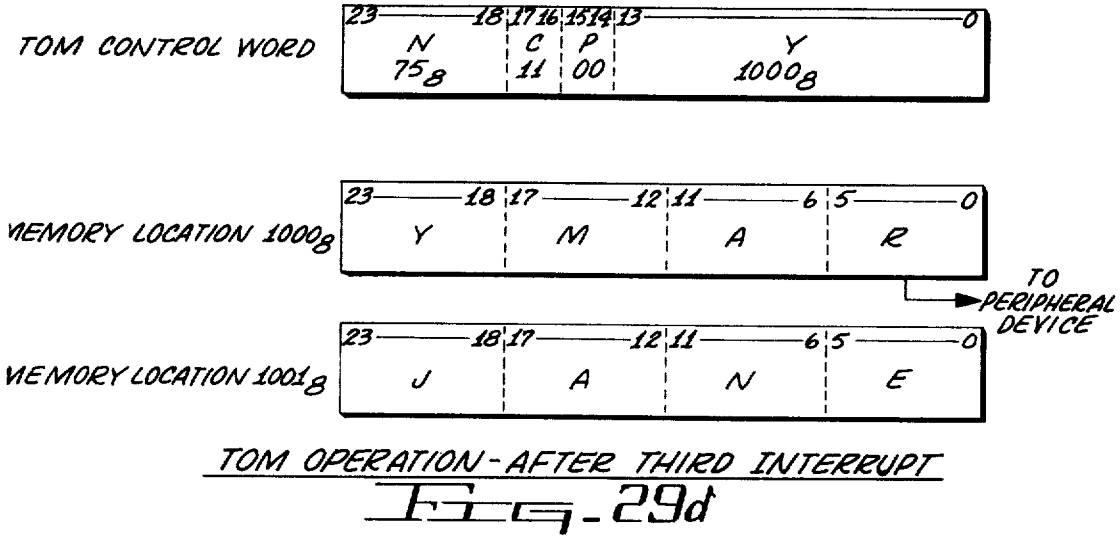
Figure 29E:
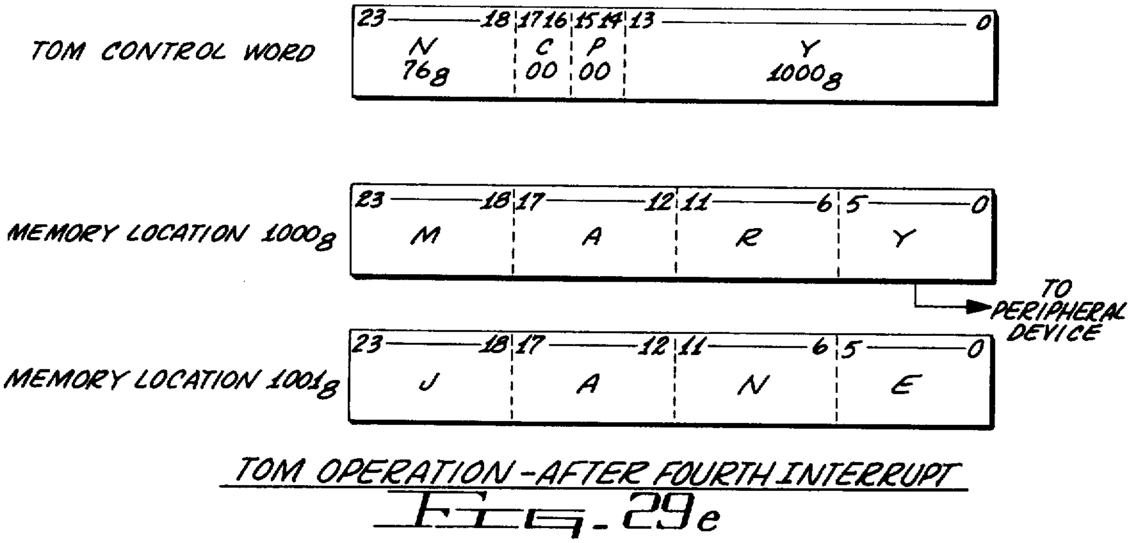

As illustrated in FIGS. 29*c*–29*d*, incrementation of the C-field of the control word occurs as each successive information byte of the information word in memory location $1000_8$ is transferred to the peripheral device after the performance of the left circular shift in B-Register 100. Upon incrementation of the C-field as the fourth byte of the information word in memory location $1000_8$ is transferred to the peripheral device, the carry from bit position 17 of the C-field causes incrementation of the N-field to $76_8$. The C-field, having been reduced to 00 by the last incrementation, is equal to the P-field in the proper state for transfer of the next four-byte word from memory location $1001_8$, as illustrated in FIG. 29*e*. If the P-field were not 00, the C-field would have been made equal to the P-field after the C-field became 00, as previously described in the section entitled "Sequence Control State 3."

Figure 29F:
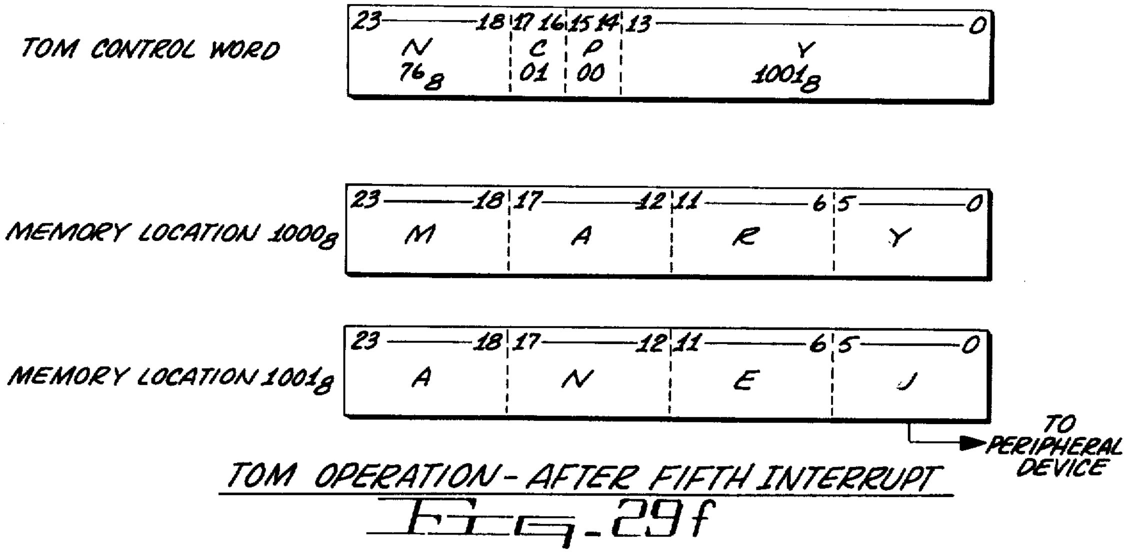
Figure 29G:
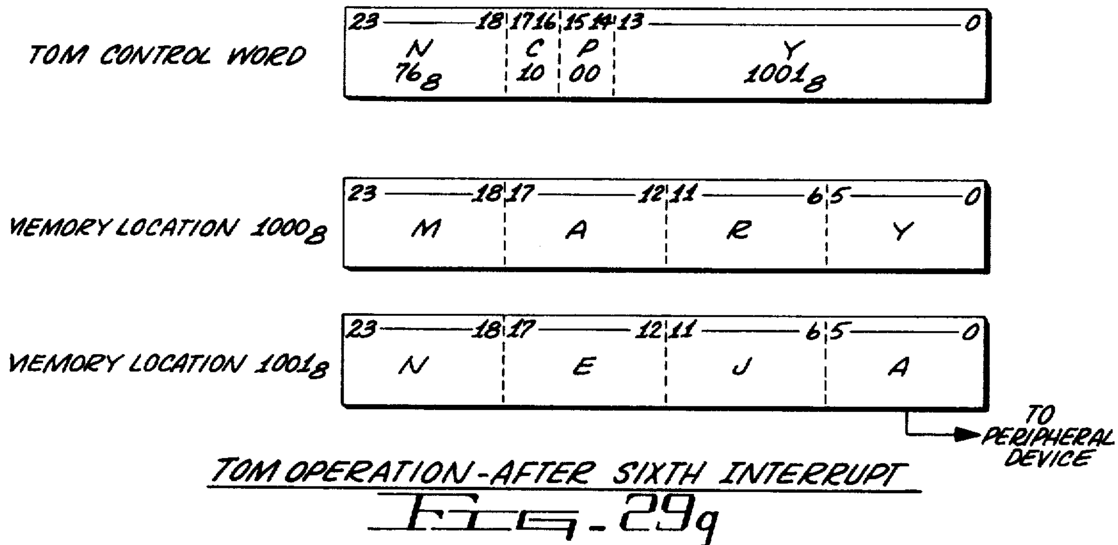
Figure 29H:
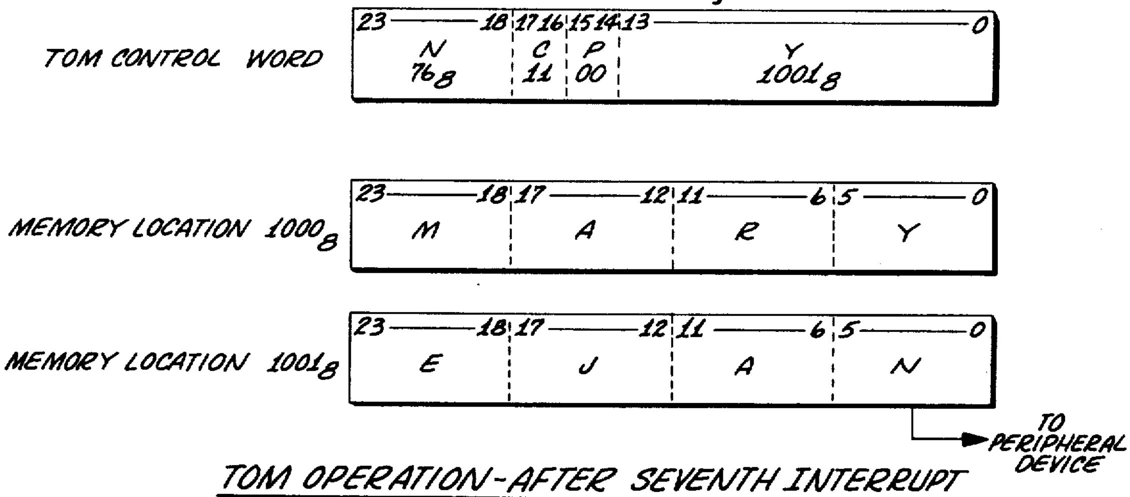
Figure 29I:
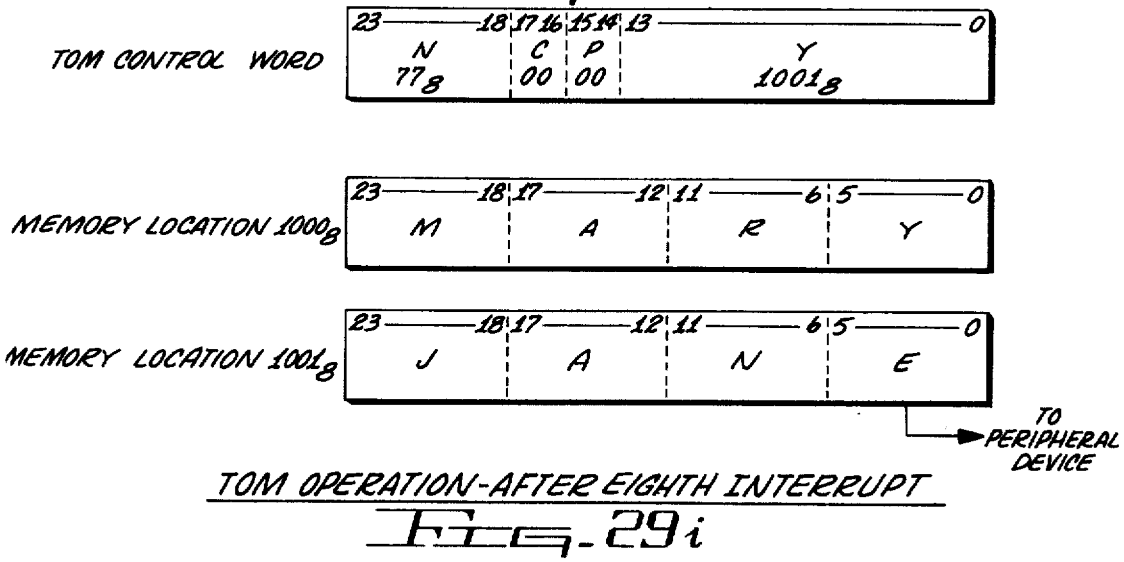

Referring to FIG. 29*f*, the Y-field of the control word is incremented to $1001_8$ in response to servicing of the fifth interrupt request to cause the next information byte to be transferred to the peripheral to be obtained from memory location $1001_8$. The C-field is again incremented as each successive information byte is transferred from memory location $1001_8$ to the peripheral device. Upon incrementation of the C-field in response to transfer of the fourth information byte to the peripheral device, a carry occurs from the C-field incrementing the N-field to $77_8$, causing generation of echo signal HECO and termination of the TOM operation.

Figure 30A:
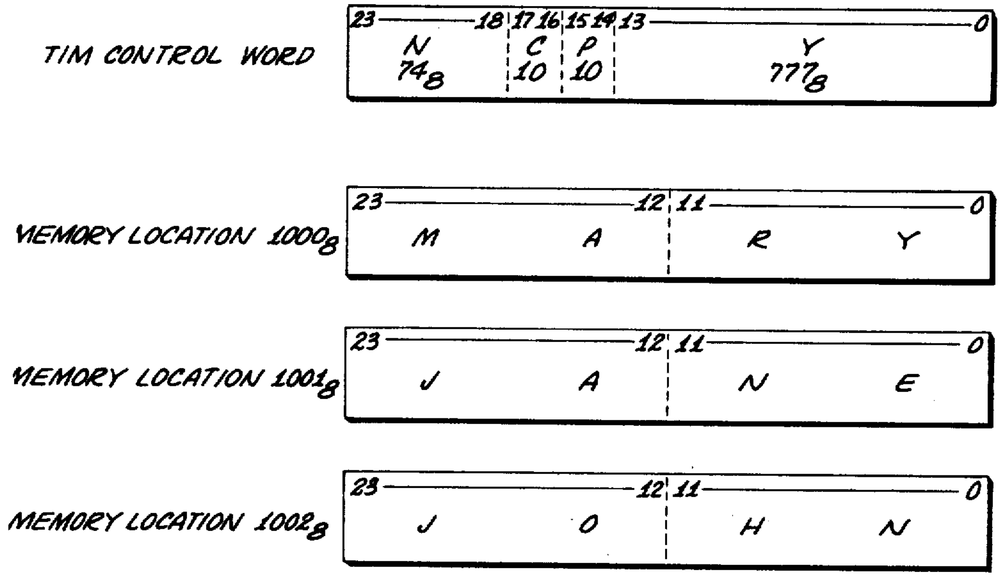

Referring to FIGS. 30*a*–30*g* illustrating the TIM operation, the initial state of the N-field of the TIM control word is $74_8$, indicating that three information words are to be transferred from the appropriate peripheral device corresponding to the TIM control word to Memory 11. The P-field of the TIM control word is 10, indicating that each information word transferred from the peripheral device to Memory 11 contains two information bytes. The C-field is initially set equal to the P-field, as illustrated in FIG. 30*a*. The initial state of the Y-field is $777_8$, indicating that the first information word transferred from the peripheral device is to be stored in memory location $1000_8$. The contents of memory locations $1000_8$, $1001_8$ and $1002_8$ are assumed to be as illustrated in FIG. 30*a*.

Figure 30B:
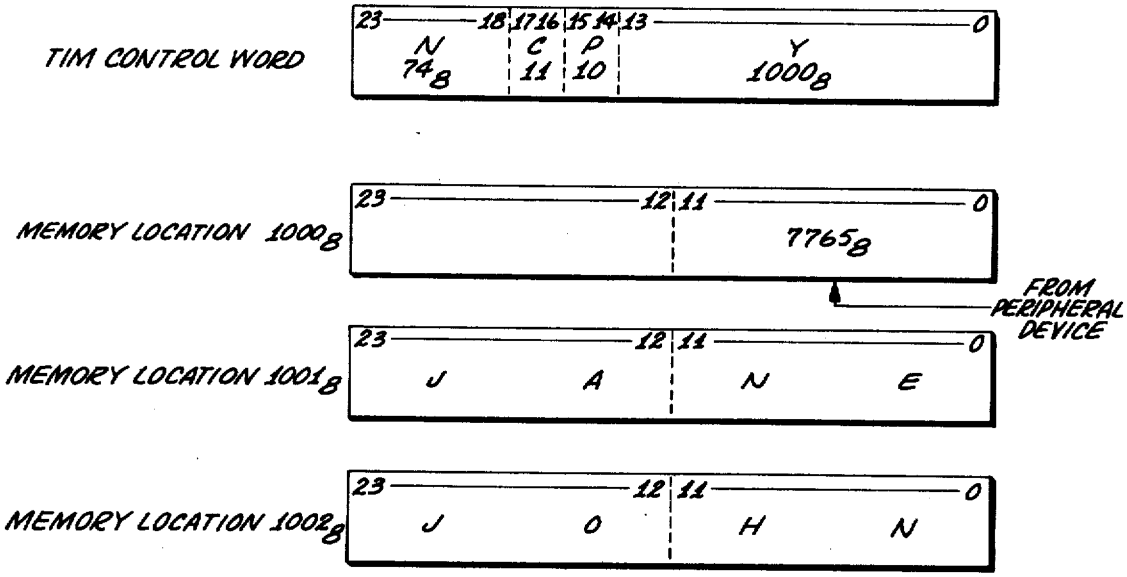
Figure 30C:
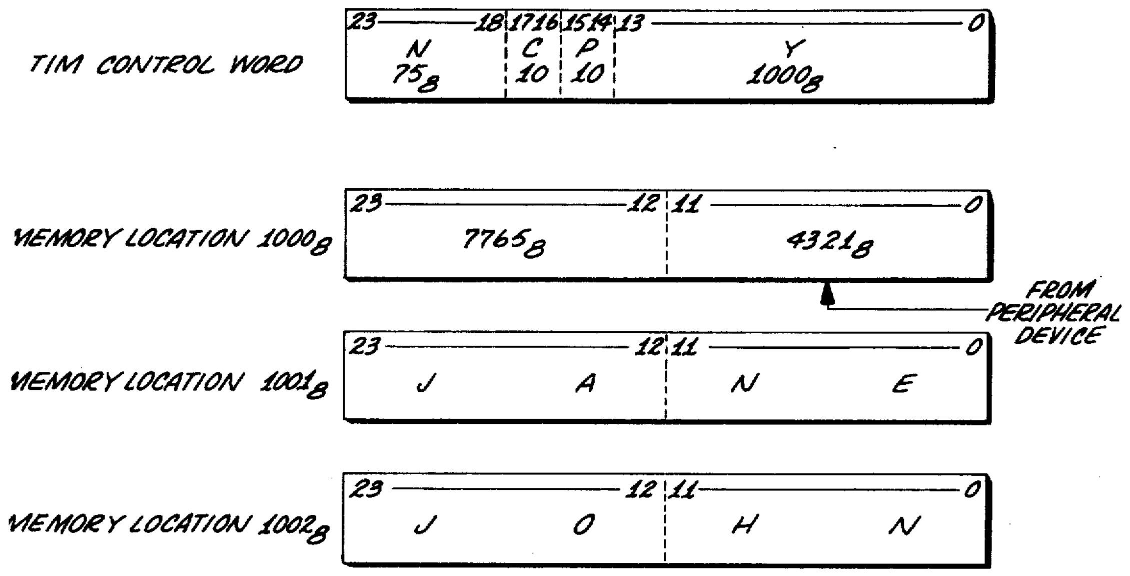
Figure 30D:
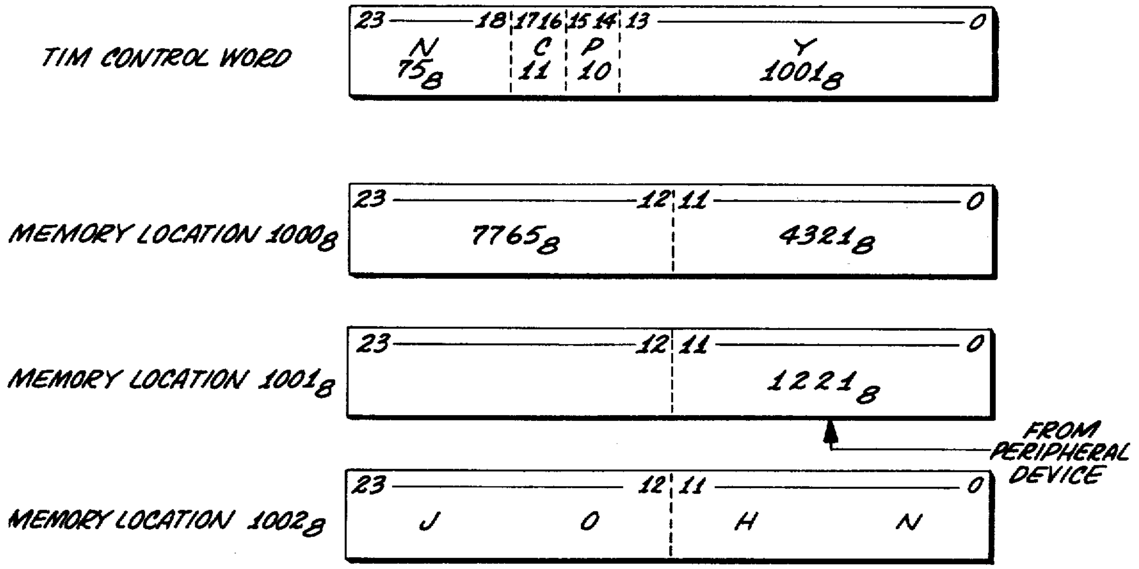
Figure 30E:
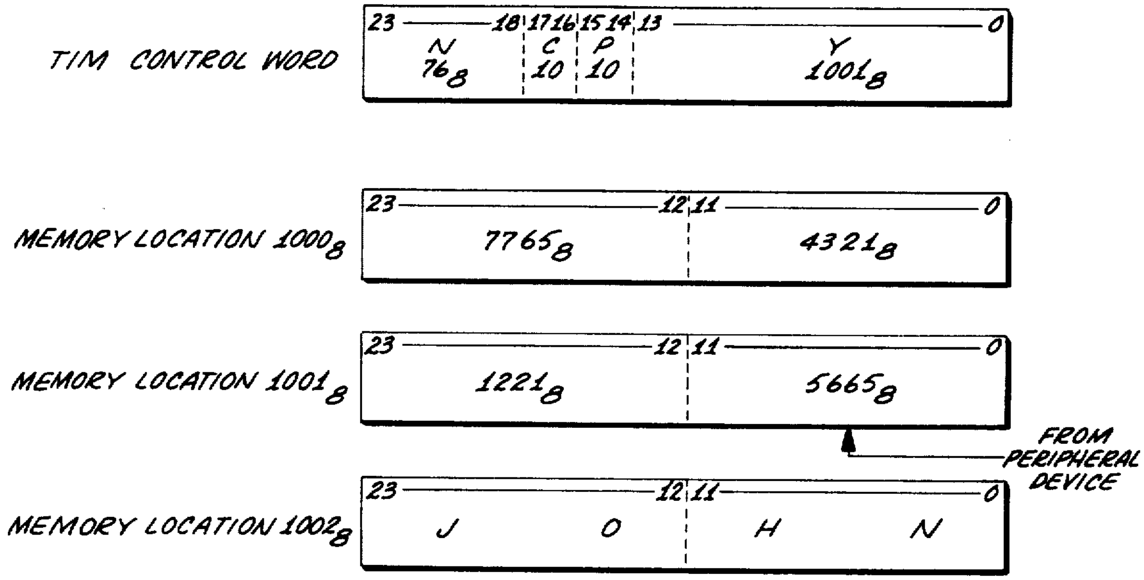
Figure 30F:
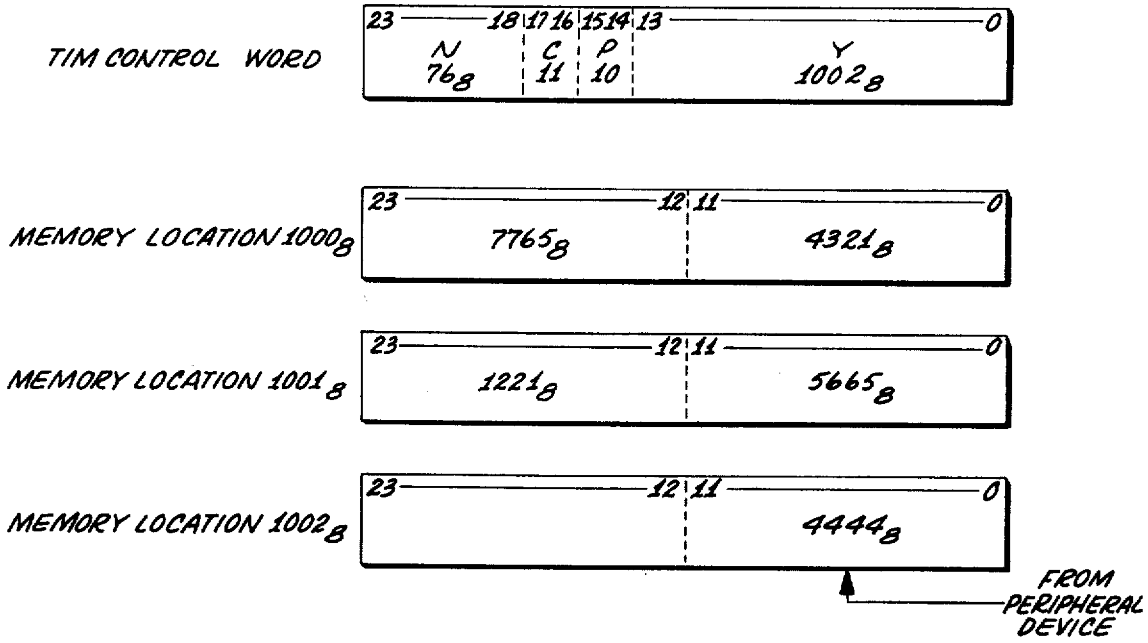
Figure 30Q:
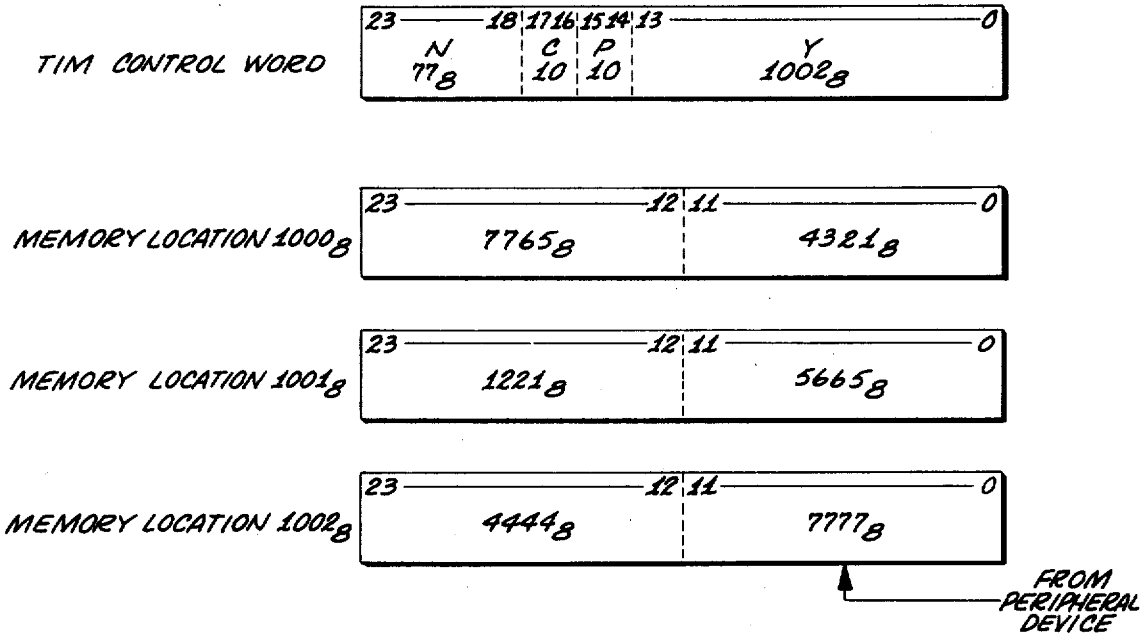

As illustrated in FIG. 30*b*, the Y-field is incremented to $1000_8$ in response to servicing of the first interrupt request of the TIM channel, due to equality between the C and P fields indicating that the first byte of an information word is to be transferred to Memory 11. The C-field is incremented and the contents of memory location $1000_8$ are cleared from B-Register 100. The first twelve-bit byte from the peripheral device is then transferred through Parallel Adder Unit 110 to B-Register 100 and stored in memory location $1000_8$. In response to servicing of the second interrupt request, the C-field is again incremented, with the resulting carry from bit position 17 of the C-field causing incrementation of the N-field to $75_8$. Because the C-field was reduced to 00 by this incrementation, indicating that the last byte of the word is being transferred, the C-field is set equal to the P-field, preparatory to transfer of the next information word from the peripheral device to Memory 11. The contents of memory location $1000_8$ in B-Register 100 are shifted left circular through twelve-bit positions and the second information byte is transferred to bit position 11–0 of B-Register 100 for subsequent storage in memory location $1000_8$. In response to servicing of the third interrupt request, the Y-field of the control word is again incremented and the first twelve-bit information byte is transferred from the peripheral device to memory location $1001_8$. Successive transfers of information bytes from the peripheral device under direction of the TIM control word occur until the N-field of the control word reaches $77_8$, causing echo signal HECO to issue to terminate the TIM operation.

Accordingly, there has been described herein digital computer apparatus embodying the instant invention. While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a computer system including a plurality of peripheral units, a memory and an arithmetic and control unit, the peripheral units intermittently providing requests to interrupt the program being executed in the system in order to transmit information between memory and the peripheral units through the arithmetic and control unit, the combination comprising: program interrupt means coupled to each peripheral unit for receiving the program interrupt requests and for providing an output for each interrupt request and stored logic means for storing information relating to each peripheral unit, said stored logic means including input means coupled to said program interrupt means for receiving the output of said program interrupt means, said stored logic means being coupled to each of the peripheral units for transmitting appropriate information stored in said stored logic means to the interrupting peripheral unit in response to the output provided by said program interrupt means.

2. In a computer system including a plurality of peripheral units, a memory and an arithmetic and control unit, the peripheral units intermittently providing requests to interrupt the program being executed in the system in order to transmit information between memory and the peripheral units through the arithmetic and control unit, said plurality of peripheral units including peripheral units of a predetermined type, the combination comprising: program interrupt means coupled to each peripheral unit for receiving the program interrupt requests and for providing an output for each interrupt request and control means coupled to said program interrupt means for receiving the output and responsive to an output corresponding to an interrupt request from one of the predetermined type peripheral units for generating signal outputs identifying the predetermined type peripheral unit and the direction of data transfer between memory and the predetermined type peripheral unit.

3. The combination of claim 2 in which said control means comprises a read-only memory including stored logic.

4. In a computer system including a plurality of peripheral units, a memory and an arithmetic and control unit, the peripheral units intermittently providing requests to interrupt the program being executed in the system in order to transmit information between memory and the peripheral units through the arithmetic and control unit, said plurality of peripheral units including peripheral units of a predetermined type, the combination comprisnig: program interrupt means coupled to the peripheral units for receiving the program interrupt requests and for providing an output corresponding to one of the interrupt requests, means coupled and responsive to said program interrupt means for transferring the contents of a corresponding storage location of memory to the arithmetic and control unit and control means responsive to an output of said program interrupt means corresponding to an interrupt request from a predetermined type peripheral unit for controlling the transfer of information between memory and the predetermined type peripheral unit through the arithmetic and control unit in conjunction with the contents of the memory location corresponding to the output of the program interrupt means.

5. The combination of claim 4 in which said control means comprises a read-only memory.

6. In a computer system including a plurality of peripheral units, a memory and an arithmetic control unit, the peripheral units intermittently providing requests to interrupt the program being executed in the system in order to transmit information between memory and the peripheral units through the arithmetic and control unit, said plurality of peripheral units including peripheral units of a predetermined type, the combination comprising: program interrupt means coupled to the peripheral units for receiving the program interrupt requests and for providing an output for each interrupt request and control means coupled to said program interrupt means and responsive to an output of said program interrupt means corresponding to an interrupt request from one of the predetermined type peripheral units for automatically controlling the transfer of information through the arithmetic and control unit between memory and the predetermined type peripheral unit, said control means including means for identifying the predetermined type peripheral unit and means for identifying the direction of transfer of information in the arithmetic and control unit.

7. In a computer system including a plurality of peripheral units, a memory and an arithmetic and control unit, the peripheral units intermittently providing requests to interrupt the program being executed in the system in order to transmit information between memory and the peripheral units through the arithmetic and control unit, said plurality of peripheral units including peripheral units of a predetermined type, the combination comprising: program interrupt means coupled to the peripheral units for receiving the program interrupt requests and for providing an output for each interrupt request and control coupled to said interrupt means for receiving the output and responsive to an output of said program interrupt means corresponding to an interrupt request from one of the predetermined type peripheral units for automatically controlling the transfer of information through the arithmetic and control unit between memory and the predetermined type peripheral unit, said control means including means for identifying the peripheral unit whose program interrupt request was granted as a predetermined type peripheral unit, means for identifying the predetermined type peripheral unit and means for identifying the direction of transfer of information in the arithmetic and control unit.

8. The combination of claim 7 in which said control means comprises stored logic.

9. In a computer system including a plurality of peripheral units, a memory and an arithmetic and control unit, the peripheral units intermittently providing requests to interrupt the program being executed in the system in order to transmit information between memory and the peripheral units through the arithmetic and control unit, said plurality of peripheral units including peripheral units of a predetermined type, the combination comprising: program interrupt means coupled to the peripheral units for receiving the program interrupt requests and for providing an address corresponding to the peripheral unit whose interrupt request has been granted, the address identifying a location in memory containing an instruction word or, if the interrupt request of one of the predetermined type peripheral units has been granted, a control word, means responsive to the address provided by said program interrupt means for transferring the contents of the identified storage location from memory to the arithmetic and control unit and control means coupled to said program interrupt means to be responsive to an address provided thereby in response to the interrupt request of one of the predetermined type periphral units for automatically controlling in conjunction with the control word obtained from the memory location identified by the address provided by said interrupt means the transfer of information between memory and the predetermined type peripheral unit.

10. In a computer system including a plurality of peripheral units, a memory and an arithmetic and control unit, the peripheral units intermittently providing requests to interrupt the program being executed in the system in order to transmit information between memory and the peripheral units through the arithmetic and control unit, said plurality of peripheral units including peripheral units, of a predetermined type, the combination comprising: program interrupt means coupled to the peripheral units for receiving the program interrupt requests and for generating an output corresponding to one of the interrupt requests, decoding means for receiving the output of said program interrupt means, said decoding means including first means responsive to an output of said program interrupt means corresponding to an interrupt request from one of the predetermined type peripheral units for generating a signal output identifying the predetermined type peripheral unit and second means responsive to an output of said program interrupt means corresponding to an interrupt request from one of the predetermined type peripheral units for designating the peripheral unit as a predetermined type peripheral unit and identifying the direction of transfer of information in the arithmetic and control unit, means connected to said decoding means for transmitting the signal output of said first means to the plurality of peripheral units for enabling a data transfer between memory and the identified predetermined type peripheral unit and means connected to said decoding means and responsive to the signal output of said second means for controlling the transfer of information through the arithmetic and control unit between memory and the identified predetermined type peripheral unit.

11. In a computer system including a plurality of peripheral units providing program interrupt requests for interrupting the program being executed by an arithmetic and control unit to transmit information to and receive information from a memory through the arithmetic and control unit when such requests are granted, the combination comprising: program interrupt means coupled to the peripheral units for receiving one or more program interrupt requests and for generating an output corresponding to a particular interrupt request, decoding means for receiving the output of said program interrupt means, said decoding means including first means responsive to the output of said program interrupt means for generating a signal output identifying the peripheral unit providing the particular interrupt request and second means responsive to the output of said program interrupt means for generating a signal output identifying the direction of transfer of data through the arithmetic and control unit between memory and the identified peripheral unit, means connected to said decoding means for transmitting the signal output of said first means to the plurality of peripheral units for enabling a data transfer between memory and the identified peripheral unit and means connected to said decoding means and responsive to the signal output of said second means for controlling the direction of transfer of information through the artihmetic and control unit between memory and the identified peripheral unit.

12. In a computer system including a plurality of peripheral units for providing program interrupt requests and for interrupting the program being executed by an arithmetic and control unit and transmitting information to and receiving information from a memory through the arithmetic and control unit when such requests are granted, said plurality of peripheral units including a first type for transmitting information to memory and a second type for receiving information from memory, the combination comprising: program interrupt means coupled to the peripheral units for receiving one or more program interrupt requests and for providing an output corresponding to a particular interrupt request, decoding means for receiving the output of said program interrupt means, said decoding means including first means responsive to the output of said program interrupt means for generating a signal output identifying the peripheral unit providing the particular interrupt request and second means responsive to the output of said program interrupt means for generating a signal output identifying the type of peripheral unit providing the particular interrupt request, means connected to said decoding means for transmitting the signal output of said first means to the plurality of peripheral units for enabling a data transfer between memory and the peripheral unit identified by the signal output of said first means and means connected to said decoding means and responsive to the signal output of said second means for controlling the direction of transfer of information through the arithmetic and control unit between memory and the peripheral unit identified by the signal output of said first means.

13. In a computer system including a plurality of peripheral units for providing program interrupt requests and for interrupting the program being executed by an arithmetic and control unit and transmitting information to and receiving information from a memory through the arithmetic and control unit when such requests are granted, said plurality of peripheral units including peripheral units of a predetermined type, the combination comprising: program interrupt means coupled to the peripheral units for receiving one or more program interrupt requests and for providing an output corresponding to a particular interrupt request, decoding means for receiving the output of said program interrupt means, said decoding means including first means responsive to the output of said program interrupt means corresponding to an interrupt request from a predetermined type peripheral unit for generating a signal output identifying the predetermined type peripheral unit providing the particular program interrupt request and second means responsive to the output of said program interrupt means corresponding to an interrupt request from a predetermined type peripheral unit for generating a signal output identifying the direction of data transfer through the arithmetic and control unit between memory and the identified predetermined type peripheral unit, means connected to said decoding means for transmitting the signal output of said first means to the plurality of peripheral units for enabling a data transfer between memory and the identified predetermined type peripheral unit and means connected to said decoding means and responsive to the signal output of said second means for controlling the direction of transfer of information through the arithmetic and control unit between memory and the identified predetermined type peripheral unit.

14. In a computer system including a plurality of peripheral units for providing program interrupt requests and for interrupting the program being executed by an arithmetic and control unit and transmitting information to and receiving information from a memory through the arithmetic and control unit when such requests are granted, said plurality of peripheral units including peripheral units of a predetermined type, the combination comprising: program interrupt means coupled to the peripheral units for receiving one or more program interrupt requests and for providing an output corresponding to a particular interrupt request, decoding means for receiving the output of said program interrupt means and for generating signal outputs when the output of said program interrupt means corresponds to an interrupt request provided by a predetermined type peripheral unit, said decoding means including first means for generating a signal output identifying the predetermined type peripheral unit providing the particular interrupt request and second means for generating a signal output identifying the direction of transfer of data through the arithmetic and control unit between memory and the predetermined type peripheral identified by the signal output of said first means, means connected to said decoding means for transmitting the signal output of said first means to the plurality of peripheral units for enabling a data transfer between memory and the identified predetermined type peripheral unit and means connected to said decoding means and responsive to the signal output of said second means for controlling the direction of transfer of information through the arithmetic and control unit between memory and the identified predetermined type peripheral unit.

15. The combination of claim 14 in which said decoding means comprises a read-only memory including stored logic.

16. In a computer system including a plurality of peripheral units for providing program interrupt requests and for interrupting the program being executed by an arithmetic and control unit and transmitting information to and receiving information from a memory through the arithmetic and control unit when such requests are granted, a plurality of peripheral units including first, second and third types, the combination comprising: program interrupt means for receiving one or more program interrupt requests generated by the peripheral units and for providing an output corresponding to a particular interrupt request, decoding means for receiving the output of said program interrupt means and for providing signal outputs in response to an output of said program interrupt means corresponding to the interrupt requests of first and second type peripheral units, said decoding means including first means for generating a signal output identifying the peripheral unit of the first or second type providing the particular interrupt request and second means for generating a signal output identifying the peripheral unit providing the particular interrupt request as a first type or a second type, means connected to said decoding means for transmitting the signal output of said first means to the plurality of peripheral units for enabling a data transfer between memory and the identified peripheral unit and means connected to said decoding means and responsive to the signal output of said second means for controlling the direction of transfer of information through the arithmetic and control unit between memory and the identified peripheral unit.

17. In a computer system including a plurality of peripheral channels connected to a corresponding plurality of peripheral devices, said peripheral channels providing program interrupt requests for interrupting the program being executed by an arithmetic and control unit to initiate transfer of information between a memory and the corresponding peripheral devices through the arithmetic and control unit when such requests are granted, the plurality of peripheral channels including first special channels for transmitting information from memory to the associated peripheral devices, second special channels for transmitting information from the associated peripheral devices to memory and third channels for transmitting information to or receiving information from memory, the combination comprising: program interrupt means for receiving one or more program interrupt requests generated by the peripheral channels and for providing an output corresponding to a particular interrupt request of a predetermined priority, decoding means responsive to an output of said program interrupt means corresponding to a program interrupt request provided by a special channel for generating signal outputs, said decoding means including first means for generating a signal output identifying the special peripheral channel providing the particular interrupt request and second means for generating a signal output identifying the channel as a first special channel or a second special channel, means connected to said decoding means and responsive to the signal output of said first means for enabling a data transfer between memory and the peripheral device connected to the identified special pheripheral channel and means connected to said decoding means and responsive to the signal output of said second means for controlling the direction of transfer of information through the arithmetic and control unit between memory and the identified special peripheral channel.

18. The combination of claim 17 which includes means responsive to an output of said program interrupt means corresponding to a program interrupt request provided by a third peripheral channel for inhibiting operation of said decoding means.

19. The combination of claim 17 in which said decoding means comprises a diode matrix.

References Cited

UNITED STATES PATENTS

| | | | |
|---|---|---|---|
| 3,283,306 | 11/1966 | Patrusky | 340—172.5 |
| 3,283,308 | 11/1966 | Klein et al. | 340—172.5 |
| 3,289,168 | 11/1966 | Walton et al. | 340—172.5 |
| 3,290,658 | 12/1966 | Callahan et al. | 340—172.5 |
| 3,310,785 | 3/1967 | Couleur et al. | 340—172.5 |
| 3,344,410 | 9/1967 | Collins et al. | 340—172.5 |
| 3,377,619 | 4/1968 | Marsh et al. | 340—172.5 |
| 3,404,378 | 10/1968 | Threadgold et al. | 340—172.5 |
| 3,406,380 | 10/1968 | Bradley et al. | 340—172.5 |

PAUL J. HENON, Primary Examiner

R. F. CHAPURAN, Assistant Examiner